US010735537B2

(12) United States Patent
Wang et al.

(10) Patent No.: US 10,735,537 B2
(45) Date of Patent: Aug. 4, 2020

(54) INFORMATION PUSHING

(71) Applicant: Alibaba Group Holding Limited, Grand Cayman (KY)

(72) Inventors: Jun Wang, North Salem, NY (US); Nan Li, Hangzhou (CN); Jihai Zhang, Hangzhou (CN); Chen Liang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 73 days.

(21) Appl. No.: 15/729,527

(22) Filed: Oct. 10, 2017

(65) Prior Publication Data

US 2018/0103115 A1    Apr. 12, 2018

(30) Foreign Application Priority Data

Oct. 11, 2016    (CN) .......................... 2016 1 0887717

(51) Int. Cl.
*H04L 29/08*    (2006.01)
*H04L 29/06*    (2006.01)

(52) U.S. Cl.
CPC .............. *H04L 67/26* (2013.01); *H04L 67/16* (2013.01); *H04L 67/18* (2013.01); *H04L 67/42* (2013.01); *H04L 67/22* (2013.01)

(58) Field of Classification Search
CPC ...................................................... H04L 67/26
(Continued)

(56) References Cited

U.S. PATENT DOCUMENTS

2006/0123053 A1*  6/2006  Scannell, Jr. ....... G06F 16/9577
2013/0173712 A1   7/2013  Monjas Llorente et al.
(Continued)

FOREIGN PATENT DOCUMENTS

CN    101262497 A    9/2008
CN    103428075 A    12/2013
(Continued)

OTHER PUBLICATIONS

PCT Search Report and Written Opinion dated Dec. 22, 2017 for PCT application No. PCT/US2017/055961, 10 pages.
(Continued)

*Primary Examiner* — Adnan M Mirza
(74) *Attorney, Agent, or Firm* — Lee & Hayes, P.C.

(57) ABSTRACT

An information pushing method reduces the interference to the user and improves the utilization rate of information resources during the process of the information pushing. For example, the server sends the triggering condition in the form of triggering condition information, and the identification information corresponding to the information to be pushed to the client terminal. The client terminal determines whether to push the information to be pushed to the user based on the terminal information on its own and sends the identification information to the server. Then the server sends the information to be pushed to the client terminal according to the identification information so that the client terminal may push the information to be pushed to the user. Alternatively, the server determines whether to push the information to be pushed to the user according to the terminal information, and sends the information to be pushed to the client terminal so that the client terminal pushes the terminal information to the user.

19 Claims, 40 Drawing Sheets

(58) Field of Classification Search
USPC .......................................................... 709/203
See application file for complete search history.

(56) References Cited

U.S. PATENT DOCUMENTS

| | | |
|---|---|---|
| 2014/0156721 A1 | 6/2014 | Kihara et al. |
| 2014/0281929 A1 | 9/2014 | Grossman et al. |
| 2014/0359034 A1 | 12/2014 | Hernandez et al. |
| 2016/0086228 A1 | 3/2016 | Babb et al. |
| 2016/0174156 A1* | 6/2016 | Fu ........................ H04L 51/00 455/574 |

FOREIGN PATENT DOCUMENTS

| | | |
|---|---|---|
| CN | 104065565 A | 9/2014 |
| CN | 104461510 A | 3/2015 |
| CN | 104967647 A | 10/2015 |

OTHER PUBLICATIONS

Translation of CN Office Action dated Mar. 30, 2020, and CN Search Report dated Mar. 23, 2020, from corresponding CN Patent Application No. 201610887717.1, 17 pages.

* cited by examiner

INFORMATION PUSHING

CROSS REFERENCE TO RELATED PATENT APPLICATIONS

This application claims priority to Chinese Patent Application No, 201610887717.1, filed on 11 Oct. 2016, entitled "Information Pushing Method, System, Client and Server," which is hereby incorporated by reference in their entirety.

TECHNICAL FIELD

The present disclosure relates to the field of information processing technology, and, more particularly, to an information pushing method, system, client terminal, and server.

BACKGROUND

With the arrival of the big data era, more and more data is appealing in the daily lives of users. It is difficult to quickly and conveniently find required information. Information pushing, as an information filtering and recommendation mechanism, has become an important system function of the mobile terminal, and reduces the burden of the user to filter information to a certain extent.

Conventional information pushing technology usually directly pushes the prepared message to the user. After receiving the message, the mobile terminal will directly display the message to the user. If the user is interested in the received message, the user will open and view the message; otherwise, the user will delete or ignore the message.

If the server often pushes the message that the user is not interested to the user, or sends the message to the user at an inappropriate time, the user will feel harassed and the information resources are wasted.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an information pushing method, system, client terminal, and server, which reduces the interference to the user during the information pushing process and increases the utilization rate of the information resources.

The present disclosure provides a method comprising:
 collecting, by a client terminal, terminal information;
 matching the terminal information with one or more triggering condition information;
 determining that the terminal information matches at least one triggering condition information of the one or more triggering condition information;
 sending identification information corresponding the at least one triggering condition information to a server;
 receiving information to be pushed corresponding to the identification information from the server; and
 pushing the information to be pushed to a user.

For example, the terminal information includes at least one of:
 position information of the client terminal;
 motion status information of the client terminal;
 operation system information of the client terminal;
 location information of the client terminal;
 location information of the user.
 a current time;
 application that is running on the client terminal;
 a list of installed applications on the client terminal;
 a remaining battery capacity of the client terminal; and
 a network quality of the client terminal.

For example, a respective triggering condition information represents a respective triggering condition corresponding to a respective type of terminal information to push respective information to be pushed.

For example, the determining that the terminal information matches at least one triggering condition information of the one or more triggering condition information includes:
 matching the collected terminal information with a respective triggering condition corresponding to a respective triggering condition information of the one or more triggering condition information; and
  when the terminal information matches the respective triggering condition, determining that the terminal information matches the respective triggering condition information; or
  when the terminal information does not match any triggering condition corresponding to any respective triggering condition information in the one or more triggering condition information, determining that the terminal information does not match the triggering condition information.

For example, the pushing the information to be pushed to a user includes presenting the information to be pushed at a user interface of the client terminal.

For example, the pushing the information to be pushed to a user includes:
 determining that the information to be pushed is the pushing content to be pushed to user; and
 pushing the information to be pushed to the user.

For example, the pushing the information to be pushed to a user includes:
 determining that the information to be pushed is an information template;
 generating pushing content to be pushed according to the information template and the terminal information; and
 pushing the newly generated pushing content to the user.

For example, the method may further comprise:
 prior to the pushing the information to be pushed to the user,
 sending the terminal information to the server so that the server determines pushing content to be pushed to the user according to the identification information and the terminal information; and
 receiving the pushing content as the information to be pushed from the server.

For example, the method may further comprise:
 prior to the matching the terminal information with the one or more triggering condition information,
 receiving at least one triggering condition information and identification information corresponding to the triggering information from the server; and
 determining whether there is locally stored triggering condition information corresponding to the received identification information;
 when there is no locally stored triggering condition information corresponding to the received identification information, storing the received triggering condition information and the corresponding identification information; or when there is locally stored triggering condition information corresponding to the received identification information, updating the locally stored triggering information corresponding to the received identification information, according to the received triggering condition information corresponding to the received identification information.

The present disclosure also provides a client terminal comprising:

one or more processors; and one or more memories storing thereon computer-readable instructions that, when executed by the one or more processors, cause the one or more processors to perform acts comprising:

collecting terminal information;

sending the terminal information to the server to request the server to return information to be pushed to the client terminal when the terminal information matches at least one triggering condition information; and pushing the information to be pushed to a user.

For example, the pushing the information to be pushed to the user includes presenting the information to be pushed at a user interface of the client terminal.

For example, the pushing the information to be pushed to the user includes:

determining that the information to be pushed is the pushing content to be pushed to user; and pushing the information to be pushed to the user.

For example, the pushing the information to be pushed to the user includes:

determining that the information to be pushed is an information template;

generating pushing content to be pushed according to the information template and the terminal information; and pushing the newly generated pushing content to the user.

For example, the terminal information includes at least one of:

position information of the client terminal, motion status information of the client terminal;

operation system information of the client terminal;

location information of the client terminal;

location information of the user.

a current time;

application that is running on the client terminal;

a list of installed applications on the client terminal;

a remaining battery capacity of the client terminal; and a network quality of the client terminal.

The present disclosure also provides one or more memories storing thereon computer-readable instructions, that, when executed by one or more processors, cause the one or more processors to perform acts comprising:

sending, by a server, one or more triggering condition information and identification information corresponding to the one or more triggering condition information to a client terminal; and requesting the client terminal to push information to be pushed corresponding to matched triggering condition information to a user when terminal information of the client terminal matches at least one triggering condition information.

For example, the acts further comprise:

receiving a preset corresponding relationship between the one or more trigging condition information and one or more information to be pushed.

For example, the acts further comprise:

collecting historical behavior data and preference data of the user; and establishing a new corresponding relationship between the triggering condition information and the identification according to the historical behavior data and the preference data.

For example, the acts further comprise:

collecting historical behavior data and preference data of the user; and establishing a new corresponding relationship between the triggering condition information and the identification according to the historical behavior data and the preference data.

For example, the acts further comprise:

collecting historical behavior data and preference data of the user; and updating an existing corresponding relationship between the triggering condition information and the identification information.

The present disclosure provides an information pushing method, which includes:

The server sends at least one piece of triggering condition information and identification information corresponding to the triggering condition information to the client terminal.

The client terminal matches the collected terminal information with the received triggering condition information.

If the collected terminal information matches one of the triggering condition information, the client terminal sends the identification information that corresponds to the matched triggering condition information to the server.

The server obtains the information to be pushed corresponding to the identification information.

The server sends the information to be pushed corresponding to the identification information to the client terminal.

The client terminal pushes the received information to be pushed to the user according to a designated method.

The present disclosure provides an information pushing method applicable at the client terminal, which includes:

collecting terminal information;

comparing the collected terminal information with the triggering condition information;

when the collected terminal information matches at least one piece of triggering condition information, sending the identification information corresponding to the matched trigger information to the server so that the server sends the information to be pushed corresponding to the identification information to the client terminal, in response to the received identification information; and pushing the received information to be pushed to the user according to a designated method.

For example, a respective triggering condition information represents a respective triggering condition corresponding to a respective type of terminal information to push respective information to be pushed.

For example, the matching the collected terminal information with the triggering condition information includes:

matching the collected terminal information with the triggering condition corresponding to each triggering condition information;

when the collected terminal information matches the triggering condition corresponding to a piece of triggering condition information in the one or more triggering condition information, which may be stored locally, determining that the collected terminal information matches the piece of triggering condition information; and when the collected terminal information does not match the triggering condition corresponding to any piece of triggering condition information in the one or more triggering condition information, which may be stored locally, determining that the collected terminal information does not match the triggering condition information, which may be stored locally.

For example, the pushing the received information to be pushed to the user according to a designated method includes:

when the information to be pushed is the pushing content to be pushed, sending the received information to be pushed to the user; or when the information to be pushed is information template, generating the pushing content to be pushed according to the received information to be pushed and the terminal information, and pushing the newly generated pushing content to the user.

For example, prior to pushing the information to be pushed to the user according to the designated method, the method may further include:

sending the terminal information to the server so that the serer determines the pushing content to be pushed corresponding to the identification information according to the received terminal information and the received identification information; and pushing the pushing content as the information to be pushed to the client terminal.

For example, prior to matching the collected terminal information with the received triggering condition information, the method may further include:

receiving at least one piece of triggering condition information and the identification information corresponding to the triggering condition information sent by the server;

determining whether there is locally stored triggering condition information corresponding to the received identification information;

when there is no locally stored triggering condition information corresponding to the received identification information, storing the received triggering condition information and the corresponding identification information;

when there is locally stored triggering condition information corresponding to the received identification information, updating the locally stored triggering information corresponding to the received identification information, according to the triggering condition information corresponding to the received identification information.

The present disclosure also provides an information pushing method applicable at the server, which includes:

sending at least one piece of triggering condition information and identification information corresponding to the triggering condition information to the client terminal so that the client terminal sends the identification information matching the triggering condition information to the server, when the client terminal determines the collected terminal information matches one pieced of the triggering condition information;

receiving the identification information sent by the client terminal;

obtain the information to be pushed corresponding to the identification information; and sending the information to be pushed corresponding to the identification information to the client terminal so that the client terminal, after receiving the information to be pushed, pushes the received information to be pushed to the user according to a designated method.

For example, the obtaining the information to be pushed corresponding to the identification information includes:

searching for the pushing content or information template corresponding to the identification information at a designated storage location; and determining the found pushing content or information template as the information to be pushed according to the identification information.

For another example, the obtaining the information to be pushed corresponding to the identification information includes:

searching for the information template corresponding to the identification information at the designated storage location;

collecting terminal information and generating the pushing content according to the collected terminal information and the information template as the information to be pushed corresponding to the identification information.

For example, prior to sending at least one piece of triggering condition information and identification information corresponding to the triggering condition information to the client terminal, the method further includes:

receiving a preset corresponding relationship between the triggering condition information and the identification information.

For another example, prior to sending at least one piece of triggering condition information and identification information corresponding to the triggering condition information to the client terminal, the method further includes:

collecting the historical behavior data and preference data of the user; and establishing a new corresponding relationship between the triggering condition information and the identification, or updating the existing corresponding relationship between the triggering condition information and the identification information, according to the historical behavior data and the preference data.

The present disclosure also provides another information pushing method, which includes that:

The client terminal collects terminal information, and sends the collected terminal information to the server.

The server matches the receives terminal information with the triggering condition information.

When the received terminal information matches one of the triggering condition information, the server obtains the information to be pushed corresponding to the triggering condition information.

The server sends the information to be pushed to the client terminal.

The client terminal pushes the information to be pushed to the user according to a designated method.

The present disclosure provides another information pushing method applicable at the client terminal, which includes:

collecting terminal information;

sending the collected terminal information to the server so that after the server determines that the received terminal information matches one piece of triggering condition information, the server obtains the information to be pushed corresponding to the piece of triggering condition information, and sends the information to be pushed to the client terminal; and pushing the received information to be pushed to the user according to a designated method.

For example, the pushing the received information to be pushed to the user according to the designated method includes:

when the information to be pushed is the pushing content, directly pushing the information to be pushed to the user; or when the information to be pushed is an information template, generating the pushing content according to the received information to be pushed and the terminal information, and pushing the newly generated pushing content to the user.

The present disclosure also provides an information pushing method applied at the server, which includes:

receiving terminal information sent by the client terminal;

matching the received terminal information with the triggering condition information;

when the received terminal information matches one of the triggering condition information, obtaining the information to be pushed corresponding to the triggering condition information;

sending the information to be pushed to the client terminal so that the client terminal pushes the received information to be pushed to the user according to a designated method.

Each triggering condition information represents a triggering condition for information to be pushed corresponding to different types of terminal information.

For example, the matching the received terminal information with the triggering condition includes:

matching the received terminal information with triggering condition corresponding to each triggering condition information;

when the received terminal information matches the triggering condition corresponding to one piece of triggering condition information in the locally stored triggering condition information, determining that the received terminal information matches the piece of triggering information when the received terminal information does not match any triggering condition corresponding to any triggering condition information in the locally stored triggering condition information, determining that the received terminal information does not match the piece of triggering information For example, the obtaining the information to be pushed corresponding to the triggering condition information includes:

searching for the pushing content or information template corresponding to the triggering condition information at a designated storage location;

determining the found pushing content or the information template as the information to be pushed corresponding to the triggering condition information.

For example, the obtaining the information to be pushed corresponding to the triggering condition information includes:

searching for the information template corresponding to the triggering condition information at the designated storage location;

generating the pushing content according to the received terminal information and the information template, to be used as the information to be pushed corresponding to the triggering condition information.

For example, before the server matches the terminal information with the triggering condition information, the method further includes receiving a preset corresponding relationship between the triggering condition information and the information to be pushed.

For example, before the server matches the terminal information with the triggering condition information, the method further includes:

collecting the historical behavior data and preference data of the user; and establishing a new corresponding relationship between the triggering condition information and the information to be pushed, or updating the existing corresponding relationship between the triggering condition information and the information to be pushed, according to the historical behavior data and the preference data.

The present disclosure also provides another information pushing method, which includes that:

The server sends at least one piece of triggering condition information and the information to be pushed corresponding to the information to be pushed to the client terminal.

The client terminal matches the collected terminal information with the received triggering condition information.

When the collected terminal information matches one piece of the received triggering condition information, the client terminal obtains the information to be pushed corresponding to the matched triggering condition information.

The client terminal pushes the information to be pushed to the user according to a designated method.

The present disclosure also provides an information pushing method applicable at the client terminal, which includes:

collecting the terminal information;

matching the collected terminal information with the triggering condition information;

when the collected terminal information matches one piece of the triggering condition information, obtaining the information to be pushed corresponding to the matched triggering condition information; and pushing the information to be pushed to the user according to a designated method.

Each triggering condition information represents a triggering condition for information to be pushed corresponding to different types of terminal information.

For example, the matching the received terminal information with the triggering condition includes:

matching the received terminal information with triggering condition corresponding to each triggering condition information;

when the received terminal information matches the triggering condition corresponding to one piece of triggering condition information in the locally stored triggering condition information, determining that the received terminal information matches the piece of triggering information when the received terminal information does not match any triggering condition corresponding to any triggering condition information in the locally stored triggering condition information, determining that the received terminal information does not match the piece of triggering information For example, the pushing the received information to be pushed to the user according to the designated method includes:

when the information to be pushed is the pushing content, directly pushing the information to be pushed to the user; or when the information to be pushed is an information template, generating the pushing content according to the received information to be pushed and the terminal information, and pushing the newly generated pushing content to the user.

For example, prior to matching the collected terminal information with the received triggering condition information, the method may further include:

receiving at least one piece of triggering condition information and the identification information corresponding to the triggering condition information sent by the server;

determining whether there is locally stored triggering condition information corresponding to the received identification information;

when there is no locally stored triggering condition information corresponding to the received identification information, storing the received triggering condition information and the corresponding identification information;

when there is locally stored triggering condition information corresponding to the received identification information, updating the locally stored triggering information corresponding to the received identification information, according to the triggering condition information corresponding to the received identification information.

The present disclosure also provides an information pushing method applicable at the server, which includes:

sending at least one piece of triggering condition information and identification information corresponding to the triggering condition information to the client terminal so that the client terminal sends the identification information matching the triggering condition information to the server, when the client terminal determines the collected terminal information matches one pieced of the triggering condition information.

For example, prior to sending at least one piece of triggering condition information and identification information corresponding to the triggering condition information to the client terminal, the method further includes:

receiving a preset corresponding relationship between the triggering condition information and the identification information.

For another example, prior to sending at least one piece of triggering condition information and identification information corresponding to the triggering condition information to the client terminal, the method further includes:

collecting the historical behavior data and preference data of the user; and establishing a new corresponding relationship between the triggering condition information and the identification, or updating the existing corresponding relationship between the triggering condition information and the identification information, according to the historical behavior data and the preference data.

The present disclosure also provides an information pushing system, which includes a server and a client terminal.

The server sends at least one piece of triggering condition information and identification information corresponding to the triggering condition information to the client terminal.

The client terminal matches the collected terminal information with the received triggering condition information.

If the collected terminal information matches one of the triggering condition information, the client terminal sends the identification information that corresponds to the matched triggering condition information to the server.

The server obtains the information to be pushed corresponding to the identification information.

The server sends the information to be pushed corresponding to the identification information to the client terminal.

The client terminal pushes the received information to be pushed to the user according to a designated method.

The present disclosure provides a client terminal, which includes:

a collecting unit that collects terminal information;

a matching unit that matches the collected terminal information with the triggering condition information;

a sending unit that sends the identification information corresponding to the matched triggering condition information to the server when the collected terminal information matches one pieced of the triggering condition information, so that the server, responding to the received identification information, sends the information to be pushed corresponding to the identification information to the client terminal; and a pushing unit that pushes the received information to be pushed to the user according to a designated method.

The present disclosure also provides a server, which includes:

a sending unit that sends at least one piece of triggering condition information and the identification information corresponding to the triggering condition information to the client terminal, so that the client terminal, after determining that the collected terminal information matches one piece of the triggering condition information, sends the identification information corresponding to the matched triggering condition information to the server;

a receiving unit that receives the identification information sent by the client terminal; and an obtaining unit that obtains the information to be pushed corresponding to the identification information.

The sending unit sends the information to be pushed corresponding to the identification information to the client terminal, so that the client terminal, after receiving the information to be pushed, sends the received information to be pushed to the user according to a designated method.

The present disclosure also provides an information pushing system, which includes a client terminal and a server.

The client terminal collects terminal information and sends the collected terminal information to the server.

The server matches the received terminal information with the triggering condition information, obtains the information to be pushed corresponding to the matched triggering condition information when the received terminal information matches at least one of the triggering condition information, and pushes the information to be pushed to the client terminal.

The client terminal pushes the information to be pushed to the user according to a designated method.

The present disclosure also provides a client terminal, which includes:

a collecting unit that collects terminal information;

a matching unit that matches the collected terminal information with the triggering condition information;

a sending unit that sends the collected terminal information to the server, so that the server, after determining that the received terminal information matches one piece of the triggering condition information, obtains the information to be pushed corresponding to the matched triggering condition information, and sends the information to be pushed to the client terminal; and the pushing unit that pushes the information to be pushed to the user according to a designated method.

The present disclosure also provides a server, which includes:

a receiving unit that receives the terminal information sent by the client terminal;

a matching unit that matches the received terminal information with the triggering condition information;

an obtaining unit that, when the received terminal information matches one piece of the triggering condition information, obtains the information to be pushed corresponding to the matched triggering condition information; and a sending unit that sends the information to be pushed to the client terminal, so that the client terminal pushes the information to be pushed to the user according to a designated method.

The present disclosure also provides an information pushing system, including a client terminal and a server.

The server sends at least one piece of trigging condition information and the information to be pushed corresponding to the triggering condition information The client terminal matches the collected terminal information with the received triggering condition information, obtains the information to be pushed corresponding to the matched triggering condition information when the collected terminal information matches one piece of the received triggering condition information, and pushes the obtained information to be pushed to the user according to a designated method.

The present disclosure also provides a client terminal, which includes:

a collecting unit that collects the terminal information;

a matching unit that matches the collected terminal information with the triggering condition information;

an obtaining unit that obtains the information to be pushed corresponding to the matched triggering condition information when the collected terminal information matches one piece of the triggering condition information; and a pushing unit that pushes the obtained information to be pushed to the user according to a designated method.

The present disclosure also provides a server, which includes:

a sending unit that sends at least one piece of trigging condition information and the information to be pushed corresponding to the triggering condition information to the client terminal, sot that the client terminal, when determining that the collected terminal information matches one piece of the triggering condition information, obtains the information to be pushed corresponding to the matched triggering condition information and pushes the obtained information to be pushed to the user according to a designated method.

The present disclosure provides an information pushing method, system, client terminal, and server. In one technical solution, the server sends the trigger condition in the form of triggering condition information and the identification information corresponding to the information to be pushed to the client terminal. The client terminal determines whether to push the information to be pushed to the user according to the terminal information and pushes the identification information to the server so that the server pushes the information to be pushed corresponding to the identification information to the client terminal. The client terminal then pushes the information to be pushed to the user. Compared with the conventional techniques that the server pushes message on its own, the technical solution of the present disclosure considers the actual situation of the user, selects the timing that more suits the user to receive the information to be pushed, thereby making the information to be pushed convenient for the user to view and not to disturb the user.

In another technical solution of the present disclosure, the client terminal uploads the terminal information to the server. The server determines whether to push the information to be pushed to the user according to the terminal information, and pushes the information to be pushed to the client terminal, when needed, so that the client terminal pushes the information to be pushed to the user. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

In another technical solution of the present disclosure, the server sends the trigger condition in the form of triggering condition information and the information to be pushed to the client terminal so that the client terminal determines whether to push the information to be pushed to the user according to the terminal information. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

BRIEF DESCRIPTION OF THE DRAWINGS

In order to more clearly illustrate the technical solutions in the example embodiments of the present disclosure, the drawings are briefly introduced as follows. It is apparent that the drawings only describe some of the embodiments of the present disclosure. One of ordinary skill in the art may obtain other figures without using creative efforts.

DETAILED DESCRIPTION

Figure 1:
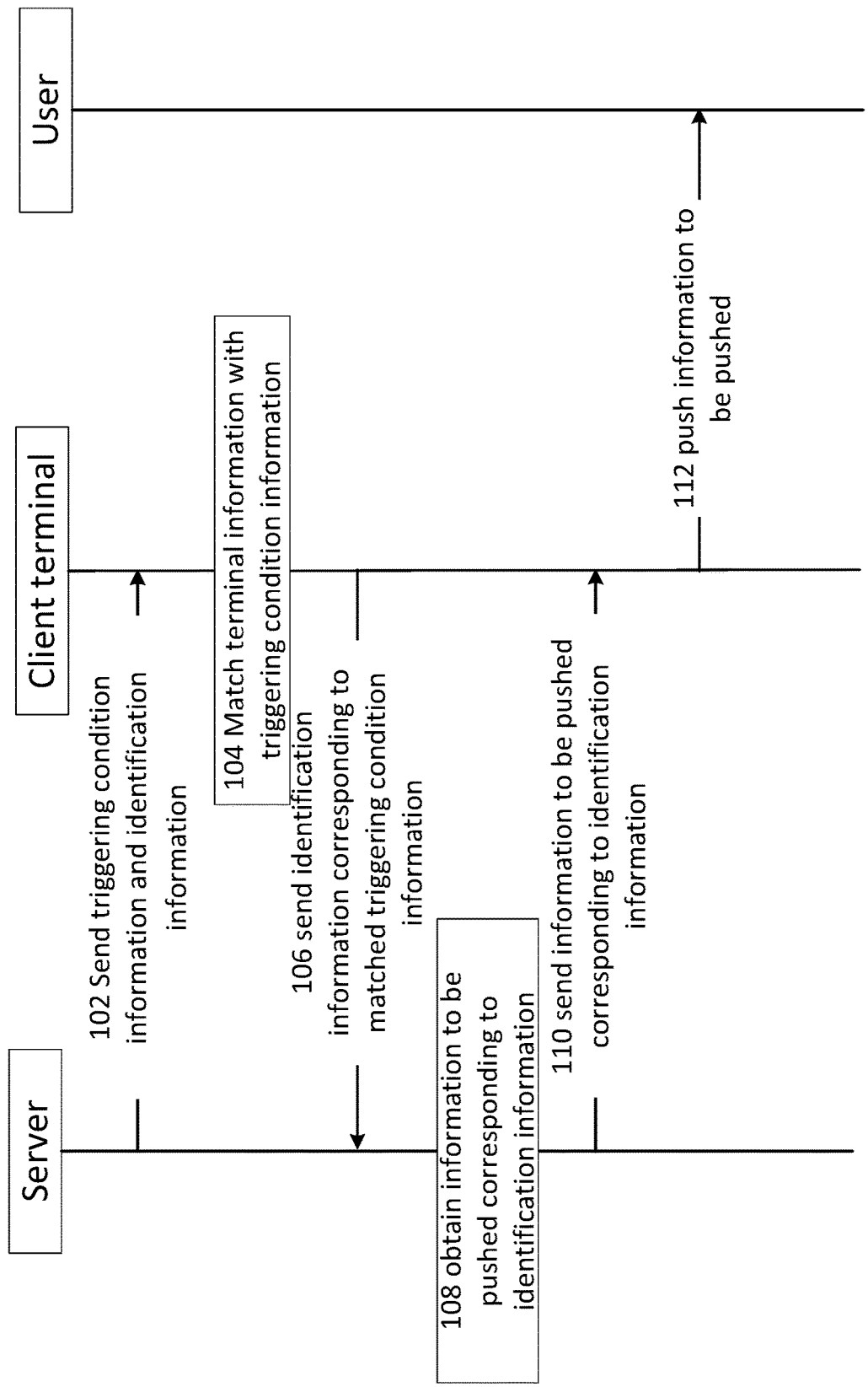
FIG. 1 is a flowchart of an example information pushing method according to an example embodiment of the present disclosure.

In conjunction with the following FIGs of the present disclosure, the technical solutions of the present disclosure will be described. Apparently, the described embodiments merely represent some of the embodiments of the present disclosure and are not to be construed as limiting the present disclosure. All other embodiments obtained by those of ordinary skill in the art based on the embodiments of the present disclosure fall within the scope of protection of the present disclosure.

The terminology used in the example embodiments of the present disclosure is used to describe particular example embodiments, and is not intended to limit the present disclosure. The singular form in the example embodiments and claims of the present disclosure also include the plurality forms, and vice versa, unless the context clearly indicates otherwise.

It should be noted that the term "and/or" describes a correlation relationship between the related objects, which may represent three types of relationships. For example, A and/or B may indicate A, B, and A and B. In addition, the symbol "/" indicates an alternative relationship between the former object and the latter object.

With respect to the problems of the inaccurate information to be pushed or improper pushing timing that the user can only passively receive the information to be pushed under the conventional techniques, the techniques of the present disclosure sense the situation or scenario of the user in real time to trigger information to be pushed.

Thus, the present disclosure provides several technical solutions.

A first technical solution is that the client terminal actively pull the information. That is, instead of that the client terminal is passively pushed the information under the conventional techniques, the client terminal actively pulls the information. The client terminal senses the situation or scenario that the user locates, and actively pulls the information to be pushed from the server only when the client terminal determines that it is the time to push the information to the user. Then the server sends the information to be pushed. The server does not actively push information on its own.

A second technical solution is that the server actively pushes the information. The client terminal uploads the information related to the user to the server so that the server analyzes the information to obtain the situation or scenario where the user locates. When the server determines that it is the time to push information to the user, the server pushes information to the client terminal.

A third technical solution is that the client terminal pushes information on its own. The server pushes the information to the client terminal. The client terminal senses the situation or scenario where the user locates. When the client terminal determines that it is the time to push information to the user, the client terminal displays the information to be pushed or pushes information to the user.

The client terminal may be a terminal configured with application programs or service components, such as a cell phone, a tablet, a personal computer, etc. The server may reside at the server side of the network and managed by the service provider. The communication between the client terminal and the server may use the communication integrated therein or use other communication methods, which are not limited by the present disclosure.

The present disclosure provides an example interaction of an information pushing method as shown in FIG. 1.

102, the server sends at least one piece of triggering condition information and the identification information corresponding to the triggering condition information to the client terminal.

The triggering condition information is conditional information that represents triggering conditions for information pushing corresponding to different types of terminal information. In other words, each triggering condition information records the conditions for different types of terminal information to trigger information pushing. A piece of triggering condition information may record one or more triggering conditions. An expression of the triggering condition may limit the range of designated parameter or the types of the designated parameter in the terminal information.

The terminal information may be attribute information, which may include position information, motion status information, operation system information, location information of the user, current time, the application software that the user is using, the list of installed application programs by the user, the remaining battery of the terminal, the network quality, etc.

The corresponding triggering conditions may be that the user at a designated location, that the current time is within a designated time period, that the user uses a designated software, that the user installs a software including a designated application program, when the remaining battery of the user is within a designated range, when the network quality is within a designated range, etc. With respect to the setup of the types of the terminal information the particular parameters to be collected, and the related triggering condition, they may be set up according to the actual situations, to which the present disclosure only proves some example solutions and does not impose limitation.

The identification information identifies various information to be pushed, such as 1, 2, 3, 4, . . . , a, b, c, d, etc. The setup of the identification is to facilitate to find and search information. A single identification information may correspond to one piece of triggering condition information or multiple triggering condition information.

The information to be pushed may be reminder information, advertisement information, notice information, etc., such as "please keep warm," "less electricity," "please visit website . . . ," "The weather is becoming cold, please shop your coats at website . . . "

The related illustration of explanation of the same parameters may be referred to above description, which are not detailed herein.

104, the client terminal matches the collected terminal information with the received triggering condition information.

106, when the collected terminal information matches at least one piece of triggering condition information of the received triggering condition information, the client terminal sends the identification information corresponding to the matched triggering condition information to the server.

108, the server obtains the information to be pushed corresponding to the identification information.

110, the server sends the information to be pushed corresponding information to the identification information to the client terminal.

112, the client terminal pushes the information to be pushed to the user according to a designated method.

In this example embodiment, the server sends the triggering condition to the client terminal in the form of triggering condition information, and sends the identification information corresponding to the information to be pushed as well. Thus, the client terminal determines whether to push the information to be pushed to the user according to the terminal information, and pushes the identification to the server when the pushing is needed. The server sends the information to be pushed to the client terminal according to the identification information so that the client terminal may push the information to be pushed to the user. Compared with the conventional techniques that the server pushes information on its own, the example method of the present disclosure considers the actual situation of the user, selects the timing that the user needs to receive the information to be pushed, thereby making the information to be pushed more favorable for the user to view and not to interfere with the user.

Figure 2:
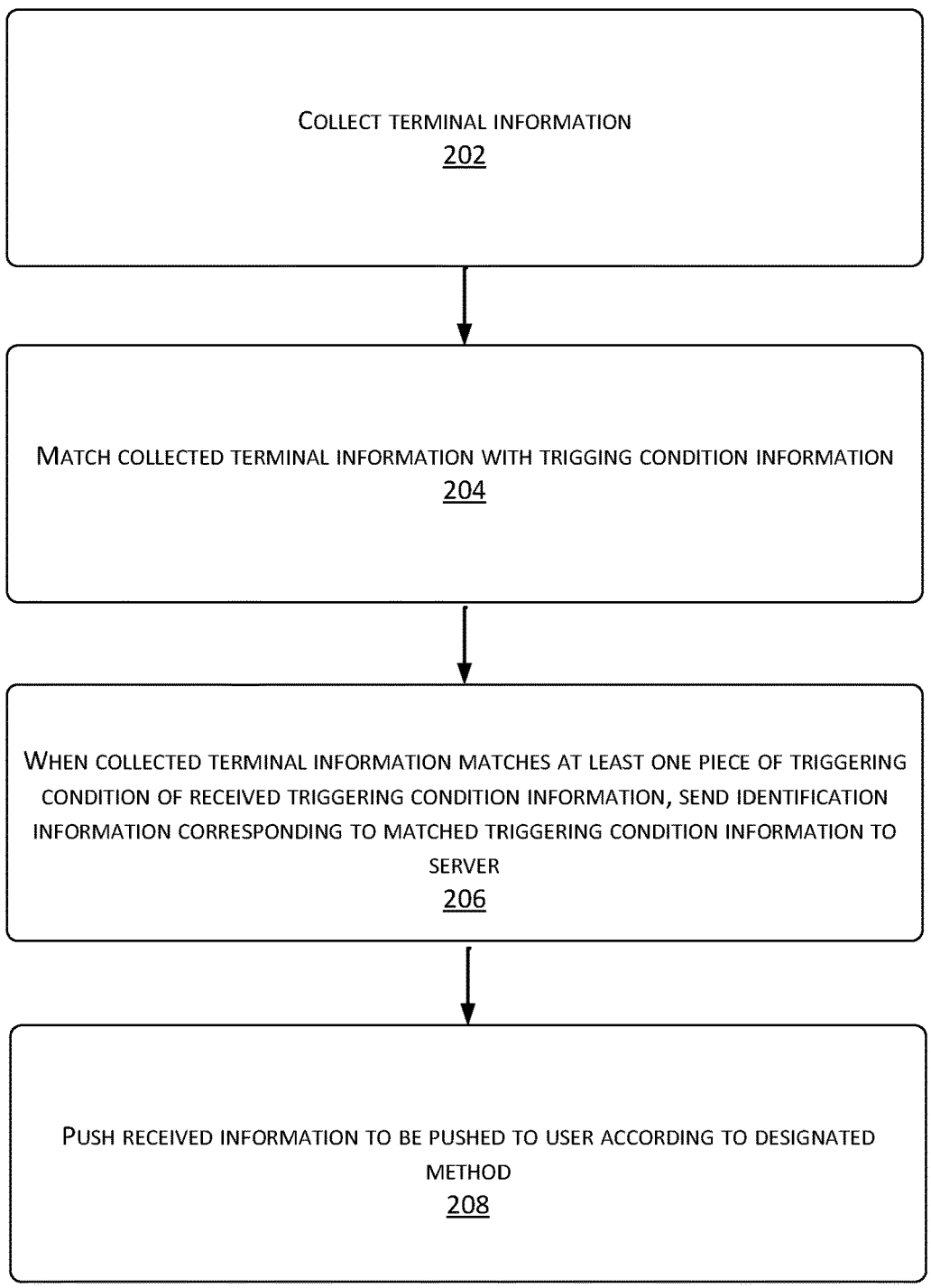
FIG. 2 is a flowchart of an example information pushing method applicable at a client terminal according to an example embodiment of the present disclosure.

Based on the above overall process, the present disclosure also provides a flowchart of an example method applicable at the client terminal as shown in FIG. 2, which includes:

202, collecting terminal information;

204, matching the collected terminal information with the triggering condition information;

206, when the collected terminal information matches one piece of triggering condition of the received triggering condition information, sending the identification information corresponding to the matched triggering condition information to the server, so that the server, responding to the received identification information, sends the information to be pushed corresponding to the identification information to the client terminal; and 208, pushing the received information to be pushed to the user according to a designated method.

Figure 3:
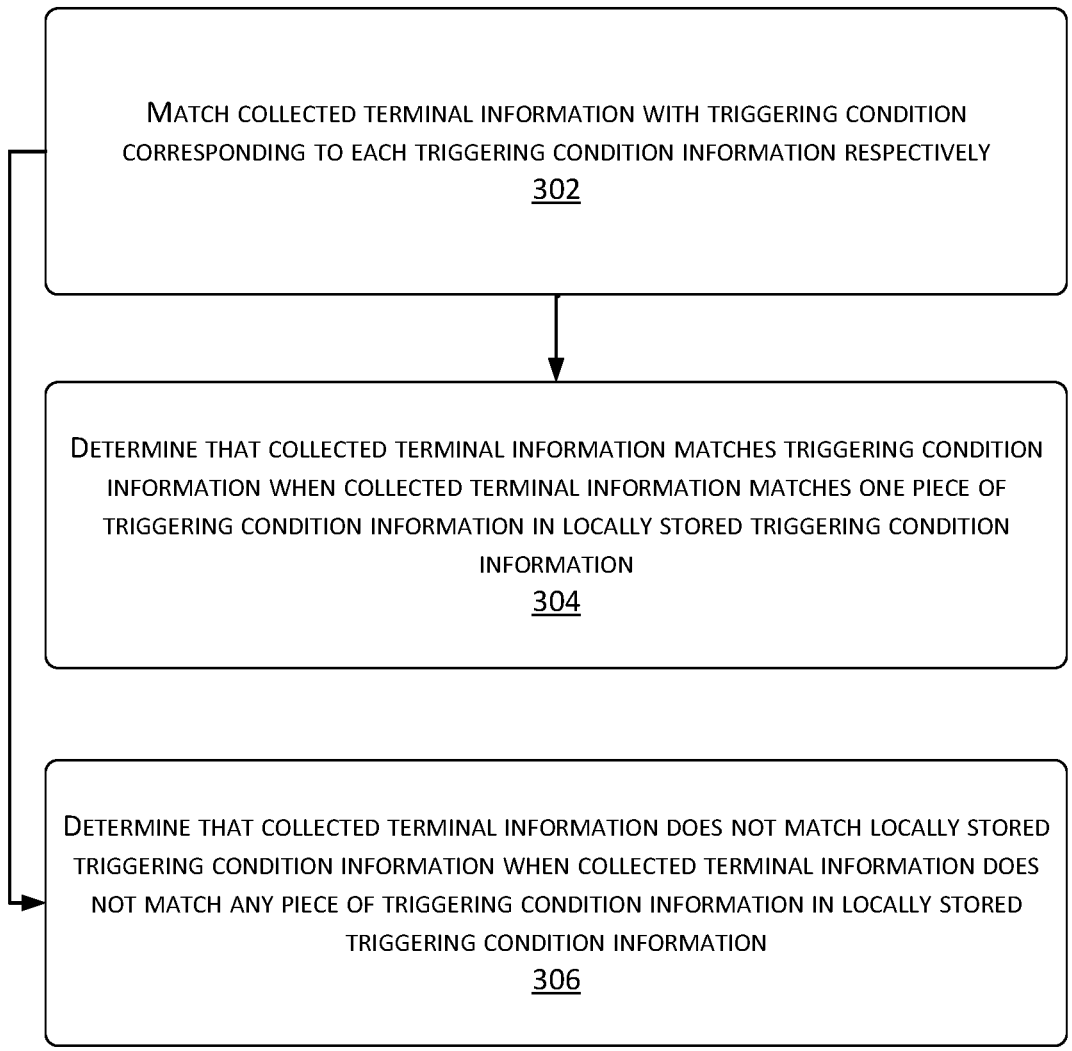
FIG. 3 is a flowchart of another example information pushing method applicable at a client terminal according to an example embodiment of the present disclosure.

With respect to implementation of 204, the present disclosure also provides an example implementation, as shown in FIG. 3, which includes:

302, the collected terminal information is matched with the triggering condition corresponding to each triggering condition information respectively. When the collected terminal information matches one piece of triggering condition of the received triggering condition information, operations at 304 are implemented. When the collected terminal information does not match any triggering condition of the triggering condition information, operations at 306 are implemented.

It should be noted that, during the process matching the terminal information with the triggering condition in a single piece of triggering condition information, if the triggering condition only defines one type of terminal information, then the triggering condition is triggered as long as the corresponding type of parameter in the terminal information is satisfied, which is not related to other parameters; however, if the triggering condition defines multiple types of terminal information, then the multiple corresponding types of parameters in the terminal information need to be satisfied concurrently.

For example, the matching process is comparing whether the types of the parameters in the terminal information match the types defined by the triggering condition, or the value range of the parameter meets the value range defined by the triggering condition.

For example, the matching process may be one by one comparison. That is, the various parameters in the terminal information are compared with the various triggering conditions in the triggering condition information one by one. When the terminal information satisfies one triggering condition, the next triggering condition is compared until the terminal information satisfies all triggering conditions, which determines that the terminal information satisfies the triggering condition information. For another example, the matching process may also be concurrent. That is, the various parameters in the terminal information are compared with the various triggering conditions in the triggering condition concurrently. All determination results of the triggering conditions are aggregated to determine a matching result between the terminal information and the triggering condition information.

For example, when the terminal information satisfies multiple pieces of triggering condition information, the transmission of multiple information to be pushed may be triggered. Alternatively, one or more of the information to be pushed may be communicated according to the rule set based on actual needs.

304, the collected terminal information is determined to match the triggering condition information when the collected terminal information matches one piece of triggering condition information in the locally stored triggering condition information.

306, the collected terminal information determined not to match the triggering condition information when the collected terminal information does not match any piece of triggering condition information in the locally stored triggering condition information.

With respect to the content included in the information to be pushed, the present disclosure provides two example implementations. One is to push the actual contents. That is, the information is not amended and directly pushed to the user. The other is to use the information template. That is, other information needs to be input into the information template to obtain the content to be pushed or presented. Based on such description, the present disclosure provides two example implementations to implement operations at 208.

A first example implementation: when the information to be pushed is the actual content to be pushed, the received information to be pushed is directly pushed to the user. For example, the pushing content may be information related to advertisement, time reminder, battery reminder, etc.

A second example implementation: when the information to be pushed is the information template, the pushing content is generated according to the received information to be pushed and the terminal information, and the newly generated pushing content is pushed to the user.

For example, the information template is "You have install game [game name]. Please log in www.Abc.com to download more games." The [game name] is the information to be filled in. The content to be pushed may be the information to be pushed sent after the user installs a particular game. After the client terminal receives the information template returned by the server, the client terminal will fill in the information template according to the name of the particular game, and send the pushing content after filling in to the user.

After the pushing content to be pushed to the user is determined, there are many ways to present it to the user. For example, the pushing content is displayed at a notice bar. Alternatively, a separate reminder box is popped out to display the pushing content. Meanwhile, ring or vibration may be used to remind the user to view. For example, if there are multiple information to be pushed to be pushed, only information with high priority is sent. Alternatively, the multiple information is pushed to the user one by one with a preset time interval between information. The above described content is illustrative, to which the present disclosure does not impose restriction.

Figure 4:
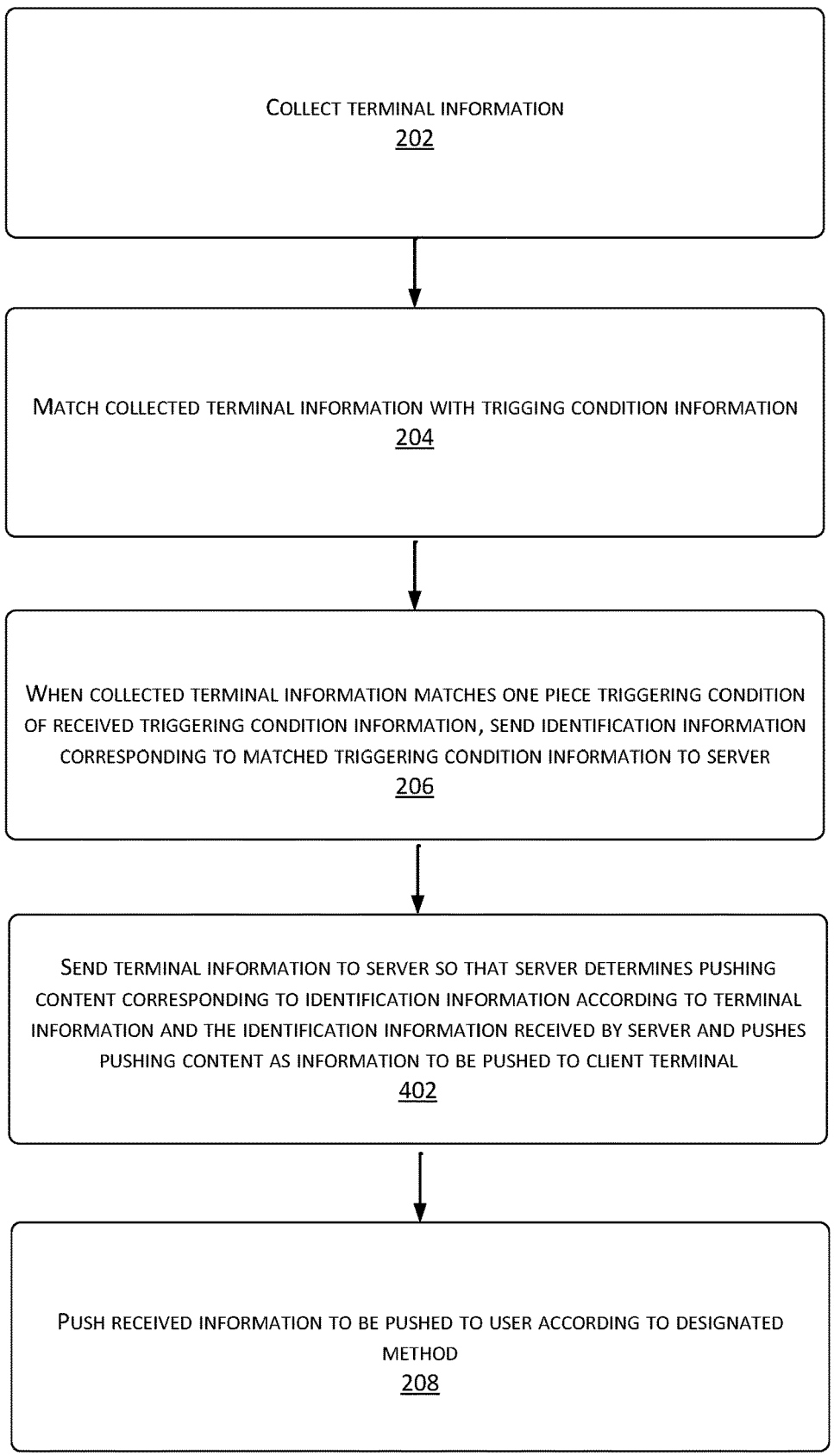
FIG. 4 is a flowchart of another example information pushing method applicable at a client terminal according to an example embodiment of the present disclosure.

The above second example implementation is that the client terminal fills in the information template sent by the server. Alternatively, the client terminal may send the terminal information to the server, the server fills in the information template and pushes the pushing content after filling in to the terminal. Thus, prior to 208, operations at 402 are performed to complete the submission of the terminal information. The example process is shown in FIG. 4, which includes:

402, the terminal information is sent to the server so that the server determines the pushing content corresponding to the identification information according to the terminal information and the identification information received by the server and pushes the pushing content as the information to be pushed to the client terminal.

Figure 5:
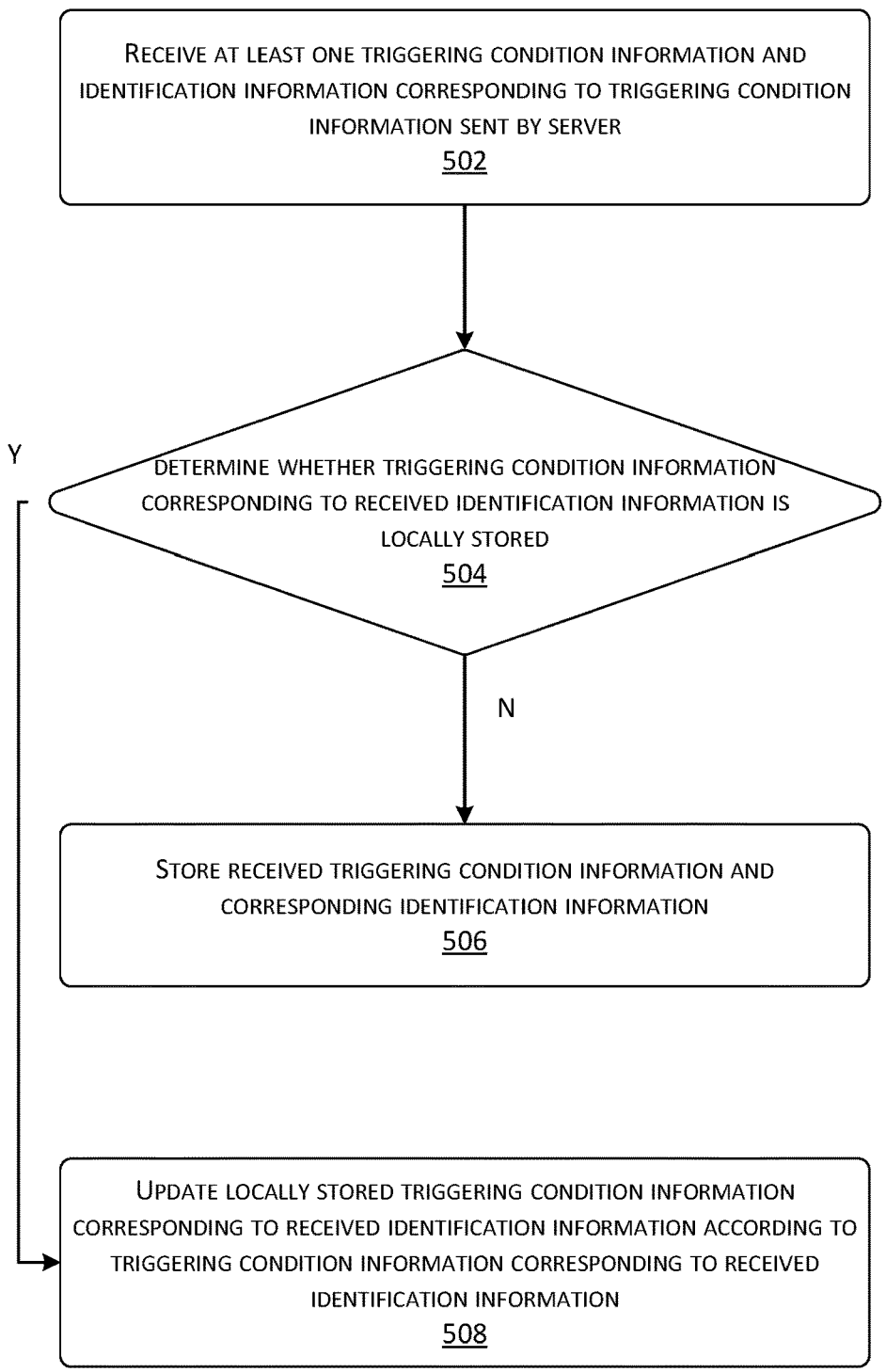
FIG. 5 a flowchart of another example information pushing method applicable at a client terminal according to an example embodiment of the present disclosure.

As the triggering condition information and the corresponding identification information at the client terminal are generally transmitted by the server, prior to 204, the example process as shown in FIG. 5, which includes:

502, the client terminal receives at least one piece of triggering condition information and the identification information corresponding to the identification information.

The triggering condition information and the identification information received by the client terminal are generally in pairs. When the client terminal determines that the terminal information matches particular piece of triggering condition information, the corresponding identification information is obtained. Certainly, according to actual situation, the same identification information may correspond to multiple triggering condition information (that is, the same information to be pushed may be used in multiple scenarios). Then the triggering condition information and the identification may be sent in one group, or sent in multiple pairs, to which the present disclosure does not impose restriction.

504, the client terminal determines whether the triggering condition information corresponding to the received identification information is locally stored. When the triggering condition information n corresponding to the received identification information is not locally stored, operations at 506 are performed, otherwise, operations at 508 are performed.

506, the received triggering condition information and the corresponding identification information are stored.

508, the locally stored triggering condition information corresponding to the received identification information is updated according to the identified triggering condition information corresponding to the received identification information.

The updating may include deleting the original triggering condition information, storing the newly received triggering condition information, or both.

The triggering condition information and the identification information may be sent from the server to the client terminal in group or pair. The client terminal also stores them in group or pair. For illustration, the present disclosure provides Table 1 as an example to illustrate the corresponding relationship between the triggering condition information and the identification information. Table 1 reflects an example corresponding relationship between the triggering condition information and the identification information and identifies the information to be pushed corresponding to the identification information respectively. Certainly, any configuration that represents the storage method and format of the above corresponding relationship and the triggering condition and the information to be pushed may be applied herein, to which the present disclosure does not impose restriction.

TABLE 1

Corresponding Relationship Between Triggering Condition Information, Identification Information, and Information to be pushed

| Triggering Condition Information | Identification Information | Information to be pushed |
|---|---|---|
| (The current system time is between 6:00 and 9:00 working day) and (the current location is home) | 1 | Please pay attention to weather before leaving for work |
| (There is an installation of game application) and (the current network is Wi-Fi) | 2 | You already install game {game name}. For more games, please log in www.abc.com |
| ... | ... | ... |
| (The current system date is $1^{st}$ day) | 100 | Please pay your credit card dues |
| ... | ... | ... |

Figure 6:
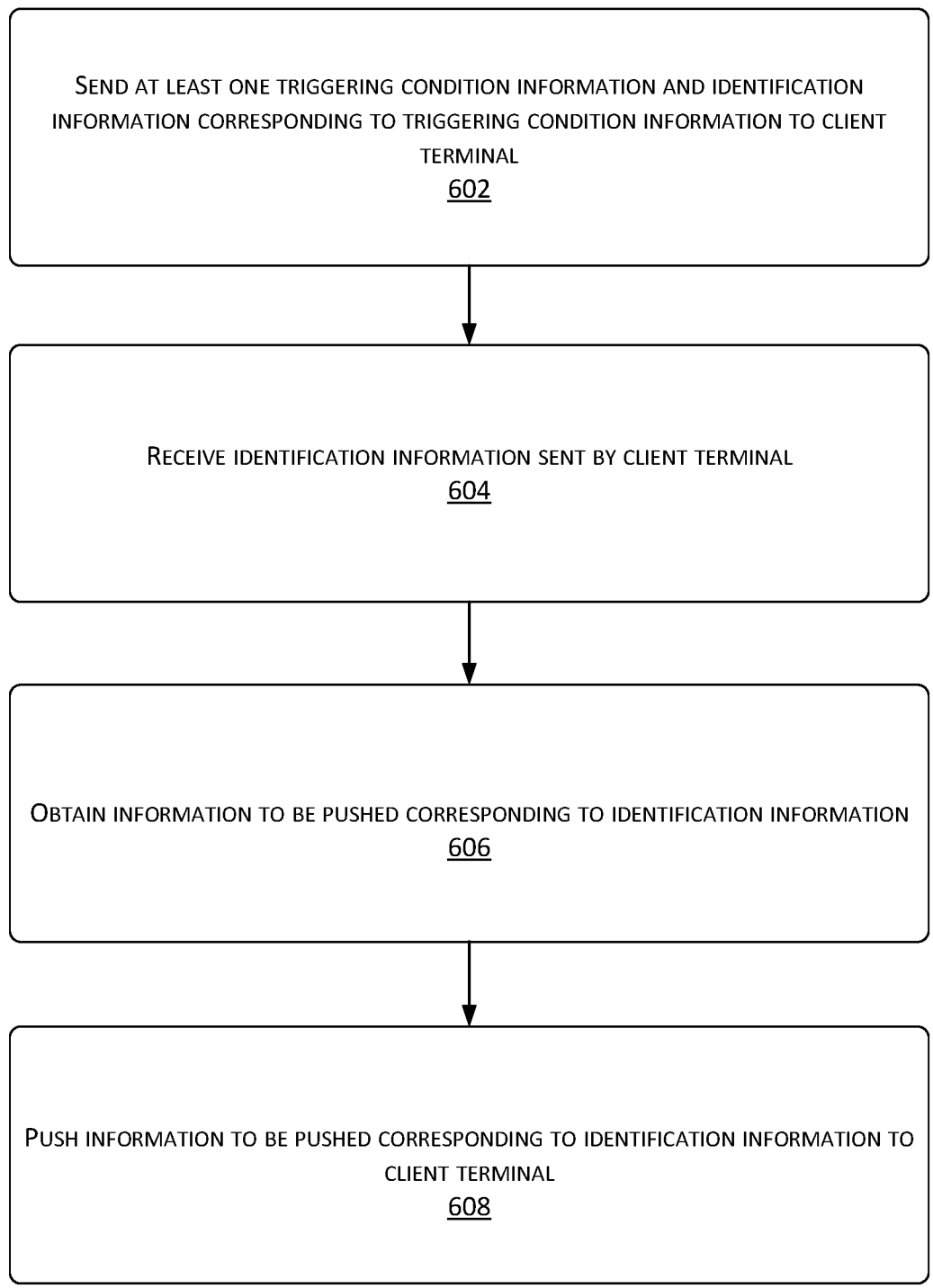
FIG. 6 is a flowchart of an example information pushing method applicable at a server according to an example embodiment of the present disclosure.

As shown in Table 1, in this example method, the content received by the client terminal generally includes a corresponding relationship between the triggering condition information and the identification information. Meanwhile, the corresponding relationship between the triggering condition information and the identification information is maintained. The server needs to maintain the relationship among the triggering condition information, the identification information, and the information to be pushed. Cooperating with the client terminal, the present disclosure also provides a process applied at the server side, as shown in FIG. 6, which includes:

602, the server sends at least one piece of triggering condition information and the identification information corresponding to the triggering condition information to the client terminal so that the client terminal, after determining that the collected terminal information matches one piece of triggering condition information from the at least one piece of triggering condition information, sends the identification information corresponding to the matched triggering condition information to the server.

For example, the triggering condition information and the identification information corresponding to the triggering condition information sent to the client terminal may be all the triggering condition information and the identification information already configured at the server, or a portion thereof, to which the present disclosure does not impose restriction.

For example, to adjust the corresponding relationship between the triggering condition information and the identification information subsequently, each triggering condition information may be configured with corresponding triggering identification information to facilitate search.

604, the server receives the identification information.

606, the server obtains the information to be pushed corresponding to the identification information.

608, the server sends the information to be pushed corresponding to the identification information to the client terminal so that the client terminal, after receiving the information to be pushed, sends the received information to be pushed to the user according to a designated method.

With respect to 606, the present disclosure provides two example implementations. The first example implementation is that the server searches stored information to be pushed. The second example implementation at 606 corresponding to the second example implementation at 208 that requires the server to fill in the searched information template by reference to the terminal information to generate the information to be pushed to be sent to the client terminal.

Figure 7:
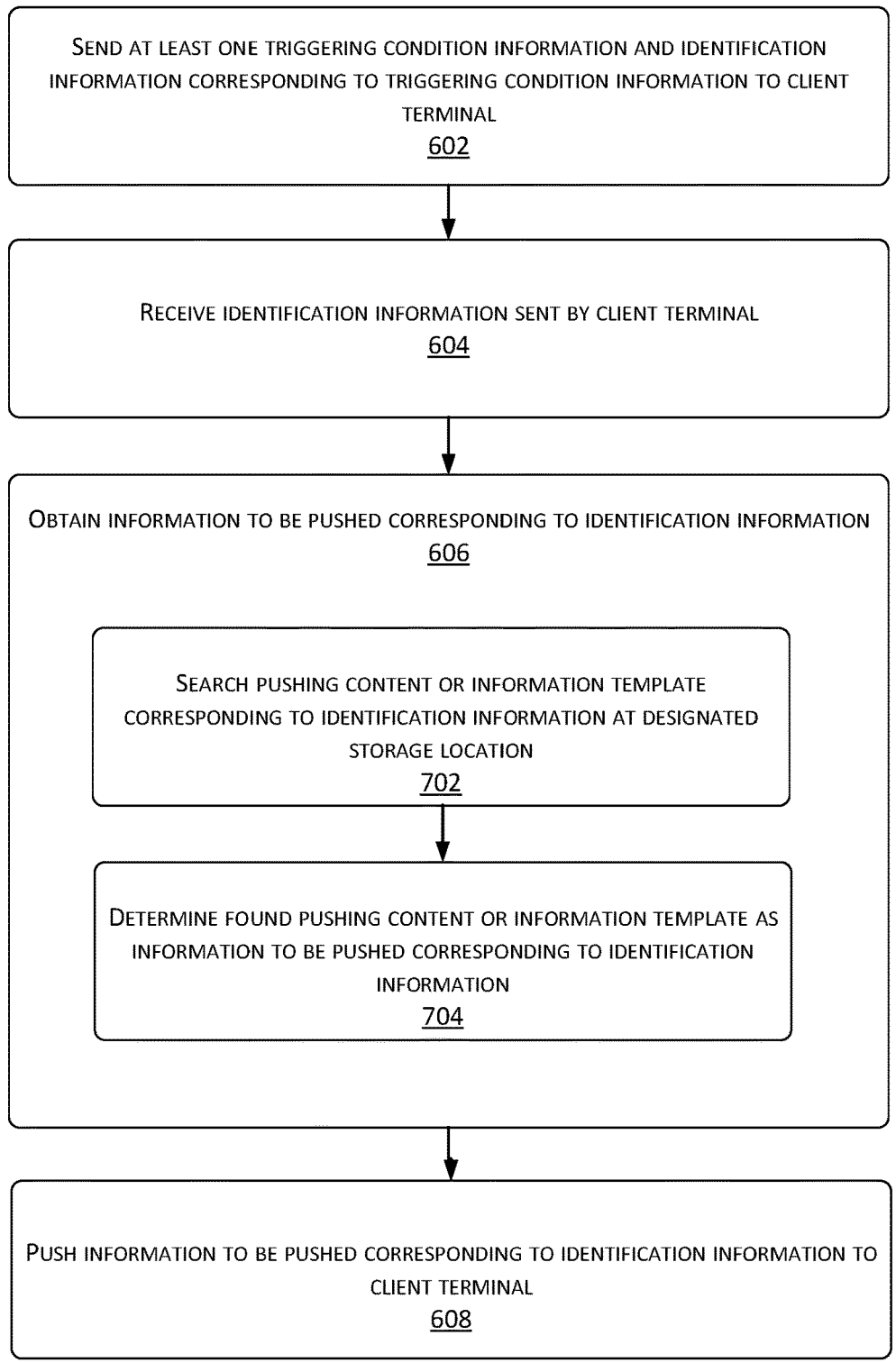
FIG. 7 is a flowchart of another example information pushing method applicable at a server according to an example embodiment of the present disclosure.
Figure 8:
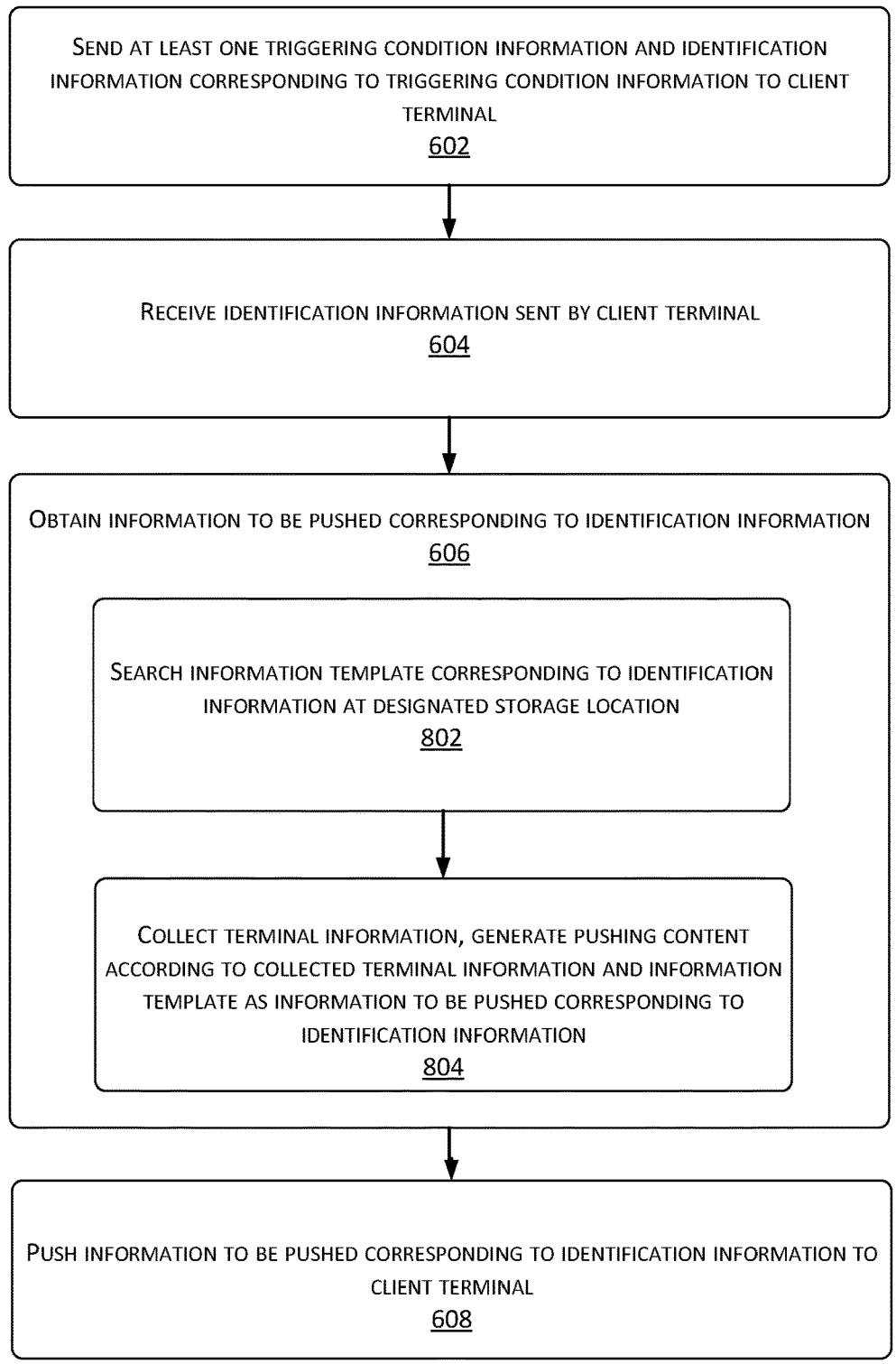
FIG. 8 is a flowchart of another example information pushing method applicable at a server according to an example embodiment of the present disclosure.

For example, the first example implementation is shown in FIG. 7, which includes:

702, the server searches for the pushing content or information template corresponding to the identification information at a designated storage location.

The designated storage location is a storage device at the server end, which may include a storage device that is included in the server, or a storage device that is accessible by the server and is not integrated into the server.

The identification information generally corresponds to an pushing content or an information template. If one identification information is set to correspond not only the pushing content but also the information template, one of the two may be selected according to actual need.

704, the server determines the found pushing content or information template as the information to be pushed corresponding to the identification information.

For example, the second example implementation is shown in FIG. 7, which includes:

802, the server searches for the information template corresponding to the identification information at the designated storage location.

804, the server collects the terminal information and generates the pushing content according to the collected terminal information and the information template as the information to be pushed corresponding to the identification information.

Further, according to the source of the triggering condition information and the identification information at the server end, the present disclosure also provides two example implementations.

A first example implementation is to receive a preset corresponding relationship between the triggering information condition and the identification information.

A second example implementation is to collect the historical behavior data and preference data of the user and create a new corresponding relationship between the triggering condition information and the identification information according to the historical behavior data and the preference data; or update the existing corresponding relationship between the triggering condition information and the identification information.

In the first example implementation, the corresponding relationship is passive receiving that in general the administrator of the server writes the corresponding relationship into the server or other device inputs the corresponding relationship into the server. In the second example implementation, the corresponding relationship is actively generated by the server. The server may self-adjust the corresponding relationship of the same type of users according to the existing corresponding relationships between the triggering condition information and the identification information of the same types of users. The server analyzes the historical behavior data and the preference data of the user to establish the model, and completes setting of the corresponding relationship between the triggering condition information and the identification information through model training and learning.

The present disclosure does not impose on the timing of the above two example implementations, which may be configured according to the actual needs.

For example, the historical behavior data and the preference data may be collected by the server. The historical behavior data and the preference data may be uploaded by the client terminal to the server. Alternatively, the server may send upload reminder to the client terminal periodically to trigger the client terminal to collect and upload data.

Figure 9:
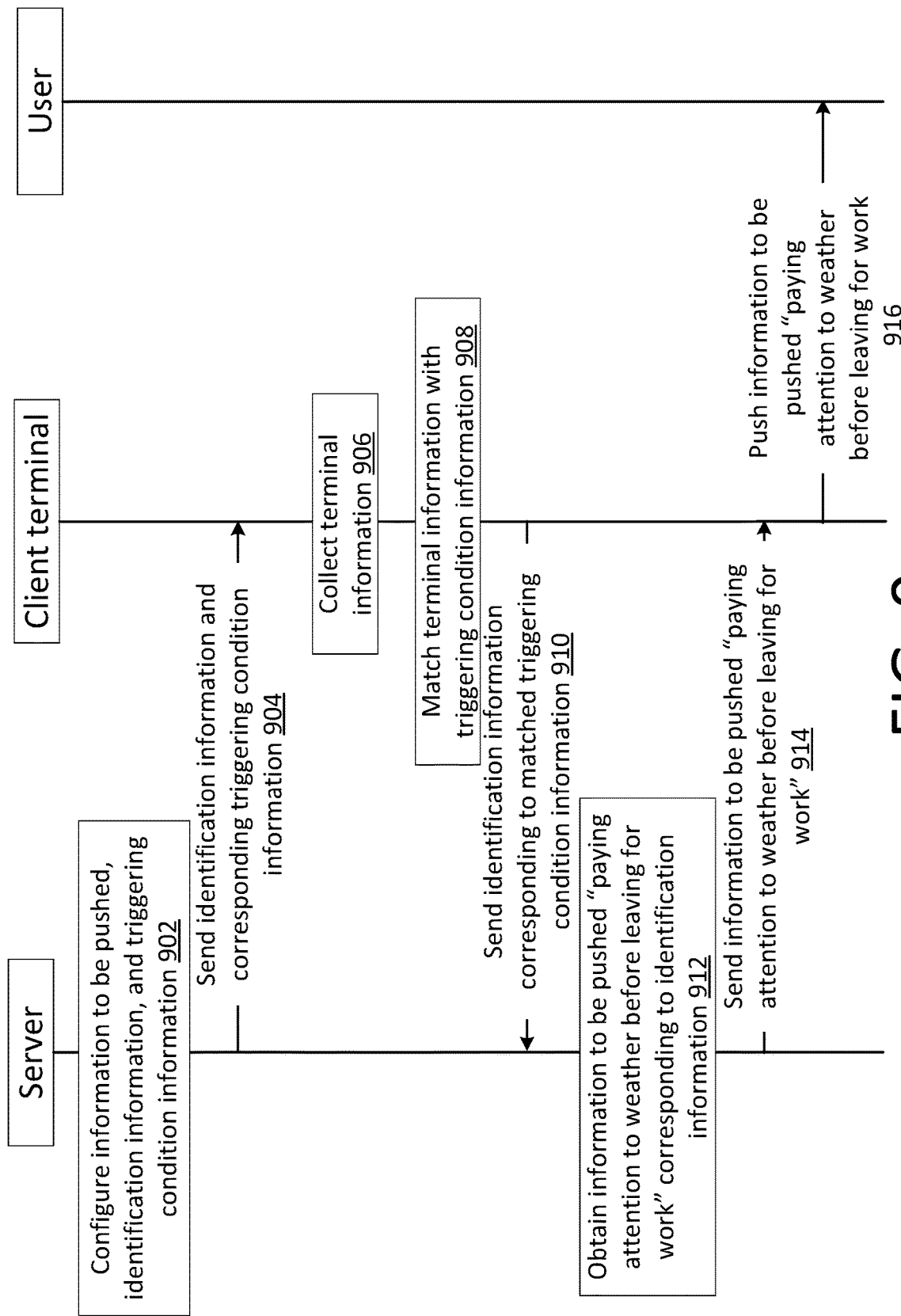
FIG. 9 is a diagram of an example scenario according to an example embodiment of the present disclosure.

The above description is the description of the first example method. To facilitate understanding, the present disclosure, by reference to examples, describes the overall process interaction, as shown in FIG. 9, which includes:

902, the server introduces from external sources or generates 100 pieces of information to be pushed. The corresponding identification information is 1-100 respectively. The server also configures 60 pieces of triggering condition information, and the corresponding relationships between the 60 pieces of triggering condition information and the 100 identification information.

For the convenience of description, it is assumed that the corresponding relationship includes identification information 1<=>triggering condition information 1, identification information 2<=>triggering condition information 2, etc.

904, the sever sends the identification information and their corresponding triggering condition information to the client terminal.

906, the client terminal collects the terminal information.

908, the client terminal matches the collected terminal information with each triggering condition information.

When the collected terminal information includes that the current system time is 8:00 a.m. Monday and the current location is home, and the triggering condition information 1 indicates that the current system time is 6:00-9:00 business day and the current location home, it indicates that the terminal information matches the triggering condition information 1.

910, when the terminal information matches the triggering condition information 1, the client terminal sends the identification information 1 to the server.

912, the server receives the identification information 1 submitted by the client terminal, and obtains the corresponding information to be pushed. For example, the information to be pushed is "paying attention to weather before leaving for work."

914, the server pushes the obtained information to be pushed to the client terminal.

916, the client terminal, after receiving the information to be pushed, displaying the information to be pushed at a prompt box to be presented to the user.

Figure 10:
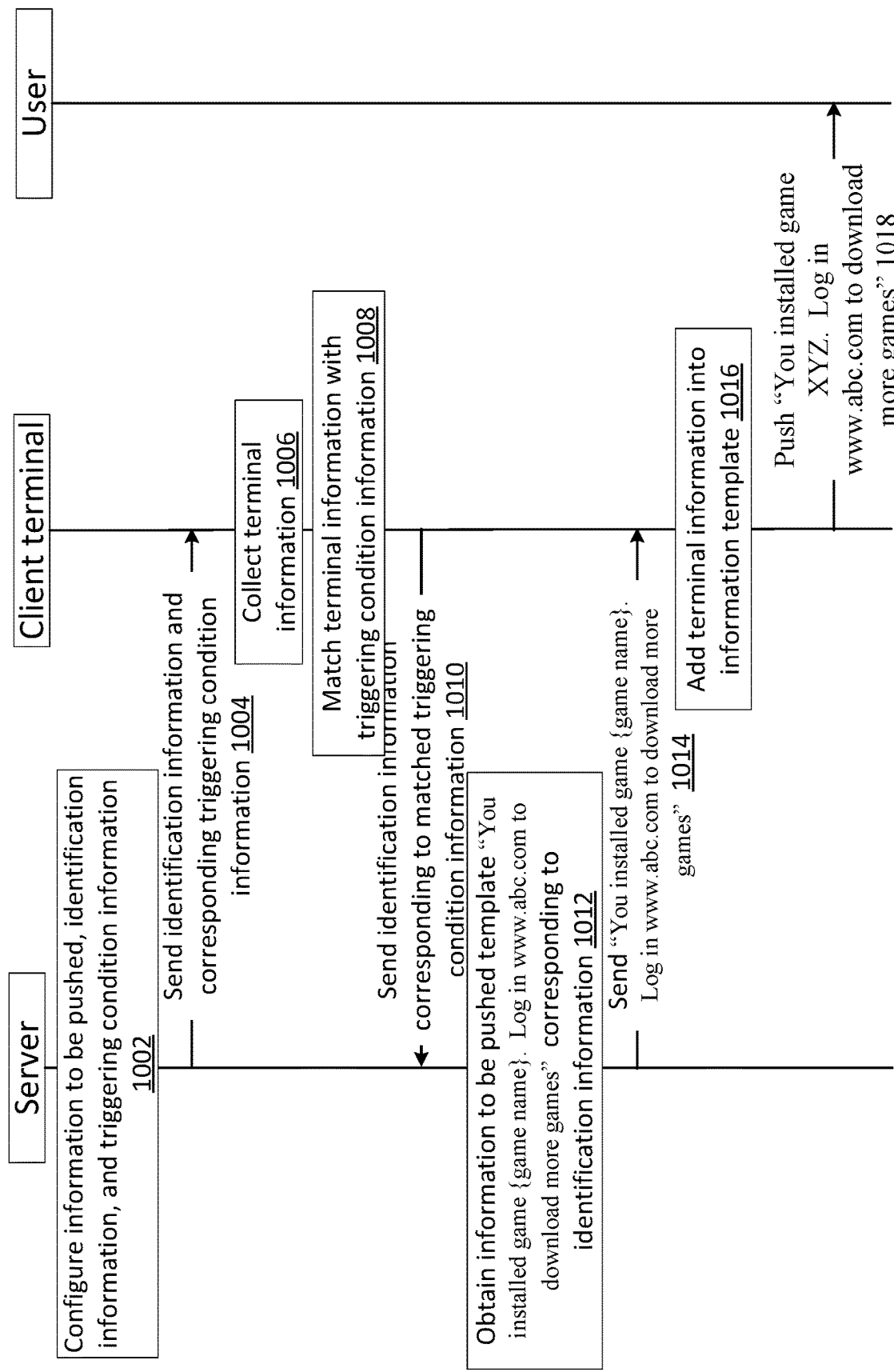
FIG. 10 is a diagram of another example scenario according to an example embodiment of the present disclosure.

With respect to the implementation of the first example method, the present disclosure also provides another example implementation, as shown in FIG. 10, which includes:

1002, the server introduces from external sources or generates 100 pieces of information to be pushed. The corresponding identification information is 1-100 respectively. The server also configures 60 pieces of triggering condition information, and the corresponding relationships between the 60 pieces of triggering condition information and the 100 identification information.

For the convenience of description, it is assumed that the corresponding relationship includes identification information 1<=>triggering condition information 3, identification information 4<=>triggering condition information 5, etc.

1004, the sever sends the identification information and their corresponding triggering condition information to the client terminal.

1006, the client terminal collects the terminal information.

1008, the client terminal matches the collected terminal information with each triggering condition information.

When the collected terminal information includes that the currently installed game application is game A the current network is Wi-Fi, and the triggering condition information 5 indicates that there exists the installation of game application and the current network is Wi-Fi, it indicates that the terminal information matches the triggering condition information 5.

1010, when the terminal information matches the triggering condition information 5, the client terminal sends the identification information 4 to the server.

1012, the server receives the identification information 4 submitted by the client terminal, and obtains the corresponding information to be pushed. For example, the information to be pushed is the information template "You installed game (game name). Log in www.abc.com to download more games."

1014, the server sends the obtained information to be pushed "You installed game {game name}. Log in www.abc.com to download more games" to the client terminal.

1016, the client terminal adds the game name XYZ of the game A to the information template according to the collected terminal information, and generates the actual information to be pushed "You installed game XYZ. Log in www.abc.com to download more games."

1018, the client terminal, after receiving the information to be pushed, displaying the information to be pushed "You installed game {game name}. Log in www.abc.com to download more games" at the notification bar to be presented to the user.

For example, when operations at 1012 are performed, the client terminal also sends the terminal information (such as the game name XYZ) together with the identification information 4 to the server. The server fills in the information template corresponding to the identification information 4 and generates the actual information to be pushed "You installed game {game name}. Log in www.abc.com to download more games." At 1014, the server will then directly push the actual information to be pushed to the client terminal and the client terminal directly performs operations at 1018.

The above descriptions describe the first example method (the client terminal actively pulls). The following describes with reference to the second example method (the server actively pushes). With respect to parameters or operations that are same as those in the first example method, the relevant portions may refer to the above, which are not detailed herein.

Figure 11:
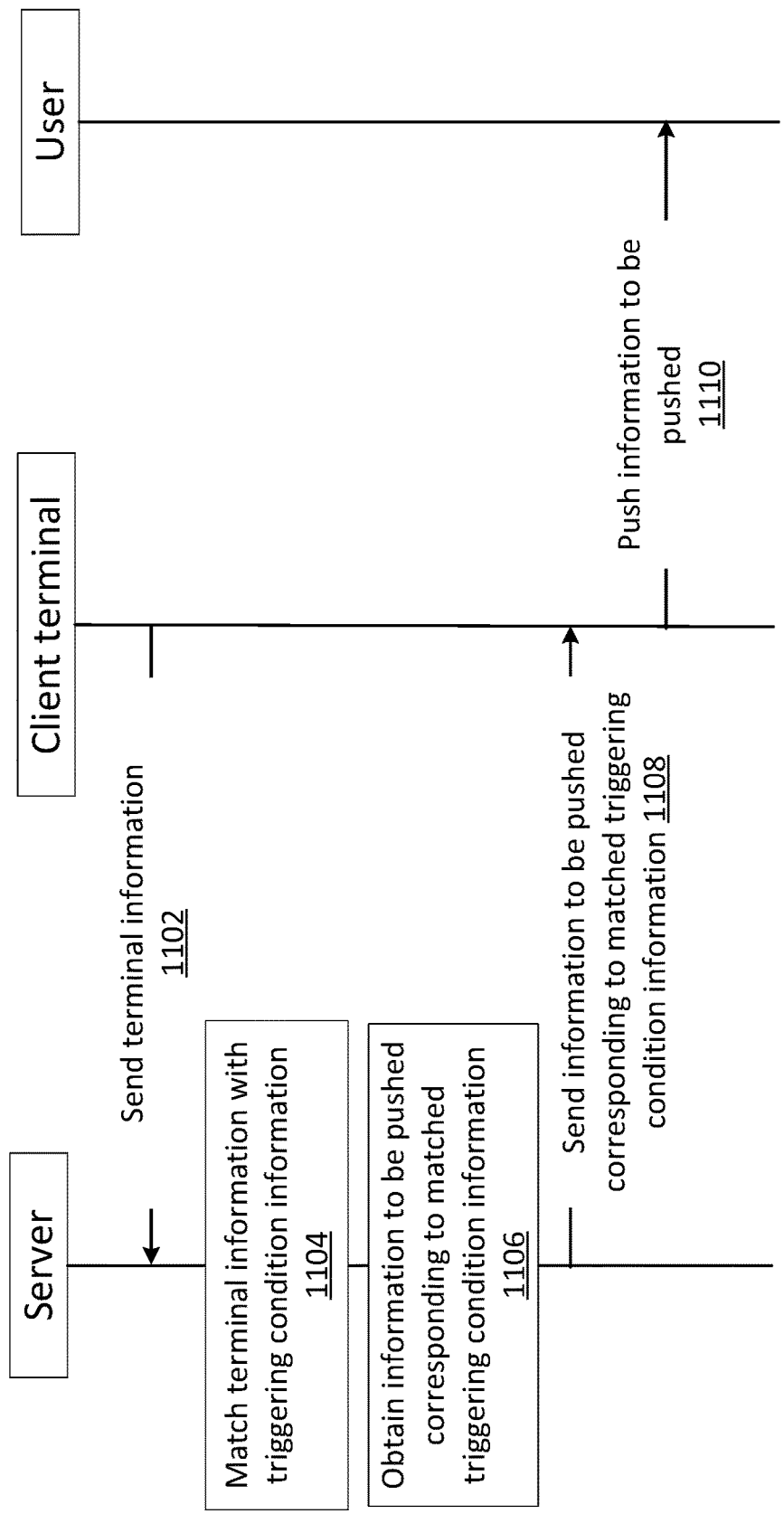
FIG. 11 is a diagram of interaction of an example information pushing method according to an example embodiment of the present disclosure.

With respect to the description of the second example method, the overall interaction process of the information pushing method may be shown as in FIG. 11, which includes:

1102, the client terminal sends the collected terminal information to the server.

1104, the server matches the received terminal information with the triggering condition information.

1106, when the received terminal information matches at least one piece of triggering condition information of the triggering condition information, the sever obtains the information to be pushed corresponding to the matched triggering condition information.

1108, the server sends the information to be pushed to the client terminal.

1110, the client terminal pushes the information to be pushed to the user according to a designated method.

The performing entity in the second example method is apparently different from it in the first example method. The information to be pushed may be determined according to the triggering condition information and no identification information is necessary. Certainly, to facilitate search at the server, the identification information may be used to search, to which the present disclosure does not impose restriction.

In this implementation, the client terminal sends the terminal information to the server so that the server may determine whether to push the information to be pushed to the user according to the terminal information, and pushes the information to be pushed to the client terminal to facilitate the client terminal to push to the user. Compared with the conventional techniques that the server pushes information on its own, the method of the preset disclosure takes the actual situation of the user into consideration, suits the timing that the user needs to receive the information to be pushed more timely, so that the information to be pushed is more likely to be viewed by the user and not interfere with the user.

Figure 12:
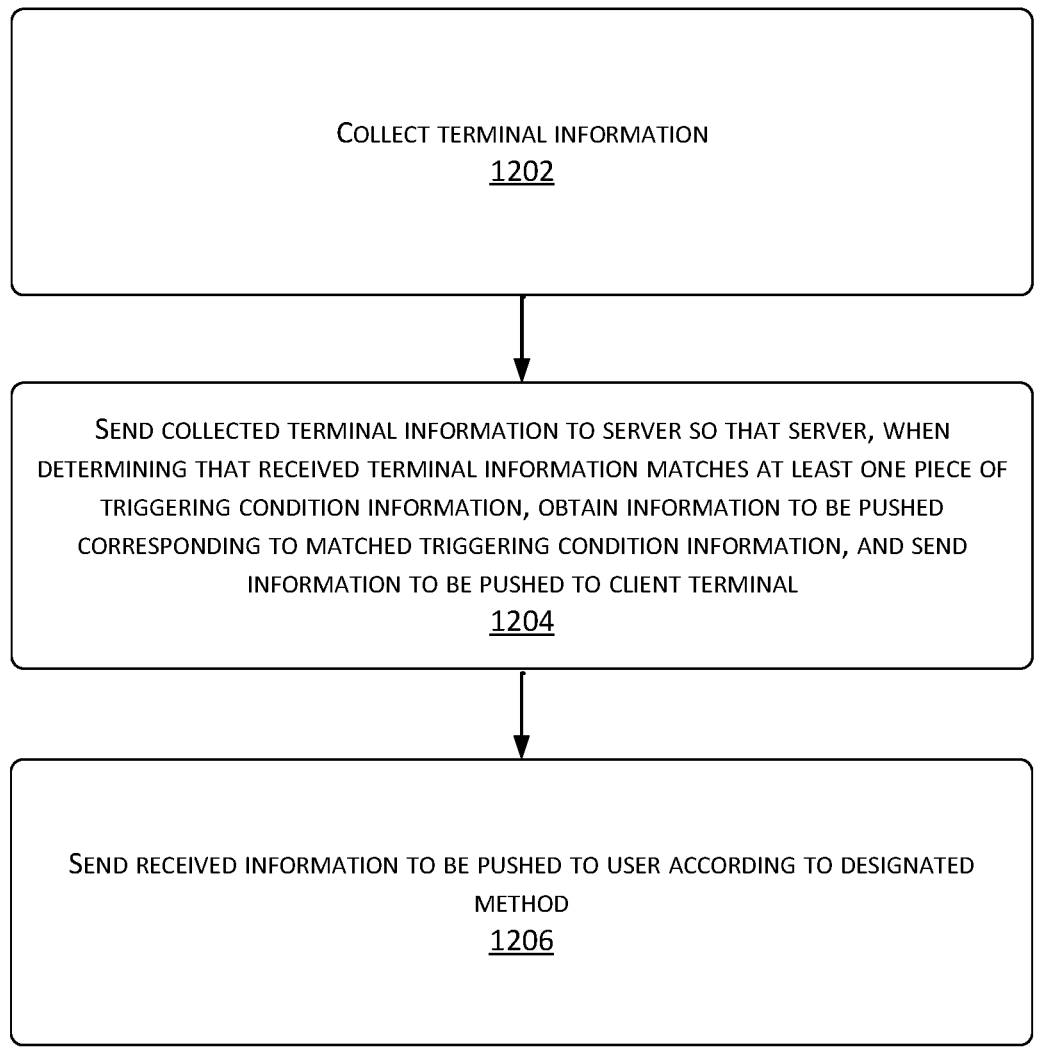
FIG. 12 is a diagram of an example information pushing method applicable at a client terminal according to an example embodiment of the present disclosure.

Based on the above overall process, the present disclosure also provides a method or process applied at the client terminal as shown in FIG. 12, as an example, which includes:

1202, the client terminal collects the terminal information.

1204, the client terminal sends the collected terminal information to the server so that the server, when determining that the received terminal information matches at least one piece of triggering condition information, obtains the information to be pushed corresponding to the matched triggering condition information, and sends the information to be pushed to the client terminal.

1206, the client terminal sends the received information to be pushed to the user according to a designated method.

With respect to the content included in the information to be pushed, the present disclosure provides two feasible implementations. One is pushing content, which refers to the information that does not need modification and may be directly pushed to the user. The other is the information template, which refers that some other information needs to be filled in the information template to obtain the pushing content. Based on such description, the present disclosure provides two feasible implementations for operations at 706, which include:

A first example implementation: when the information to be pushed is pushing content, the received information to be pushed is directly pushed to the user.

A second example implementation: when the information to be pushed is information template, the pushing content is generated according to the received information template and the terminal information, and the generated pushing content is pushed to the user.

Figure 13:
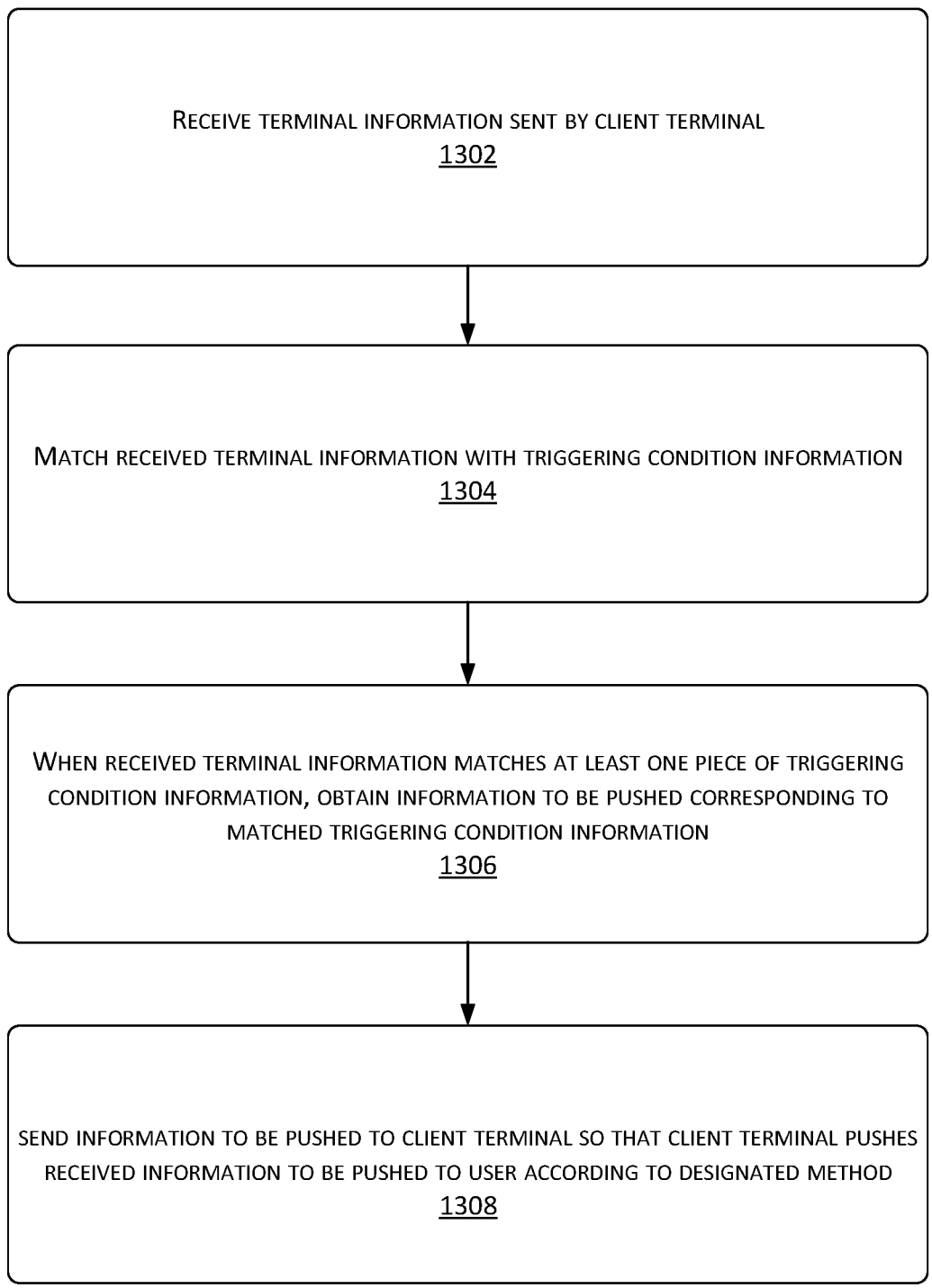
FIG. 13 is a diagram of an example information pushing method applicable at a server according to an example embodiment of the present disclosure.

Based on the above overall process, the present disclosure also provides a method applied at the server, as shown in FIG. 13, which includes:

1302, the server receives the terminal information sent by the client terminal.

1304, the server matches the received terminal information with triggering condition information.

1306, when the received terminal information matches at least one piece of triggering condition information, the server obtains the information to be pushed corresponding to the matched triggering condition information.

1308, the server sends the information to be pushed to the client terminal so that the client terminal pushes the received information to be pushed to the user according to a designated method.

Figure 14:
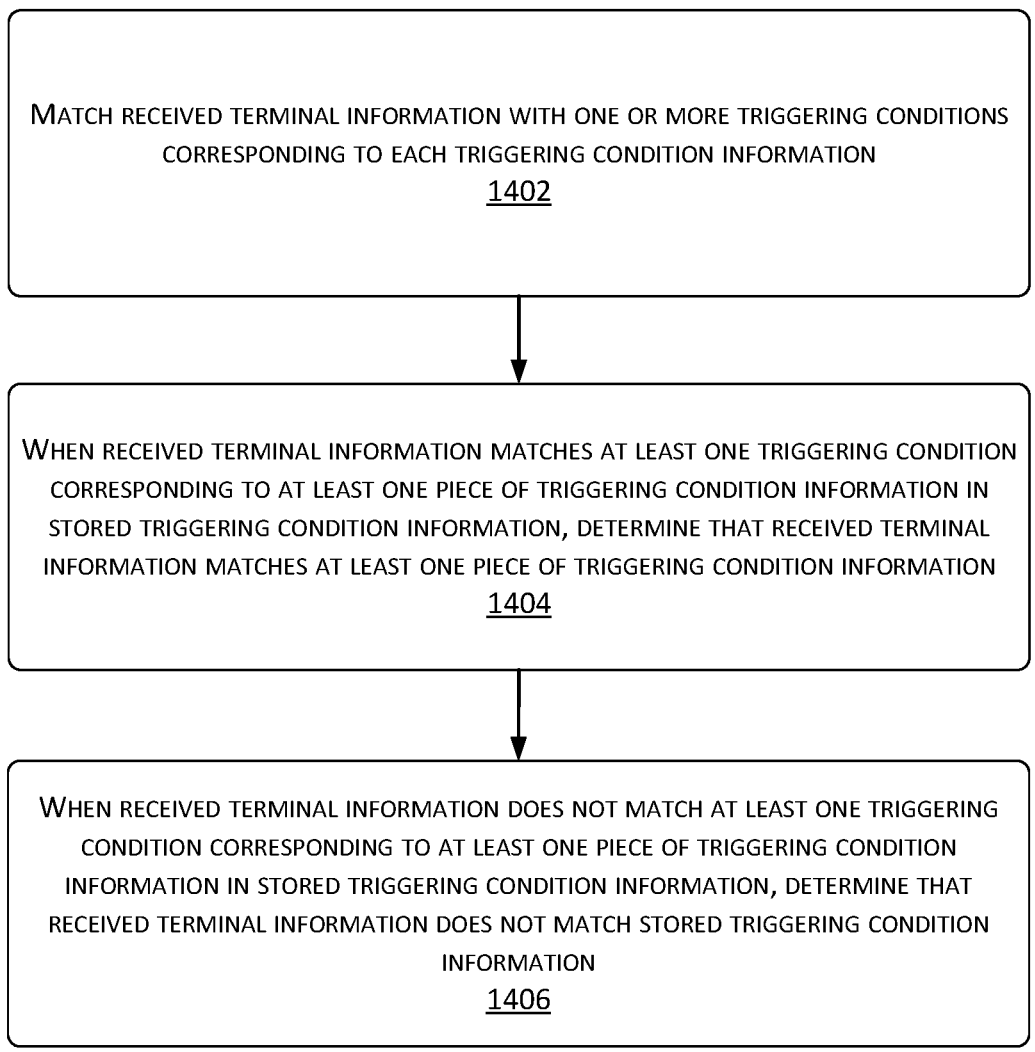
FIG. 14 is a diagram of an example information pushing method applicable at a client terminal according to an example embodiment of the present disclosure.

With respect to implementations at 1304, the present disclosure provides an example implementation as shown in FIG. 14, which includes:

1402, the server matches the received terminal information with the one or more triggering conditions corresponding to each triggering condition information. When the received terminal information matches at least one triggering condition corresponding to at least one piece of triggering condition information in the stored triggering condition information, operations at 1404 are performed, otherwise, operations at 1406 are performed.

1404, the server determines that the received terminal information matches the at least one piece of triggering condition information.

1406, the server determines that the received terminal information does not match the stored triggering condition information.

The matching method at the server side is same as or substantially similar to the matching method at the client terminal side, which is not detailed herein.

With respect to operations at 1306, the present disclosure also provides two example implementations. In the first example implementation, the server searches stored information to be pushed and does not do further processing. In the second example implementation, the server fills in the found information template by reference to the terminal information to generate the information to be pushed for the client terminal to push.

Figure 15:
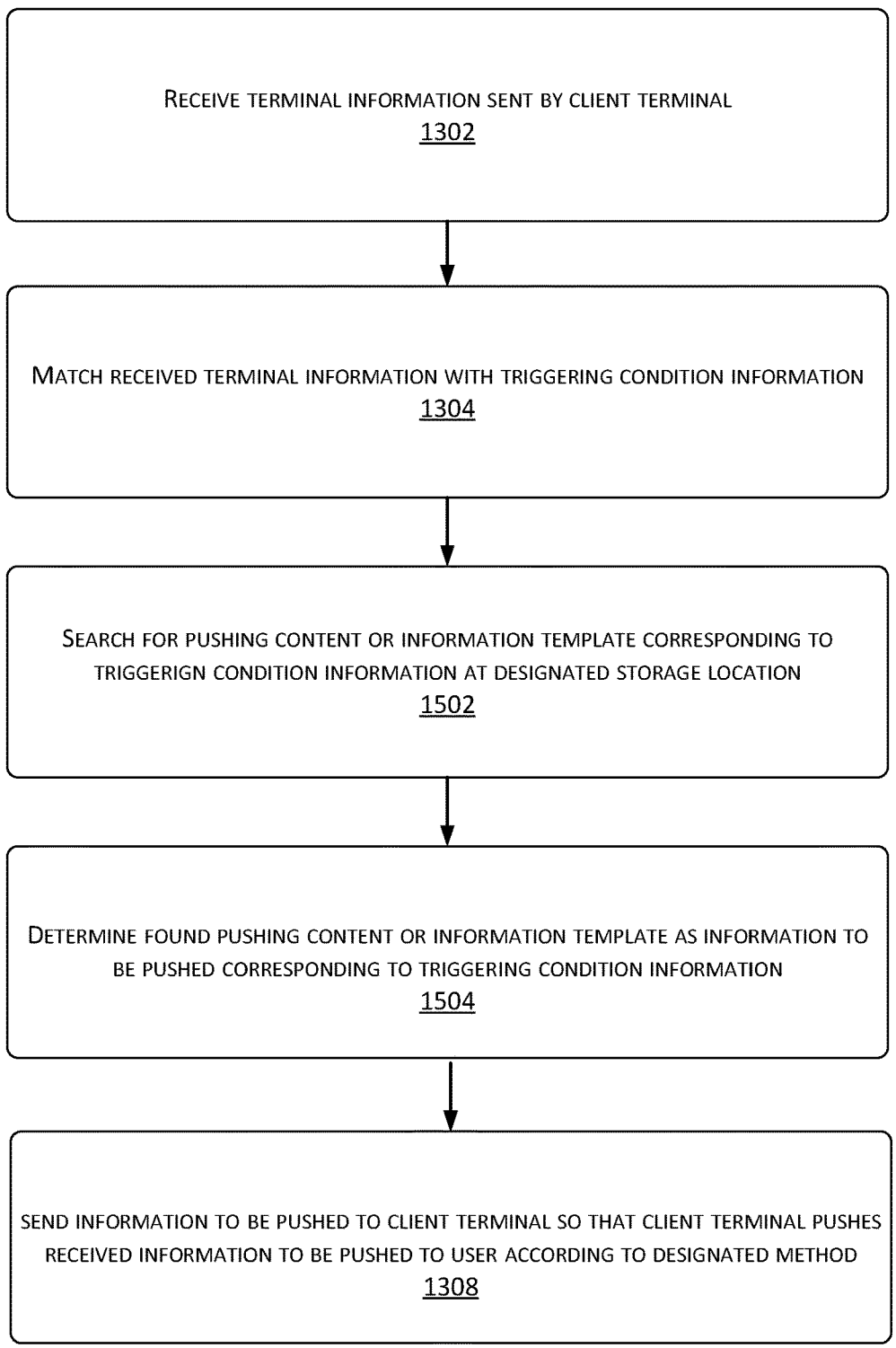
FIG. 15 is a diagram of an example information pushing method applicable at a server according to an example embodiment of the present disclosure.

The first example implementation is shown in FIG. 15, which includes:

1502, the server searches for pushing content or information template corresponding to the triggering condition information at a designated storage location.

1504, the server determines the found pushing content or information template as the information to be pushed corresponding to the triggering condition information.

Figure 16:
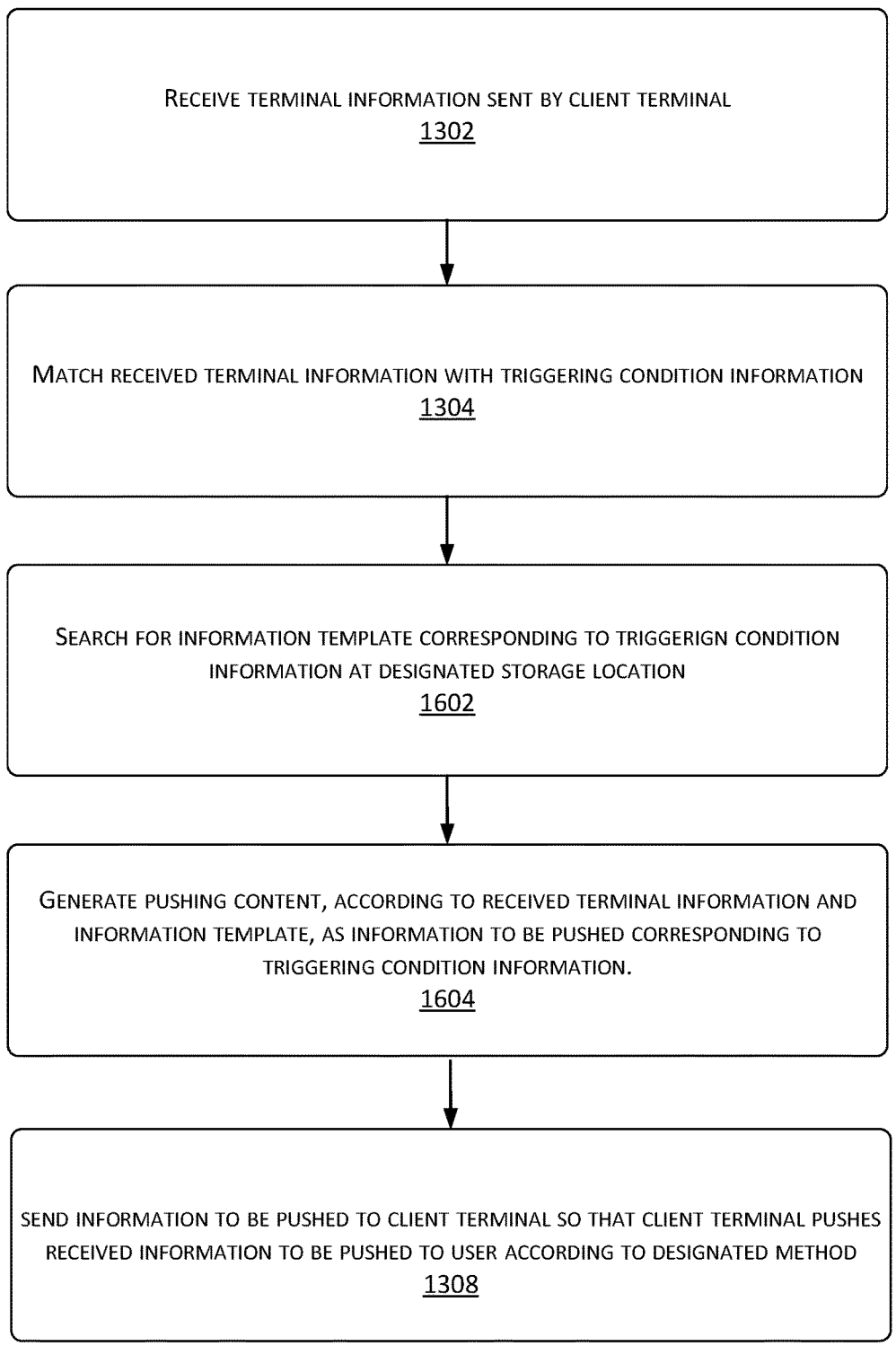
FIG. 16 is a diagram of an example information pushing method applicable at a server according to an example embodiment of the present disclosure.

The second example implementation is shown in FIG. 16, which includes:

1602, the server searches for the information template corresponding to the triggering condition information at a designated storage location.

1604, the server generates the pushing content, according to the received terminal information and the information template, as the information to be pushed corresponding to the triggering condition information.

With respect to the source of the corresponding relationship between each of the triggering condition information and the information to be pushed, the present disclosure also provides two example implementations.

The first example implementation is to receive a preset corresponding relationship between the triggering condition information and the information to be pushed.

The second example implementation is to: collect the historical behavior data and the preference data of the user; establish a new corresponding relationship between the triggering condition information and the information to be pushed according to the historical behavior data and the preference data, or update the existing corresponding relationship between the triggering condition information and the information to be pushed.

In the first example implementation, the corresponding relationship is passively received. Generally, the administrator of the server inputs it or introduces it from other devices. In the second example implementation, the server actively generates the corresponding relationship The present disclosure does not impose restriction on the timing to implement the above two implementations, which may be configured based on actual needs.

The form of corresponding relationship between the triggering condition information and the information to be pushed may be similar to that of the corresponding relationship between the triggering condition information and the identification information.

The triggering condition information and the information to be pushed are generally sent by the server to the client terminal in pair or group. The client terminal may also store them in pair or group. To facilitate understanding, the present disclosure provides contents as shown in Table 2, as an example illustration of a corresponding relationship between the triggering condition information and the information to be pushed. Table 2 reflects the corresponding relationship between the triggering condition information and the information to be pushed. Certainly, any configuration that represents the storage method and format of the above corresponding relationship between the triggering condition and the information to be pushed may be applied herein, to which the present disclosure does not impose restriction.

TABLE 2

Corresponding Relationship Between Triggering Condition
Information and Information to be pushed

| Triggering Condition Information | Information to be pushed |
| --- | --- |
| (The current system time is between 6:00 and 9:00 working day) and (the current location is home) | Please pay attention to weather before leaving for work |
| (There is an installation of game application) and (the current network is Wi-Fi) | You already install game {game name}. For more games, please log in www.abc.com |
| . . . | . . . |
| (The current system date is $1^{st}$ day) | Please pay your credit card dues |
| . . . | . . . |

As shown in Table 2, in this example method, the content received by the client terminal may include the corresponding relationship between the triggering condition information and the information to be pushed. The client terminal maintains the corresponding relationship between the triggering condition information and the information to be pushed. The server needs to maintain the same content.

Figure 17:
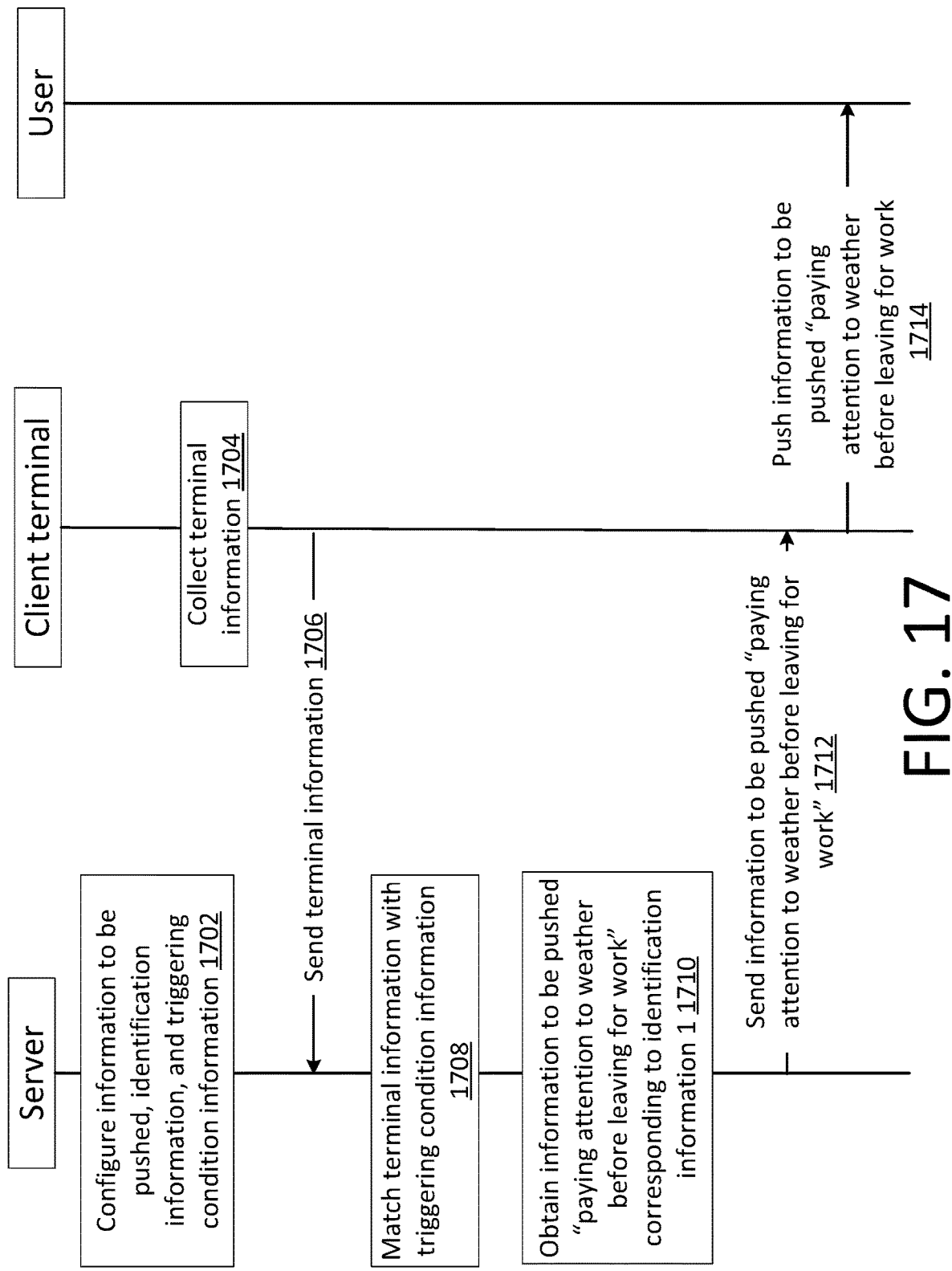
FIG. 17 is a diagram of another example scenario according to an example embodiment of the present disclosure.

The above description illustrates the second example method. To facilitate understanding, the present disclosure describes the overall process of this example method by reference to specific examples, as shown in FIG. 17, which includes:

1702, 100 pieces of information to be pushed is introduced into from the external sources to the server or generated at the server. The corresponding identification information is 1-100 respectively. The 60 pieces of triggering condition information, and the corresponding relationships between the 60 pieces of triggering condition information and the 100 identification information are also configured.

For the convenience of description, it is assumed that the corresponding relationship includes identification information 1<=>triggering condition information 3, identification information 4<=>triggering condition information 5, etc.

1704, the client terminal collects the terminal information.

1706, the client terminal sends the collected terminal information to the server.

1708, the server matches the collected terminal information with the triggering condition information.

When the collected terminal information includes that the current system time is 8:00 a.m. Monday and the current location is home, while the triggering condition information 1 indicates that the current system is 6:00-9:00 a.m. weekday and the current location is home, the terminal information matches the triggering condition information.

1710, when the terminal information matches the triggering condition information 1, the server obtains the information to be pushed corresponding to the triggering condition information 1.

The information to be pushed is, for example, "Please pay attention to weather before leaving for work."

1712, the server sends the obtained information to be pushed "Please pay attention to weather before leaving for work" to the client terminal.

1714, the client terminal, after receiving the information to be pushed, displaying the information to be pushed "Please pay attention to weather before leaving for work" to the user, such as through a prompt window at the user interface of the client terminal.

Figure 18:
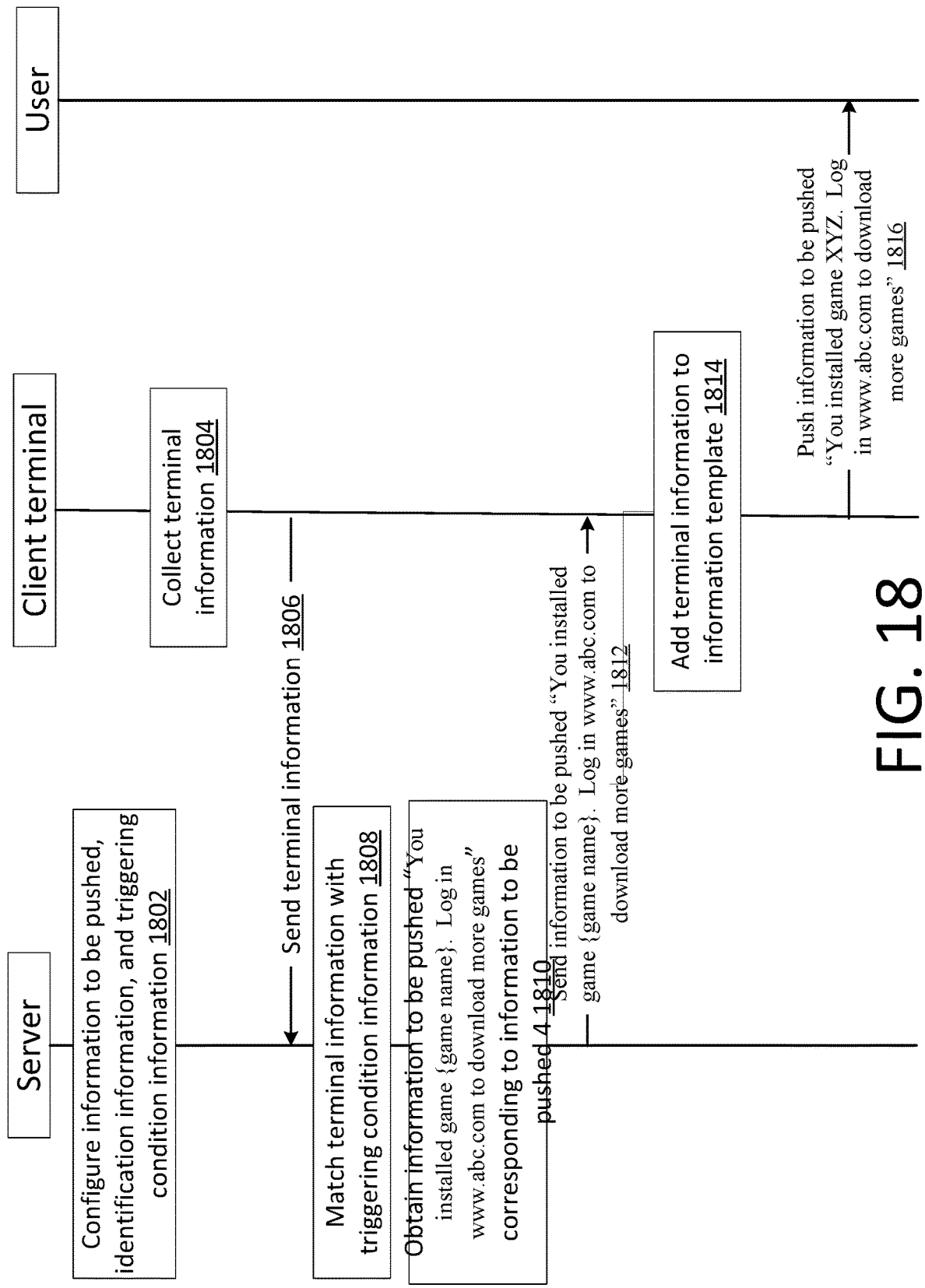
FIG. 18 is a diagram of another example scenario according to an example embodiment of the present disclosure.

With respect to the implementation of the second example method, the present disclosure also provides another example implementation as shown in FIG. 18, which includes:

1802, 100 pieces of information to be pushed is introduced into from the external sources to the server or generated at the server. The corresponding identification information is 1-100 respectively. The 60 pieces of triggering condition information, and the corresponding relationships between the 60 pieces of triggering condition information and the 100 identification information are also configured.

For the convenience of description, it is assumed that the corresponding relationship includes identification information 1<=>triggering condition information 3, identification information 4<=>triggering condition information 5, etc.

1804, the client terminal collects the terminal information.

1806, the client terminal sends the collected terminal information to the server.

1808, the server matches the collected terminal information with the triggering condition information.

When the collected terminal information includes that the currently installed game application is game A the current network is Wi-Fi, and the triggering condition information 5 indicates that there exists the installation of game application and the current network is Wi-Fi, it indicates that the terminal information matches the triggering condition information 5.

1810, when the terminal information matches the triggering condition information 5, the server obtains the information to be pushed 4 corresponding to the triggering condition information 5.

For example, the information to be pushed is the information template "You installed game {game name}. Log in www.abc.com to download more games."

1812, the server sends the obtained information to be pushed "You installed game {game name}. Log in www.abc.com to download more games" to the client terminal.

1814, the client terminal adds the game name XYZ of the game A to the information template according to the collected terminal information, and generates the actual information to be pushed "You installed game XYZ. Log in www.abc.com to download more games."

1816, the client terminal, after receiving the information to be pushed, pushes the information to be pushed "You installed game XYZ. Log in www.abc.com to download more games" to the user, such as through the notification bar at the user interface of the client terminal.

For example, when operations at 1812 are performed, the server fills in the information template corresponding to the identification information 4 and generates the actual information to be pushed "You installed game {game name}. Log in www.abc.com to download more games." At 1814, the server will then directly push the actual information to be pushed to the client terminal and the client terminal directly performs operations at 1818.

The above descriptions describe the second example method (the server actively pushes). The following describes with reference to the third example method (the client terminal pushes on its own). With respect to parameters or operations that are same as those in the first example method and the second example method, the relevant portions may refer to the above, which are not detailed herein.

Figure 19:
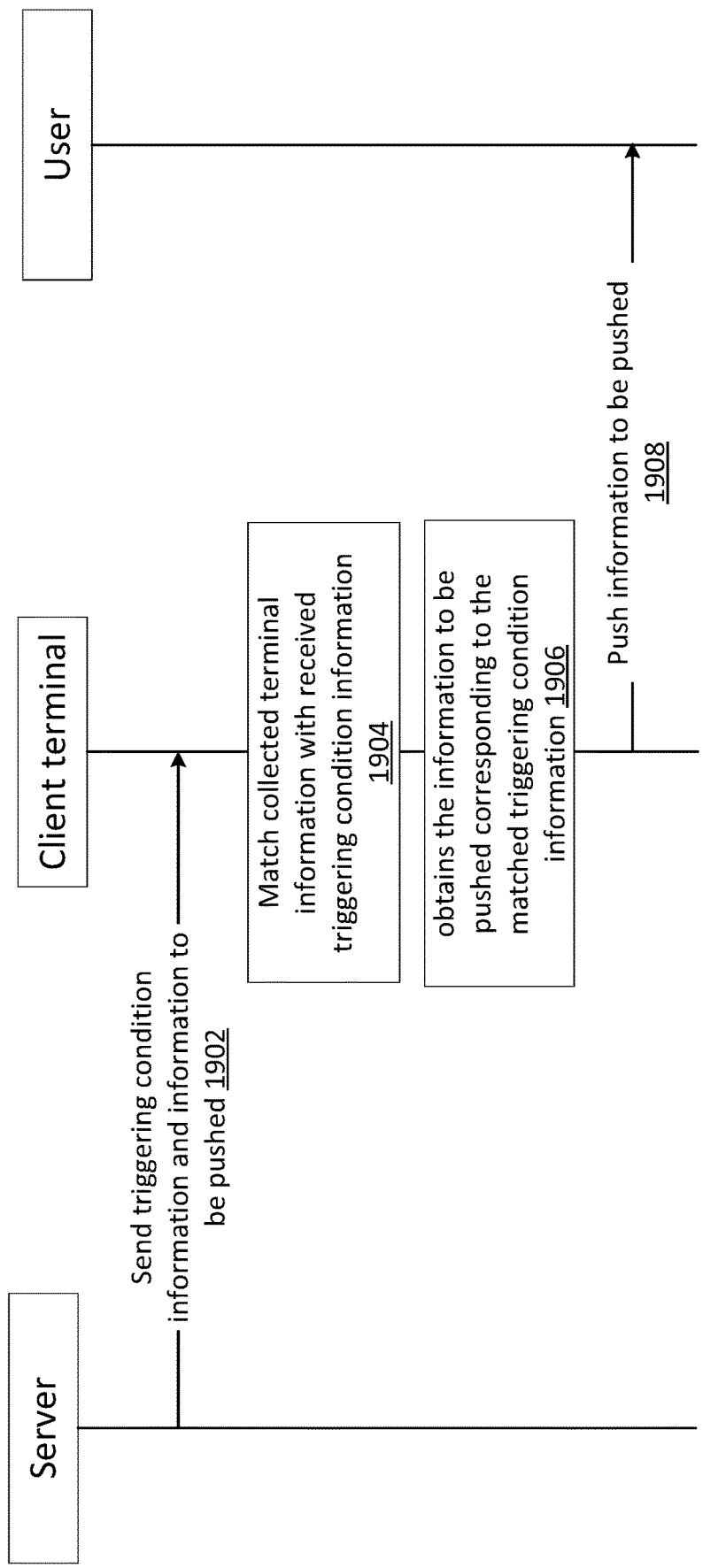
FIG. 19 is a diagram of interaction of an example information pushing method according to an example embodiment of the present disclosure.
Figure 20:
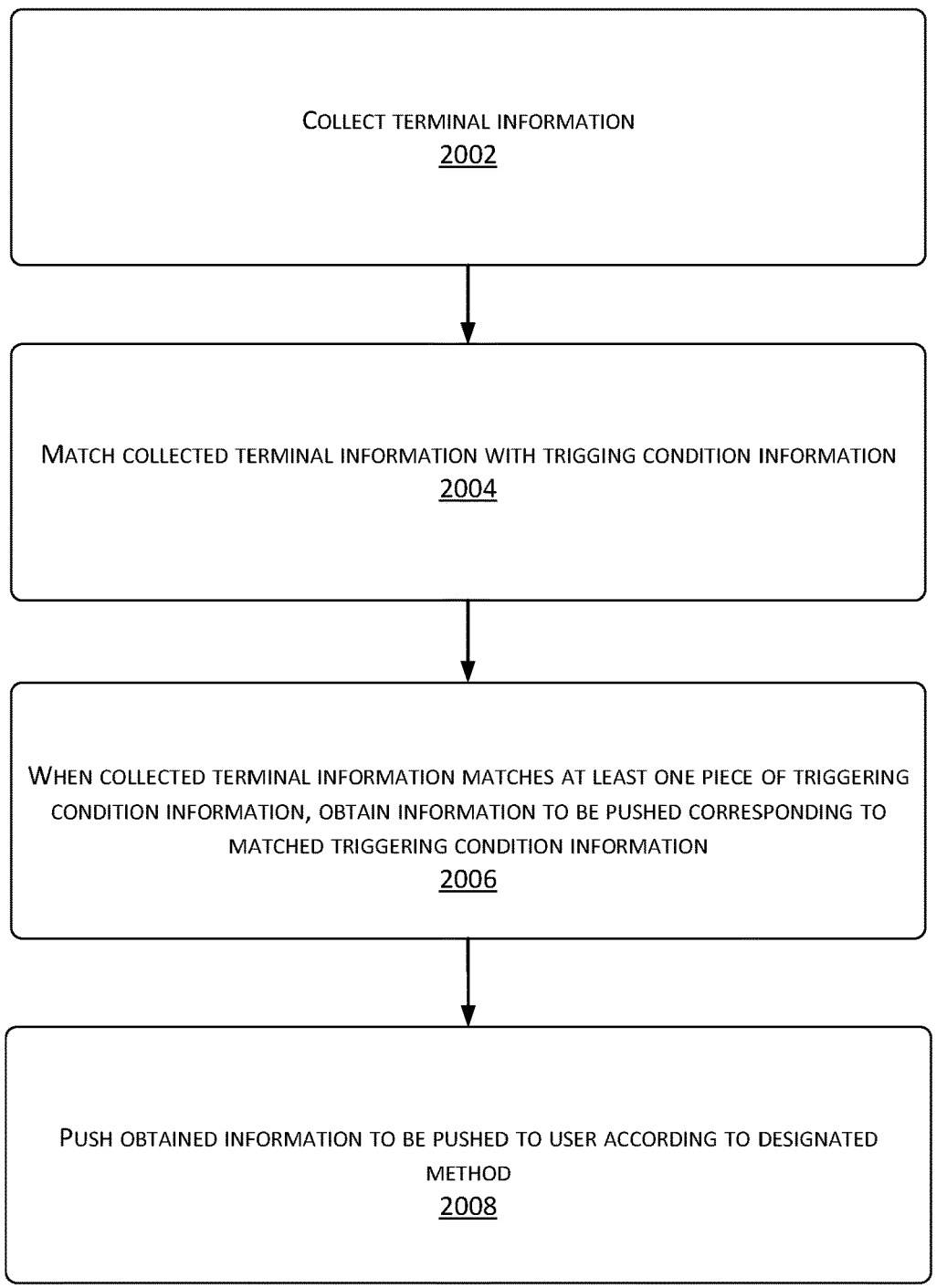
FIG. 20 is a diagram of an example information pushing method applicable at a client terminal according to an example embodiment of the present disclosure.

With respect to the description of the third example method, the overall process of the information pushing method is shown as in FIG. 19, which includes:

1902, the server sends at least one piece of triggering condition information and the information to be pushed corresponding to the triggering condition information to the client terminal.

1904, the client terminal matches the collected terminal information with the received triggering condition information.

1906, when the collected terminal information matches at least one piece of the triggering condition information, the client terminal obtains the information to be pushed corresponding to the matched triggering condition information.

1908, the client terminal pushes the obtained information to be pushed to the user according to a designated method.

In the implementation, the server sends the triggering condition in the form of triggering condition information to the client terminal, together with the information to be pushed so that the client terminal may determine whether to push the information to the user according to the terminal information. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

Based on the above overall process, the present disclosure also provides a method applied at the client terminal, which includes:

2002, the client terminal collects the terminal information.

2004, the client terminal matches the collected terminal information with the triggering condition information.

2006, when the collected terminal matches at least one piece of the triggering condition information, the client terminal obtains the information to be pushed corresponding to the matched triggering condition information.

2008, the client terminal pushes the obtained information to be pushed to the user according to a designated method.

Figure 21:
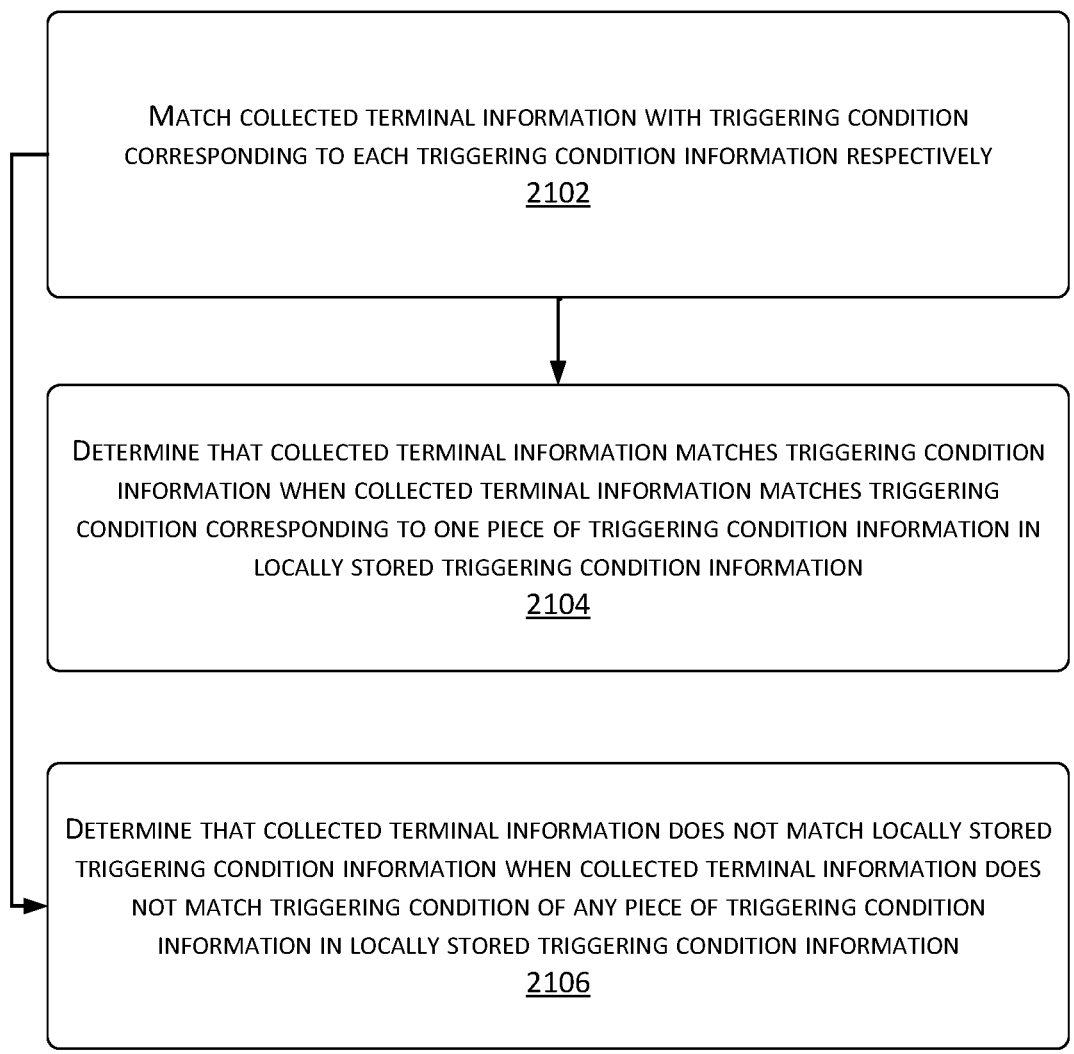
FIG. 21 is a diagram of an example information pushing method applicable at a client terminal according to an example embodiment of the present disclosure.

With respect to the implementations at 2004, the present disclosure also provides an example implementation as shown in FIG. 21, which includes:

2102, the collected terminal information is matched with the triggering condition corresponding to each triggering condition information respectively. When the collected terminal information matches one piece of triggering condition of the received triggering condition information, operations at 2104 are implemented. When the collected terminal information does not match any triggering condition of the triggering condition information, operations at 2106 are implemented.

2104, the collected terminal information is determined to match the triggering condition information. The client terminal determines that the collected terminal information matches the triggering condition information when the collected terminal information matches the triggering condition corresponding to one piece of triggering condition information in locally stored triggering condition information.

2106, the collected terminal information is determined not to match the locally stored triggering condition information. The client terminal determines that the collected terminal information does not match the locally stored triggering condition information when the collected terminal information does not match triggering condition of any piece of triggering condition information in the locally stored triggering condition information.

With respect to the content included in the information to be pushed, the present disclosure provides two example implementations. One is to push the actual contents. That is, the information is not amended and directly pushed to the user. The other is to use the information template. That is, other information needs to be input into the information template to obtain the content to be pushed or presented. Based on such description, the present disclosure provides two example implementations to implement operations at 2008.

A first example implementation: when the information to be pushed is the actual content to be pushed, the received information to be pushed is directly pushed to the user. For example, the pushing content may be information related to advertisement, time reminder, battery reminder, etc.

A second example implementation: when the information to be pushed is the information template, the pushing content is generated according to the received information to be pushed and the terminal information, and the newly generated pushing content is pushed to the user.

Figure 22:
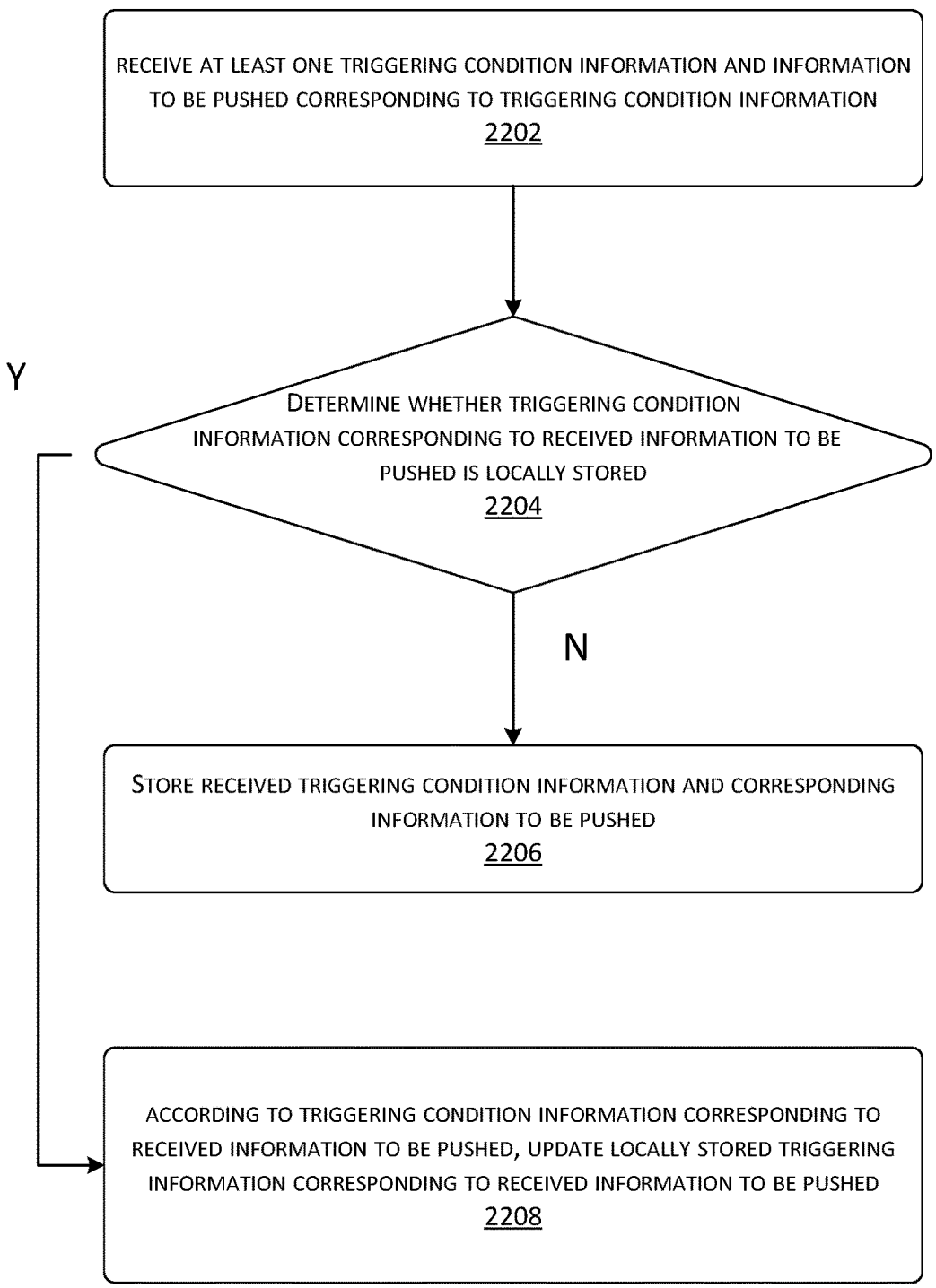
FIG. 22 is a diagram of an example information pushing method applicable at a client terminal according to an example embodiment of the present disclosure.

For example, the triggering condition information and the corresponding identification information at the client terminal are sent by the server. Thus, prior to operations at 2004, the process further includes those shown in FIG. 22, which includes.

2202, the client terminal receives at least one piece of triggering condition information and the information to be pushed corresponding to the triggering condition information sent by the server.

2204, the client terminal determines whether the triggering condition information corresponding to the received information to be pushed is locally stored. When the triggering condition information corresponding to the received information to be pushed is not locally stored, operations at 2206 are performed. When the triggering condition information corresponding to the received information to be pushed is locally stored, operations at 2208 are performed.

2206, the received triggering condition information and the corresponding information to be pushed are stored.

2208, according to the triggering condition information corresponding to the received information to be pushed, the locally stored triggering information corresponding to the received information to be pushed is updated.

The triggering condition information and the identification information are generally sent by the servers to the client terminals in pairs or groups. To facilitate understanding, the present disclosure also provides content of Table 3 as an example illustration of a corresponding relationship between the triggering condition information and the information to be pushed. Table 3 reflects the corresponding relationship between the triggering condition information and the information to be pushed. Certainly, any configuration that represents the storage method and format of the above corresponding relationship between the triggering condition and the information to be pushed may be applied herein, to which the present disclosure does not impose restriction.

TABLE 3

Corresponding Relationship Between Triggering Condition Information and Information to be pushed

| Triggering Condition Information | Information to be pushed |
|---|---|
| (The current system time is between 6:00 and 9:00 working day) and (the current location is home) | Please pay attention to weather before leaving for work |
| (There is an installation of game application) and (the current network is Wi-Fi) | You already install game {game name}. For more games, please log in www.abc.com |
| . . . | . . . |
| (The current system date is 1$^{st}$ day) | Please pay your credit card dues |
| . . . | . . . | may include the corresponding relationship between the triggering condition information and the information to be pushed. The client terminal maintains the corresponding relationship between the triggering condition information and the information to be pushed. The server needs to maintain the same content.

Figure 23:
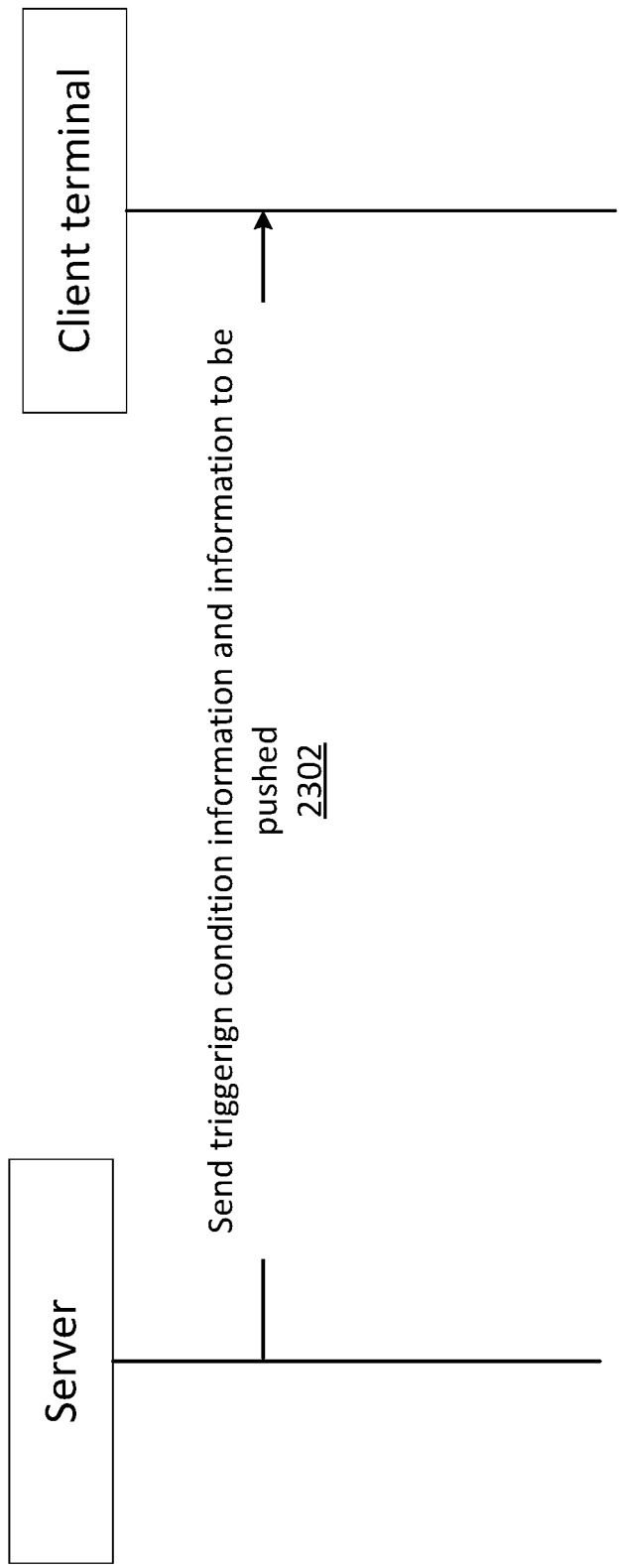
FIG. 23 is a diagram of an example information pushing method applicable at a client terminal according to an example embodiment of the present disclosure.

To cooperate with the client terminal, the present disclosure also provides the method or process at the server side, as shown in FIG. 23, which includes:

2302, the server sends at least one piece of triggering condition information and the information to be pushed corresponding to the triggering condition information to the client terminal so that the client terminal, when determining that the collected terminal information matches one piece of the triggering condition information, pushes the obtained information to be pushed corresponding to the matched triggering condition information to the user according to a designated method.

With respect to the source of the corresponding relationship between each of the triggering condition information and the information to be pushed at the server side, the present disclosure also provides two example implementations.

The first example implementation is to receive a preset corresponding relationship between the triggering condition information and the information to be pushed.

The second example implementation is to: collect the historical behavior data and the preference data of the user; establish a new corresponding relationship between the triggering condition information and the information to be pushed according to the historical behavior data and the preference data, or update the existing corresponding relationship between the triggering condition information and the information to be pushed.

Figure 24:
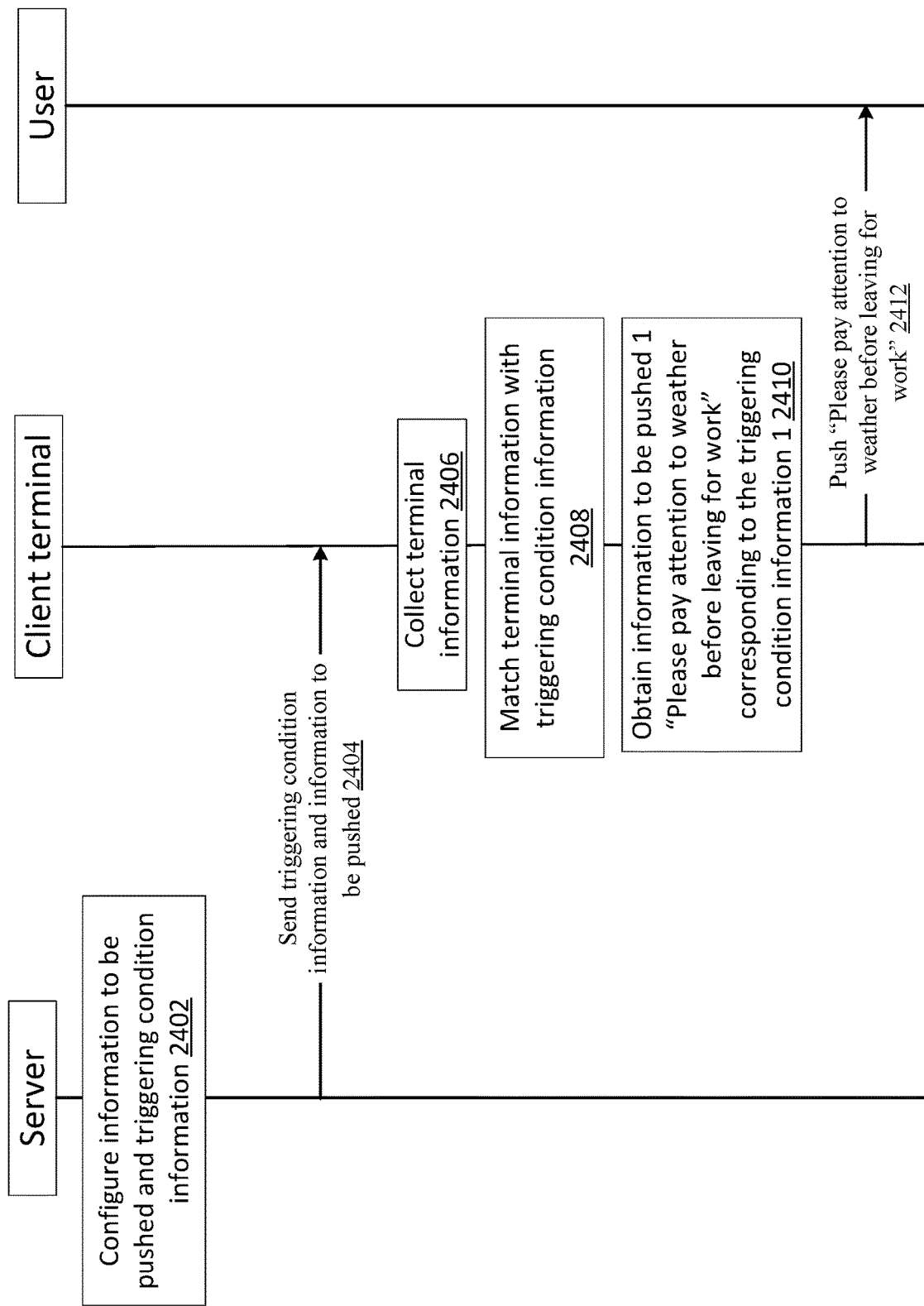
FIG. 24 is a diagram of another example scenario according to an example embodiment of the present disclosure.

The above is the description of the first example method. To facilitate understanding, the present disclosure, by reference to examples, describes the overall process of the example method, as shown in FIG. 24, which includes:

2402, 100 pieces of information to be pushed is introduced into from the external sources to the server or generated at the server. The 60 pieces of triggering condition information, and the corresponding relationships between the 60 pieces of triggering condition information and the 100 pieces of information to be pushed are also configured.

For the convenience of description, it is assumed that the corresponding relationship includes information to be pushed 1<=>triggering condition information 1, information to be pushed 2<=>triggering condition information 2, etc.

2404, the server sends the triggering condition information and the information to be pushed to the client terminal.

2406, the client terminal collects the terminal information.

2408, the client terminal matches the collected terminal information with the triggering condition information.

When the uploaded terminal information includes that the current system time is 8:00 a.m. Monday and the current location is home, while the triggering condition information 1 indicates that the current system is 6:00-9:00 a.m. weekday and the current location is home, the terminal information matches the triggering condition information.

2410, when the terminal information matches the triggering condition information 1, the client terminal obtains the information to be pushed 1 corresponding to the triggering condition information 1.

The information to be pushed is, for example, "Please pay attention to weather before leaving for work."

2412, the client terminal displays the information to be pushed "Please pay attention to weather before leaving for work" to the user, such as through a prompt window at the user interface of the client terminal.

Figure 25:
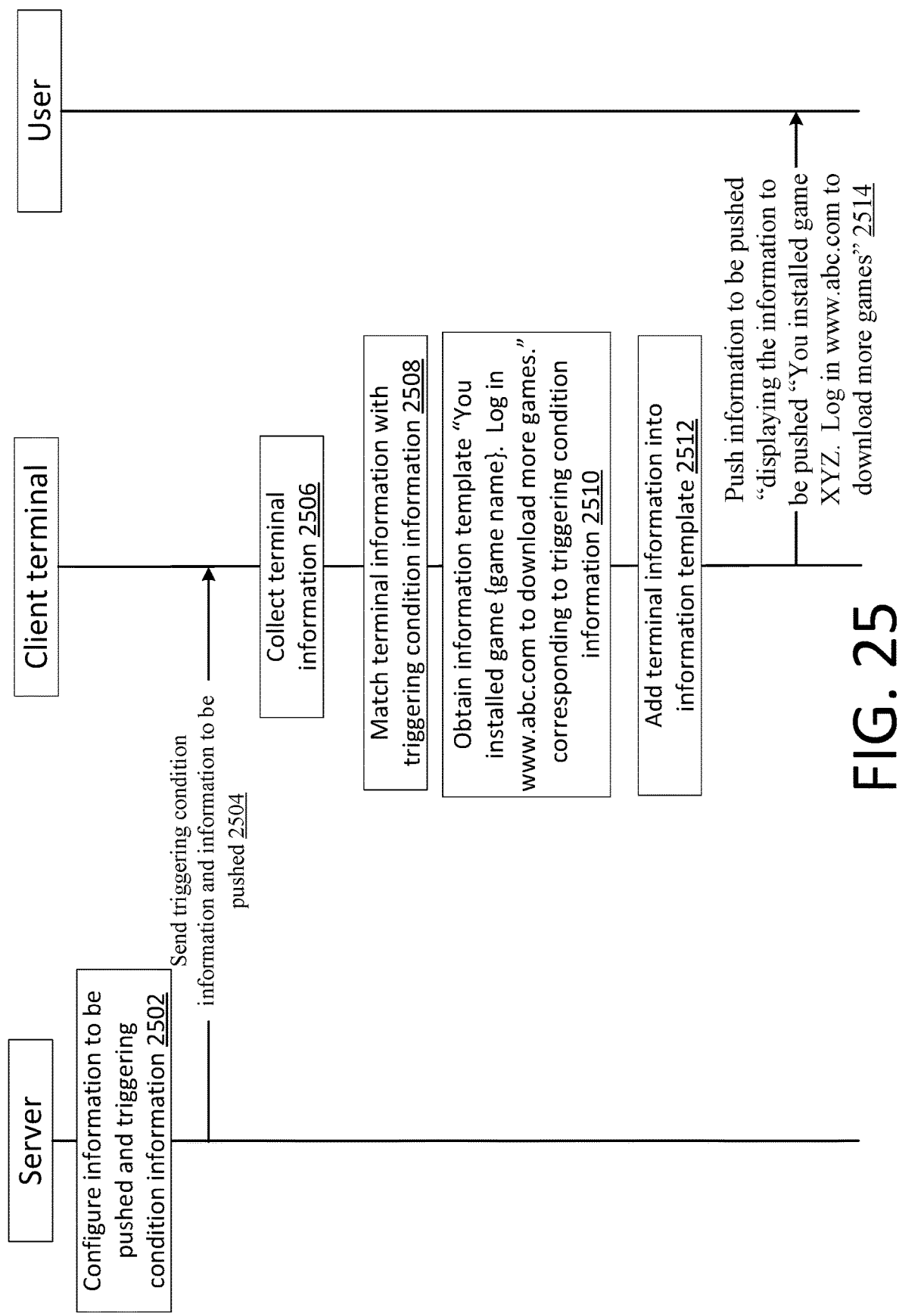
FIG. 25 is a diagram of another example scenario according to an example embodiment of the present disclosure.

With respect to the implementation of the third example method, the present disclosure also provides another example implementation as shown in FIG. 25, which includes:

2502, 100 pieces of information to be pushed is introduced into from the external sources to the server or generated at the server. The 60 pieces of triggering condition information, and the corresponding relationships between the 60 pieces of triggering condition information and the 100 pieces of triggering condition information are also configured.

For the convenience of description, it is assumed that the corresponding relationship includes information to be pushed 1<=>triggering condition information 3, information to be pushed 4<=>triggering condition information 5, etc.

2504, the server sends the triggering condition information and the information to be pushed to the client terminal.

2506, the client terminal collects the terminal information.

2508, the server matches the collected terminal information with the triggering condition information.

When the collected terminal information includes that the currently installed game application is game A the current network is Wi-Fi, and the triggering condition information 5 indicates that there exists the installation of game application and the current network is Wi-Fi, it indicates that the terminal information matches the triggering condition information 5.

2510, when the terminal information matches the triggering condition information 5, the client terminal obtains the information to be pushed 4 corresponding to the triggering condition information 5.

For example, the information to be pushed is the information template "You installed game {game name}. Log in www.abc.com to download more games."

2512, the client terminal adds the game name XYZ of the game A to the information template according to the collected terminal information, and generates the actual information to be pushed "You installed game XYZ. Log in www.abc.com to download more games."

2514, the client terminal, after receiving the information to be pushed, displaying the information to be pushed "You installed game XYZ. Log in www.abc.com to download more games" to the user, such as through the notification bar at the user interface of the client terminal.

Figure 26:
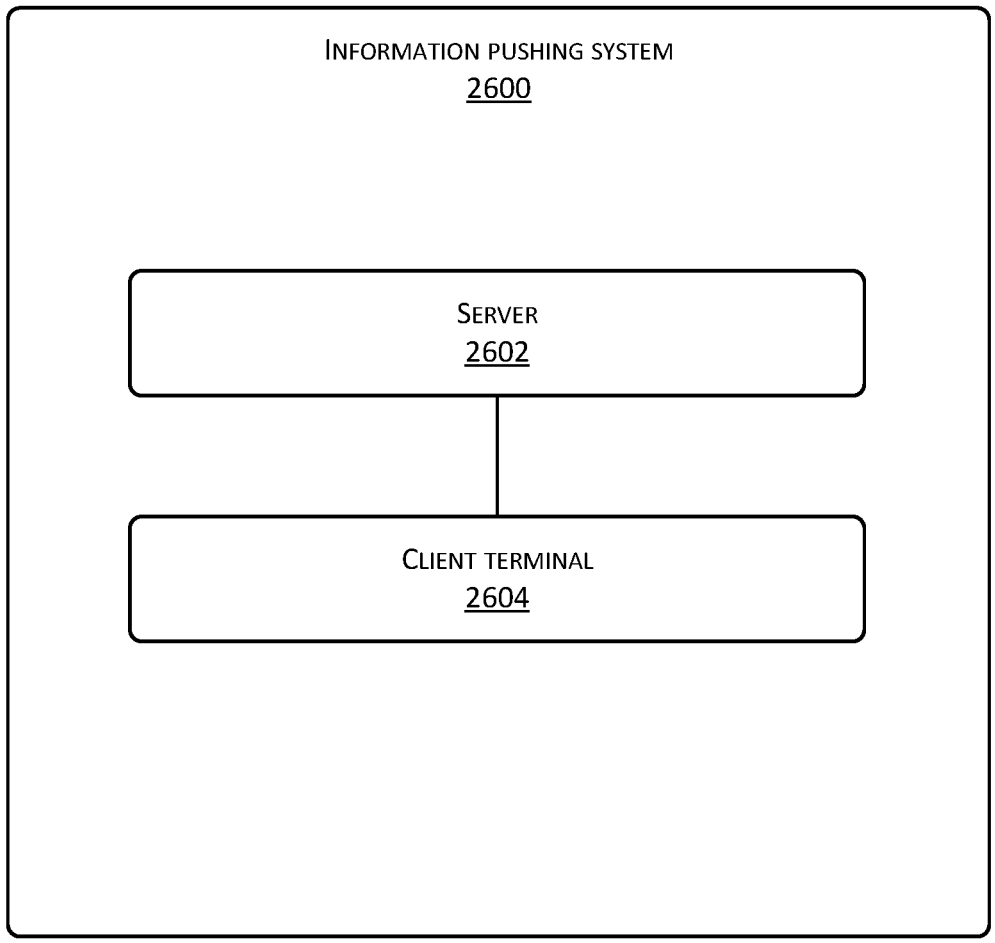
FIG. 26 is a diagram of an example information pushing system according to an example embodiment of the present disclosure.

The present disclosure also provides an example information pushing system 2600, as shown in FIG. 26, which includes a server 2602 and a client terminal 2604.

The server 2602 sends at least one piece of triggering condition information and identification information corresponding to the triggering condition information to the client terminal 2604.

The client terminal 2604 matches the collected terminal information with the received triggering condition information.

If the collected terminal information matches one of the triggering condition information, the client terminal 2604 sends the identification information that corresponds to the matched triggering condition information to the server 2602.

The server 2602 obtains the information to be pushed corresponding to the identification information.

The server 2602 sends the information to be pushed corresponding to the identification information to the client terminal 2604.

The client terminal 2604 pushes the received information to be pushed to the user according to a designated method.

Alternatively, in another implementation, the client terminal 2604 and the server 2602 may also implement the following process.

The client terminal 2604 collects the terminal information, and sends the collected terminal information to the server 2602.

The server 2602 matches the collected terminal information with the received triggering condition information.

If the collected terminal information matches one of the triggering condition information, the server 2602 obtains the information to be pushed corresponding to the triggering condition information and sends the information to be pushed to the client terminal 2604.

The client terminal 2604 pushes the received information to be pushed to the user according to a designated method.

Alternatively, in another implementation, the client terminal 2604 and the server 2602 may also implement the following process.

The server 2602 sends at least one piece of triggering condition information and information to be pushed corresponding to the triggering condition information to the client terminal 2604.

The client terminal 2604 matches the collected terminal information with the received triggering condition information.

The client terminal 2604 matches the collected terminal information with the received triggering condition information.

If the collected terminal information matches one of the triggering condition information, the client terminal 2604 obtains the information to be pushed corresponding to the matched triggering condition information, and sends the obtained information to be pushed to the user according to a designated method.

Figure 27:
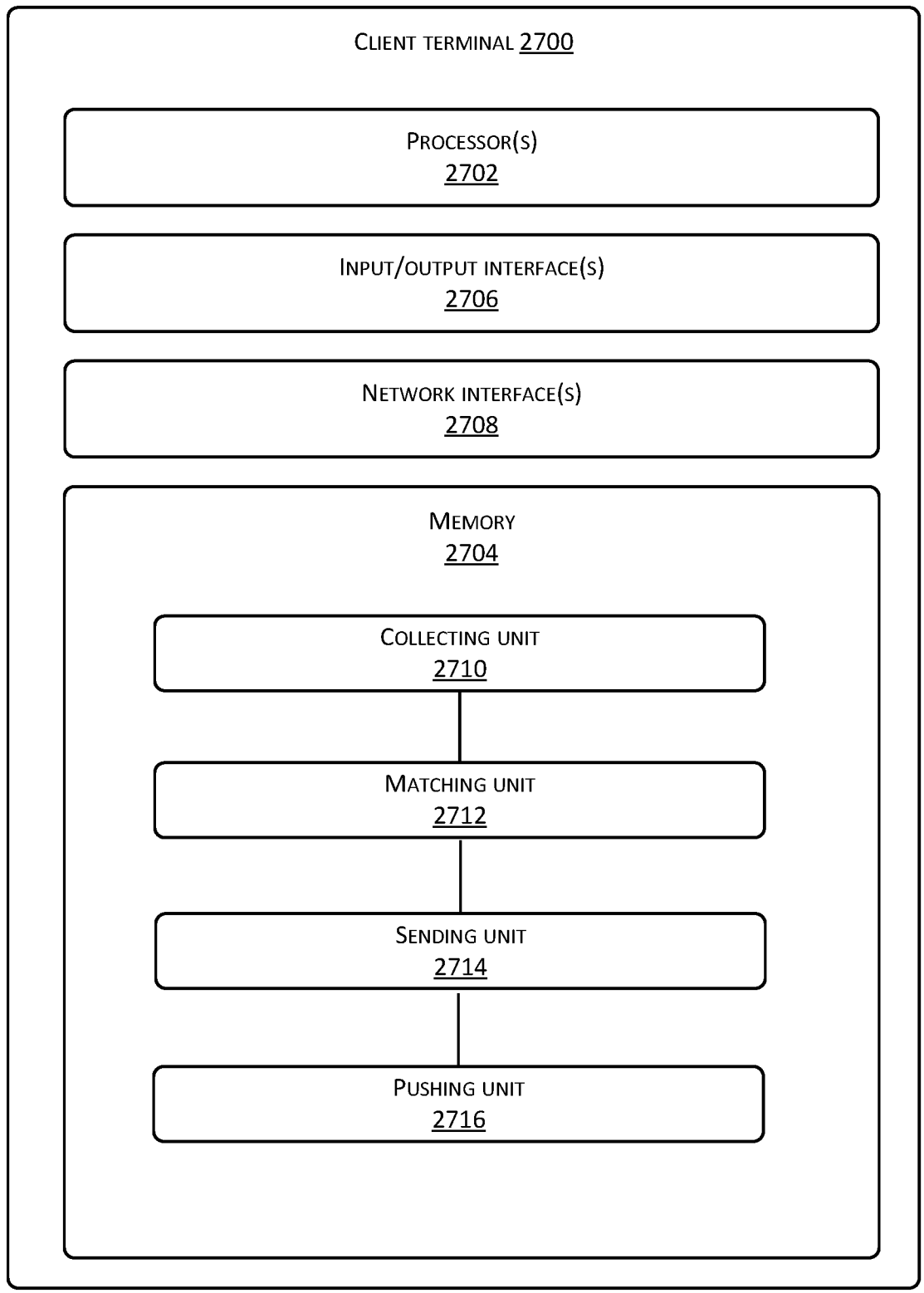
FIG. 27 is a diagram of an example client terminal according to an example embodiment of the present disclosure.
Figure 28:
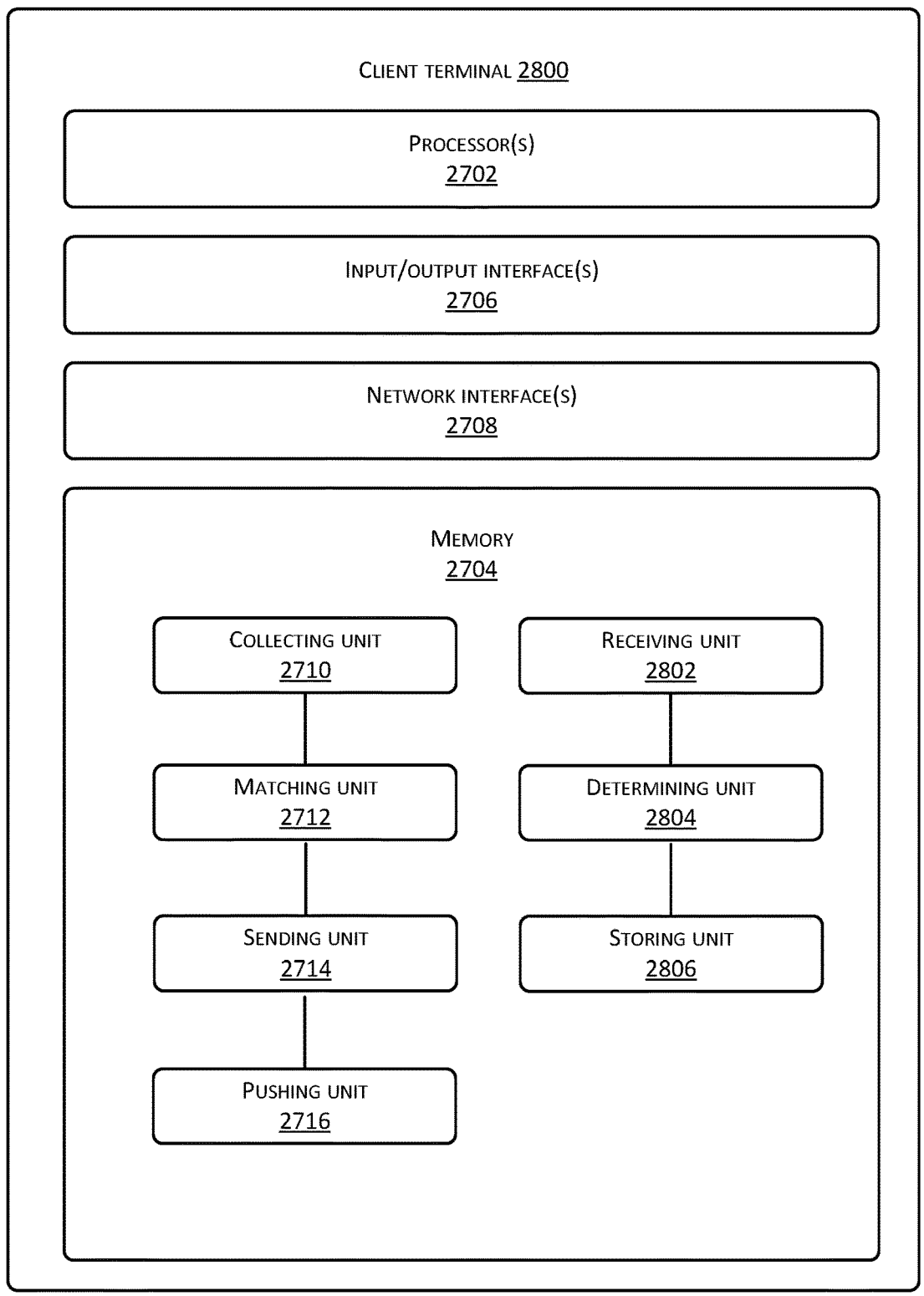
FIG. 28 is a diagram of another example client terminal according to an example embodiment of the present disclosure.

The present disclosure provides an example client terminal 2700, as shown in FIG. 27, which includes one or more processor(s) 2702 or data processing unit(s) and memory 2704. The client terminal 2700 may further include one or more input/output interface(s) 2706 and one or more network interface(s) 2708. The memory 2704 is an example of computer readable media.

The computer readable media include non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition herein, the computer readable media do not include transitory media, such as modulated data signals and carriers.

The memory 2704 may store therein a plurality of modules or units including:

a collecting unit 2710 that collects terminal information;

a matching unit 2712 that matches the collected terminal information with the triggering condition information;

a sending unit 2714 that sends the identification information corresponding to the matched triggering condition information to the server when the collected terminal information matches one pieced of the triggering condition information, so that the server, responding to the received identification information, sends the information to be pushed corresponding to the identification information to the client terminal; and a pushing unit 2716 that pushes the received information to be pushed to the user according to a designated method.

For example, a respective triggering condition information represents a respective triggering condition corresponding to a respective type of terminal information to push respective information to be pushed.

For example, the collecting unit 2710 matches the collected terminal information with the triggering condition corresponding to each triggering condition information; when the collected terminal information matches the triggering condition corresponding to a piece of triggering condition information in the one or more triggering condition information, which may be stored locally, determines that the collected terminal information matches the piece of triggering condition information; and when the collected terminal information does not match the triggering condition corresponding to any piece of triggering condition information in the one or more triggering condition information, which may be stored locally, determines that the collected terminal information does not match the triggering condition information, which may be stored locally.

For example, the pushing unit 2716 pushes the received information to be pushed to the user according to a designated method; when the information to be pushed is the pushing content to be pushed, sends the received information to be pushed to the user; and when the information to be pushed is information template, generates the pushing content to be pushed according to the received information to be pushed and the terminal information, and pushes the newly generated pushing content to the user.

For example, the sending unit 2714 sends the terminal information to the server so that the serer determines the pushing content to be pushed corresponding to the identification information according to the received terminal information and the received identification information and pushes the pushing content as the information to be pushed to the client terminal.

Alternatively, as shown in FGI. 28, a client terminal 2800, in addition to those shown in FIG. 27, may further include the following units stored on memory 2704:

a receiving unit 2802 that receives at least one piece of triggering condition information and the identification information corresponding to the triggering condition information;

a determining unit 2804 that determines whether there is locally stored triggering condition information corresponding to the received identification information;

a storing unit 2806 that, when there is no locally stored triggering condition information corresponding to the received identification information, stores the received triggering condition information and the corresponding identification information; and when there is locally stored triggering condition information corresponding to the received identification information, updates the locally stored triggering information corresponding to the received identification information, according to the triggering condition information corresponding to the received identification information.

Figure 29:
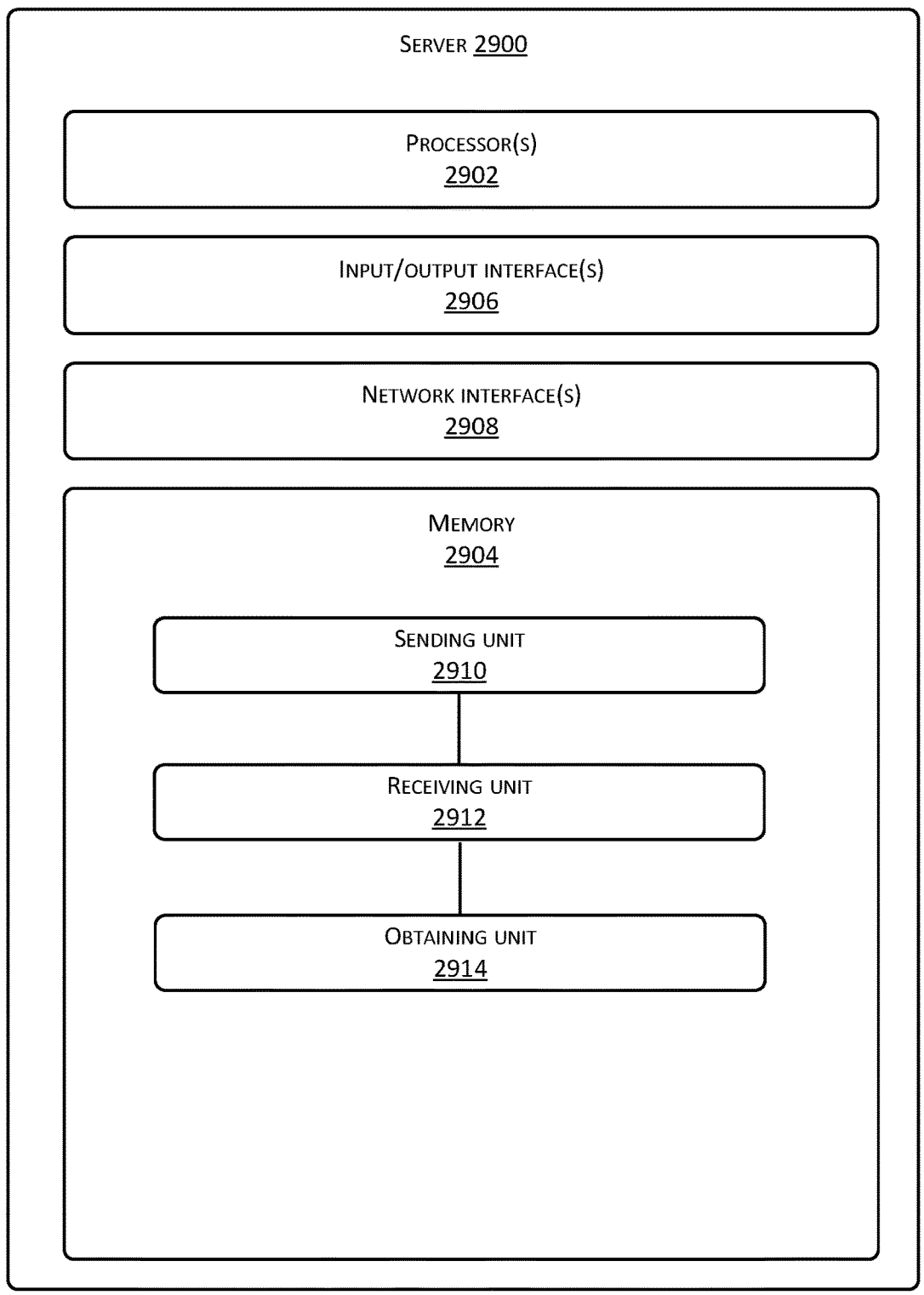
FIG. 29 is a diagram of an example server according to an example embodiment of the present disclosure.

The present disclosure also provides an example server 2900, as shown in FIG. 29, which includes one or more processor(s) 2902 or data processing unit(s) and memory 2904. The server 2900 may further include one or more input/output interface(s) 2906 and one or more network interface(s) 2908. The memory 2904 is an example of computer readable media.

The memory 2904 may store therein a plurality of modules or units including.

a sending unit 2910 that sends at least one piece of triggering condition information and the identification information corresponding to the triggering condition information to the client terminal, so that the client terminal, after determining that the collected terminal information matches one piece of the triggering condition information, sends the identification information corresponding to the matched triggering condition information to the server;

a receiving unit 2912 that receives the identification information sent by the client terminal; and an obtaining unit 2914 that obtains the information to be pushed corresponding to the identification information.

The sending unit 2910 sends the information to be pushed corresponding to the identification information to the client terminal, so that the client terminal, after receiving the information to be pushed, sends the received information to be pushed to the user according to a designated method.

For example, the obtaining unit 2914 searches for the pushing content or information template corresponding to the identification information at the designated storage location, and determines the found pushing content or the information template as the information to be pushed corresponding to the identification information.

For example, the obtaining unit 2914 searches for the information template corresponding to the identification information at the designated storage location, collects the terminal information, and generates the pushing content according to the collected terminal information and the information template as the information to be pushed corresponding to the identification information.

For example, the receiving unit 2912 receives the preset corresponding relationship between the triggering condition information and the identification information.

Alternatively, as shown in FGI. 30, a server 3000, in addition to those shown in FIG. 29, may further include the following units stored on memory 2904:

a collecting unit 3002 that collects the historical behavior data and preference data of the user; and an establishing and updating unit 3004 that establishes a new corresponding relationship between the triggering condition information and the information to be pushed, or updates the existing corresponding relationship between the triggering condition information and the information to be pushed, according to the historical behavior data and the preference data.

Figure 30:
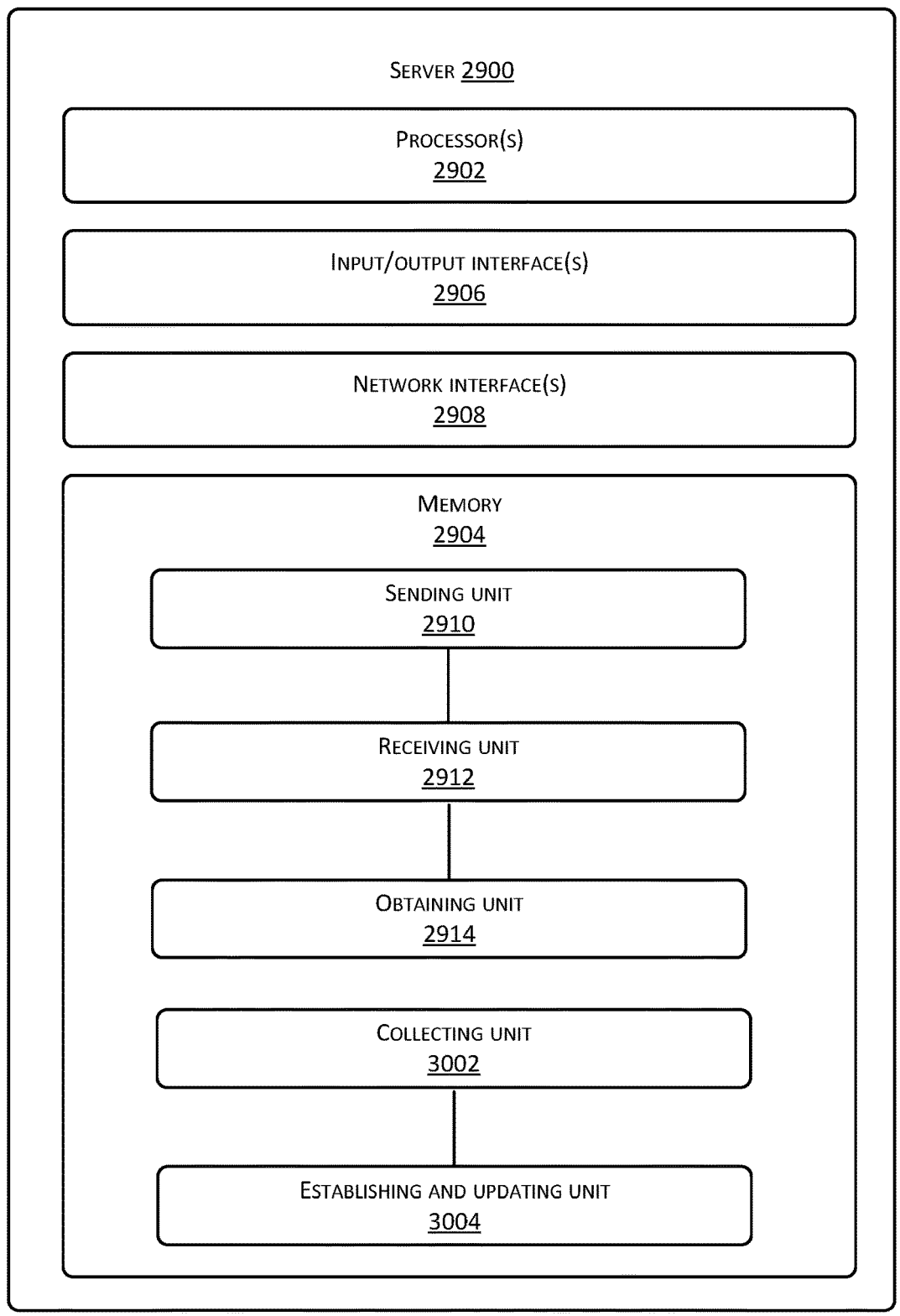
FIG. 30 is a diagram of another example server according to an example embodiment of the present disclosure.
Figure 31:
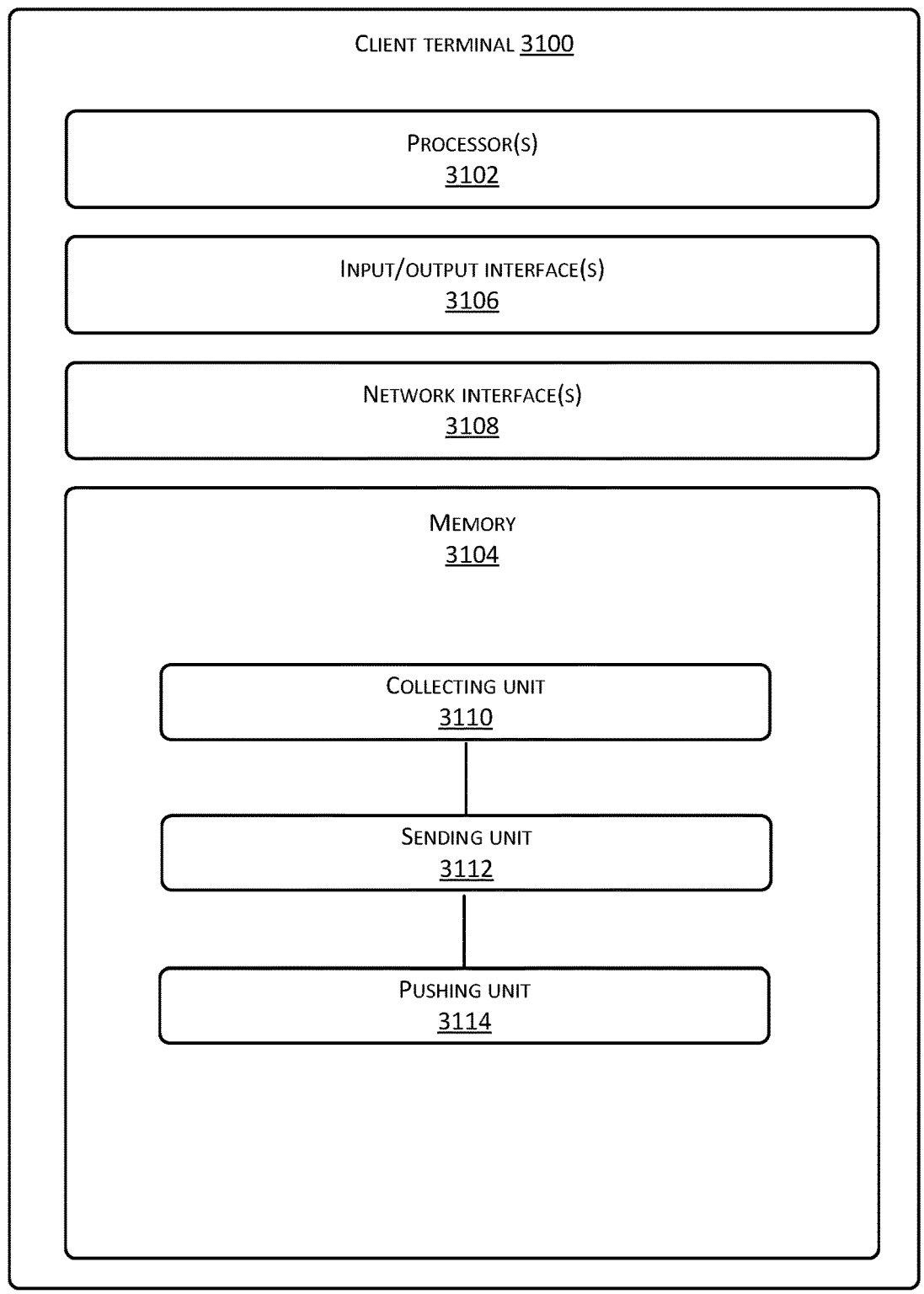
FIG. 31 is a diagram of another example client terminal according to an example embodiment of the present disclosure.

The present disclosure provides another example client terminal 3100, as shown in FIG. 30, which includes one or more processor(s) 3102 or data processing unit(s) and memory 3104. The client terminal 3100 may further include one or more input/output interface(s) 3106 and one or more network interface(s) 3108. The memory 3104 is an example of computer readable media.

The memory 3104 may store therein a plurality of modules or units including:

a collecting unit 3110 that collects terminal information;

a sending unit 3112 that sends the received collected terminal information to the server so that the server, when determining that the received collected terminal information matches one pieced of the triggering condition information, obtains the information to be pushed corresponding to the triggering condition information and sends the information to be pushed to the client terminal; and a pushing unit 3114 that pushes the received information to be pushed to the user according to a designated method.

For example, when the information to be pushed is the pushing content, the pushing unit 3114 directly pushes the information to be pushed to the user. When the information to be pushed is an information template, the pushing unit 3314 generates the pushing content according to the received information to be pushed and the terminal information, and pushes the newly generated pushing content to the user.

Figure 32:
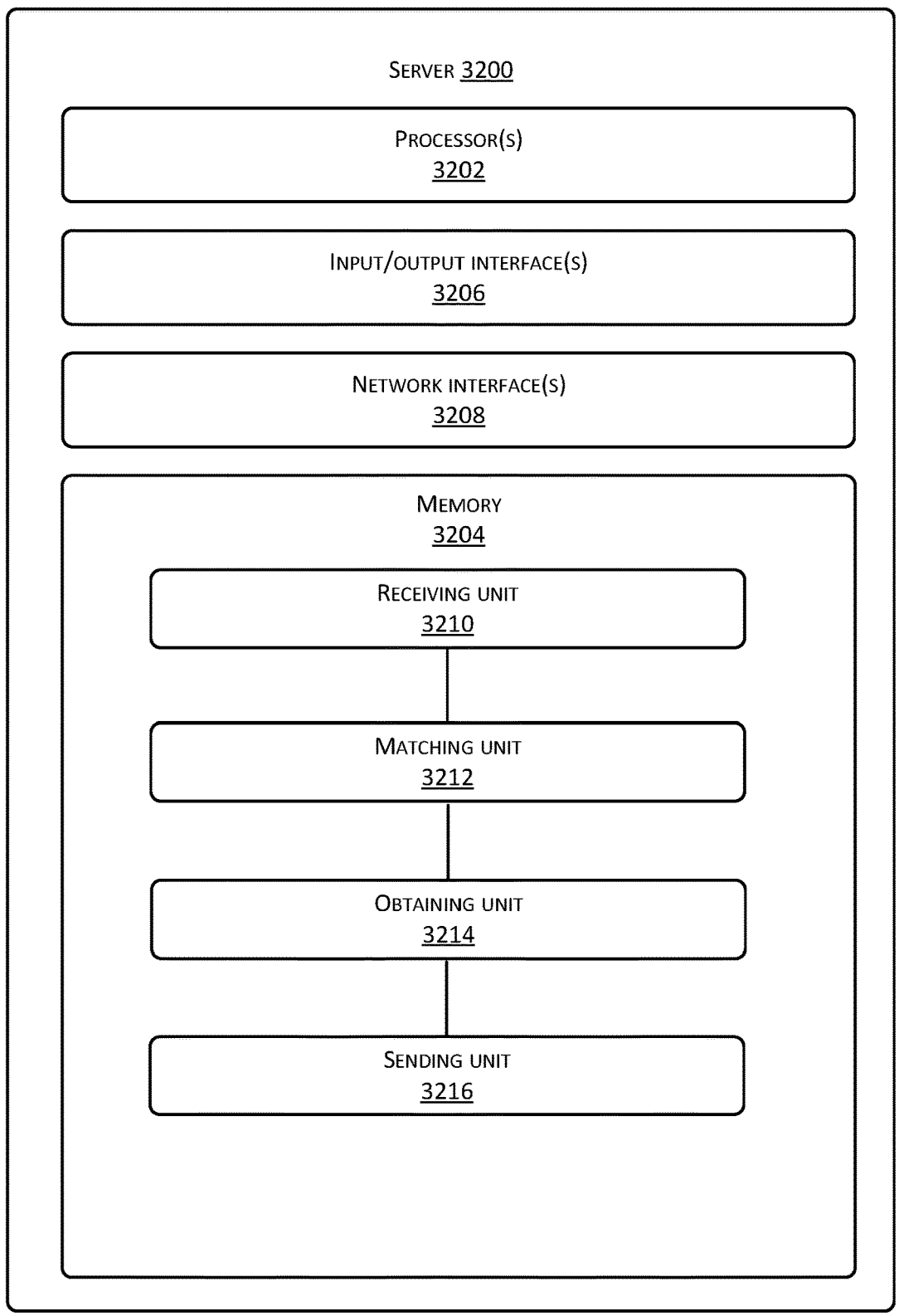
FIG. 32 is a diagram of another example server according to an example embodiment of the present disclosure.
Figure 33:
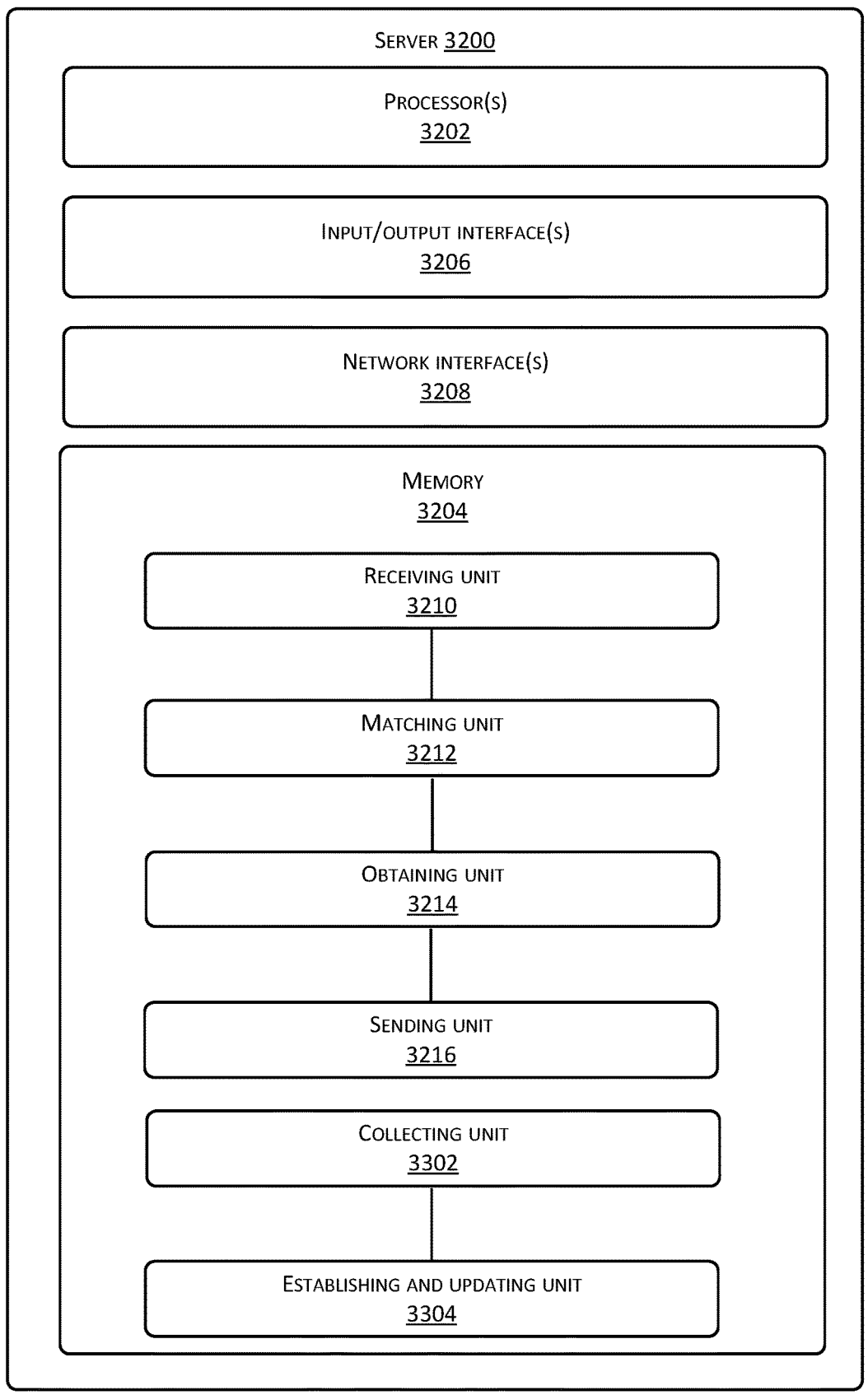
FIG. 33 is a diagram of another example server according to an example embodiment of the present disclosure.

The present disclosure provides another example server 3200, as shown in FIG. 32, which includes one or more processor(s) 3202 or data processing unit(s) and memory 3204. The server 3200 may further include one or more input/output interface(s) 3206 and one or more network interface(s) 3208. The memory 3204 is an example of computer readable media.

The memory 3204 may store therein a plurality of modules or units including:

a receiving unit 3210 that receives the terminal information sent by the client terminal;

a matching unit 3212 that matches the received terminal information with the triggering condition information;

an obtaining unit 3214 that, when the received terminal information matches one piece of the triggering condition information, obtains the information to be pushed corresponding to the matched triggering condition information; and a sending unit 3216 that sends the information to be pushed to the client terminal, so that the client terminal pushes the information to be pushed to the user according to a designated method.

For example, a respective triggering condition information represents a respective triggering condition corresponding to a respective type of terminal information to push respective information to be pushed.

For example, the matching unit 3212 matches the collected terminal information with the triggering condition corresponding to each triggering condition information; when the collected terminal information matches the triggering condition corresponding to a piece of triggering condition information in the one or more triggering condition information, which may be stored locally, determines that the collected terminal information matches the piece of triggering condition information; and when the collected terminal information does not match the triggering condition corresponding to any piece of triggering condition information in the one or more triggering condition information, which may be stored locally, determines that the collected terminal information does not match the triggering condition information, which may be stored locally.

For example, the obtaining unit 3214 searches for the pushing content or information template corresponding to the identification information at a designated storage location; and determines the found pushing content or information template as the information to be pushed according to the identification information.

For example, the obtaining unit 3214 searches for the information template corresponding to the identification information at the designated storage location; generates the pushing content according to the collected terminal information and the information template as the information to be pushed corresponding to the triggering condition information.

For example, the receiving unit 3210 receives a preset corresponding relationship between the triggering condition information and the information to be pushed.

Alternatively, as shown in FGI. 33, a server 3300, in addition to those shown in FIG. 32, may further include the following units stored on memory 3204:

a collecting unit 3302 that collects the historical behavior data and preference data of the user; and an establishing and updating unit 3304 that establishes a new corresponding relationship between the triggering condition information and the information to be pushed, or updates the existing corresponding relationship between the triggering condition information and the information to be pushed, according to the historical behavior data and the preference data.

Figure 34:
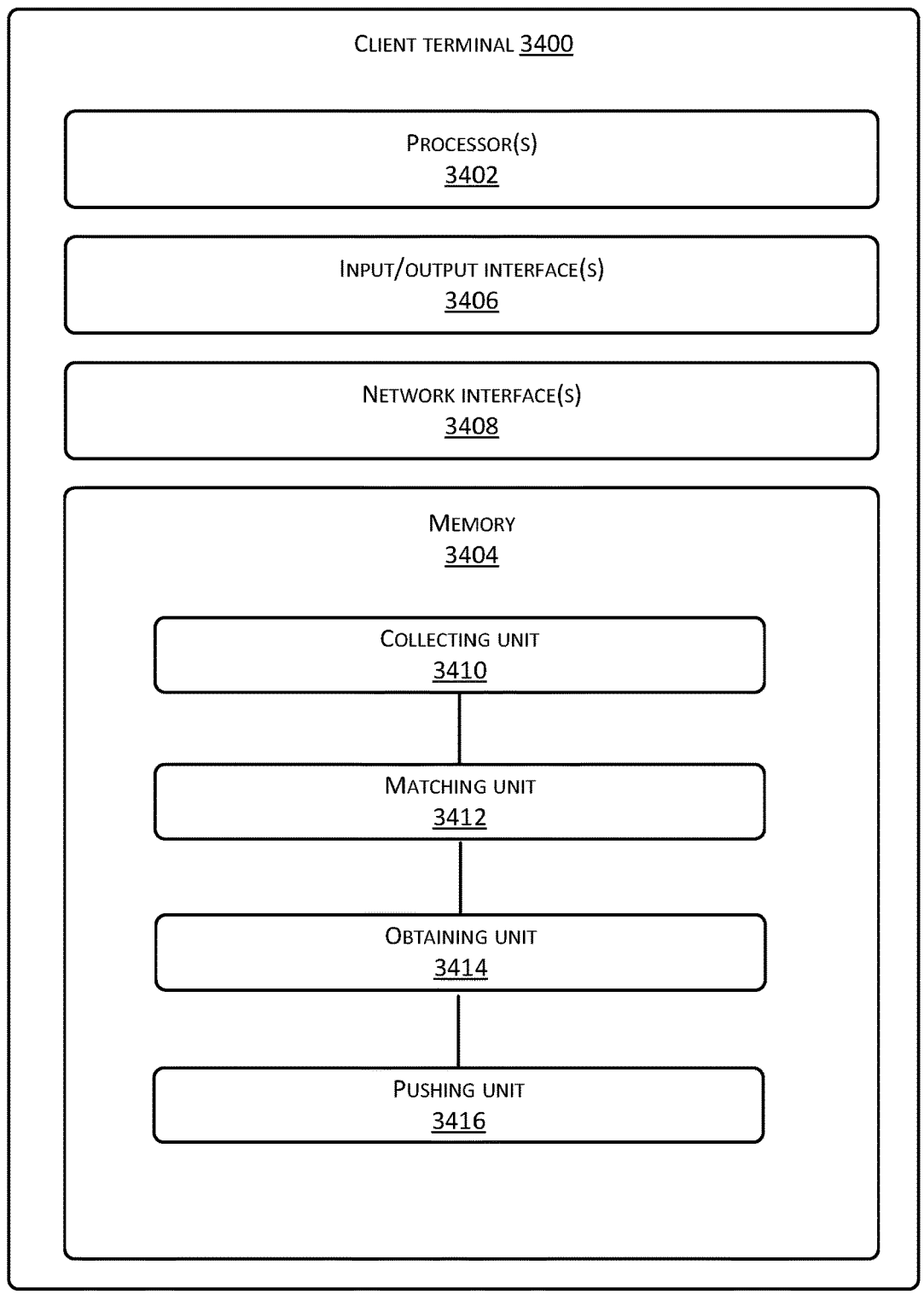
FIG. 34 is a diagram of another example client terminal according to an example embodiment of the present disclosure.
Figure 35:
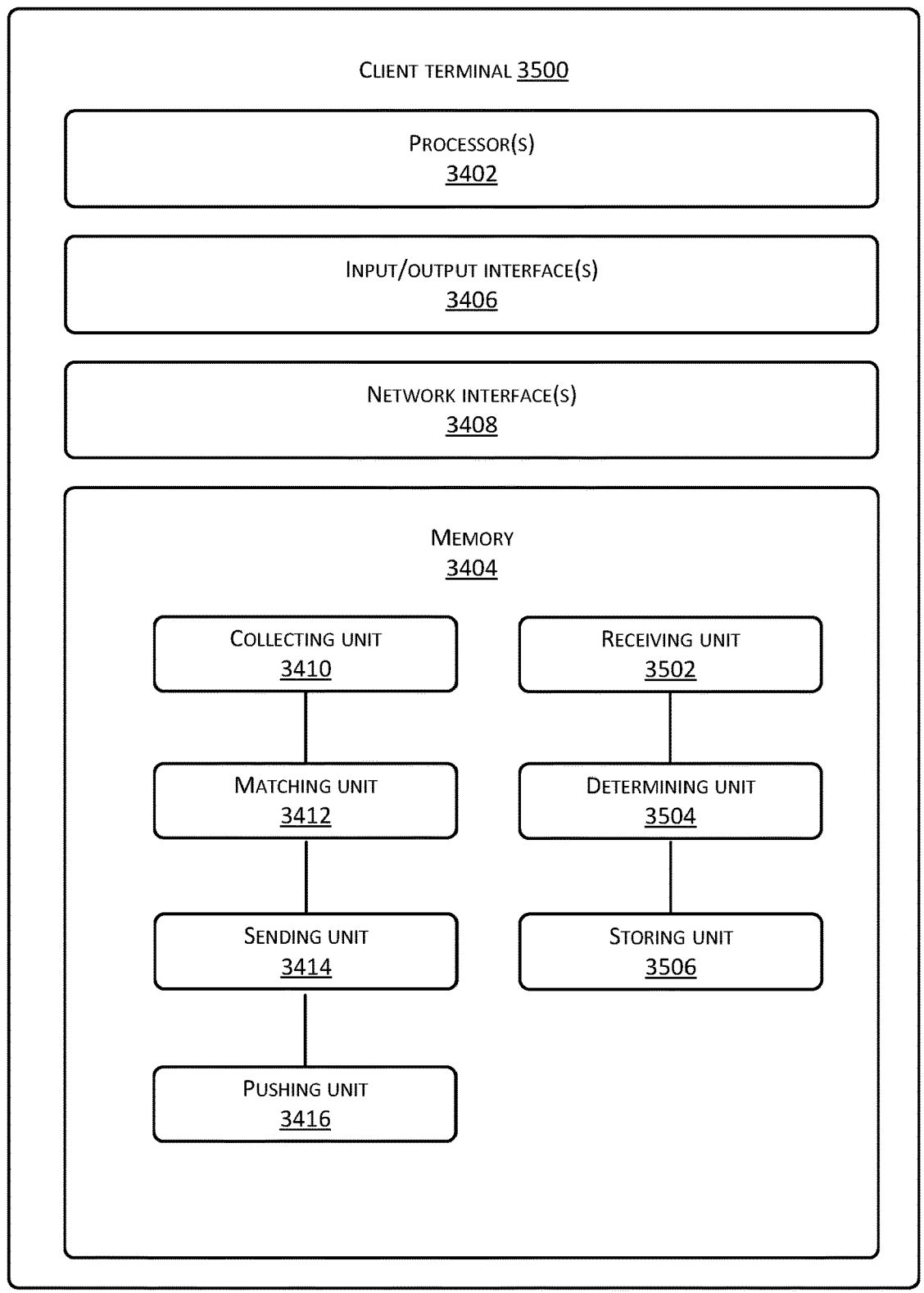
FIG. 35 is a diagram of another example client terminal according to an example embodiment of the present disclosure.

The present disclosure provides another example client terminal 3400, as shown in FIG. 34, which includes one or more processor(s) 3402 or data processing unit(s) and memory 3204. The server 3400 may further include one or more input/output interface(s) 3406 and one or more network interface(s) 3408. The memory 3404 is an example of computer readable media.

The memory 3404 may store therein a plurality of modules or units including.

a collecting unit 3410 that collects terminal information;

a matching unit 3412 that matches the collected terminal information with the triggering condition information;

an obtaining unit 3414 that, when the collected terminal information matches one piece of the triggering condition information, obtains the information to be pushed corresponding to the matched triggering condition information; and a pushing unit 3416 that pushes the obtained information to be pushed to the user according to a designated method.

For example, a respective triggering condition information represents a respective triggering condition corresponding to a respective type of terminal information to push respective information to be pushed.

For example, the matching unit 3412 matches the collected terminal information with the triggering condition corresponding to each triggering condition information; when the collected terminal information matches the triggering condition corresponding to a piece of triggering condition information in the one or more triggering condition information, which may be stored locally, determines that the collected terminal information matches the piece of triggering condition information; and when the collected terminal information does not match the triggering condition corresponding to any piece of triggering condition information in the one or more triggering condition information, which may be stored locally, determines that the collected terminal information does not match the triggering condition information.

For example, when the information to be pushed is the pushing content, the pushing unit 3416 directly pushes the information to be pushed to the user. When the information to be pushed is an information template, the pushing unit 3416 generates the pushing content according to the received information to be pushed and the terminal information, and pushes the newly generated pushing content to the user.

Alternatively, as shown in FGI. 35, a client terminal 3500, in addition to those shown in FIG. 34, may further include the following units stored on memory 3404:

a receiving unit 3502 that receives at least one piece of triggering condition information and the information to be pushed corresponding to the triggering condition information;

a determining unit 3504 that determines whether there is locally stored triggering condition information corresponding to the received information to be pushed;

a storing unit 3506 that, when there is no locally stored triggering condition information corresponding to the received information to be pushed, stores the received triggering condition information and the corresponding information to be pushed; and when there is locally stored triggering condition information corresponding to the received information to be pushed, updates the locally stored triggering information corresponding to the received information to be pushed, according to the triggering condition information corresponding to the received information to be pushed.

Figure 36:
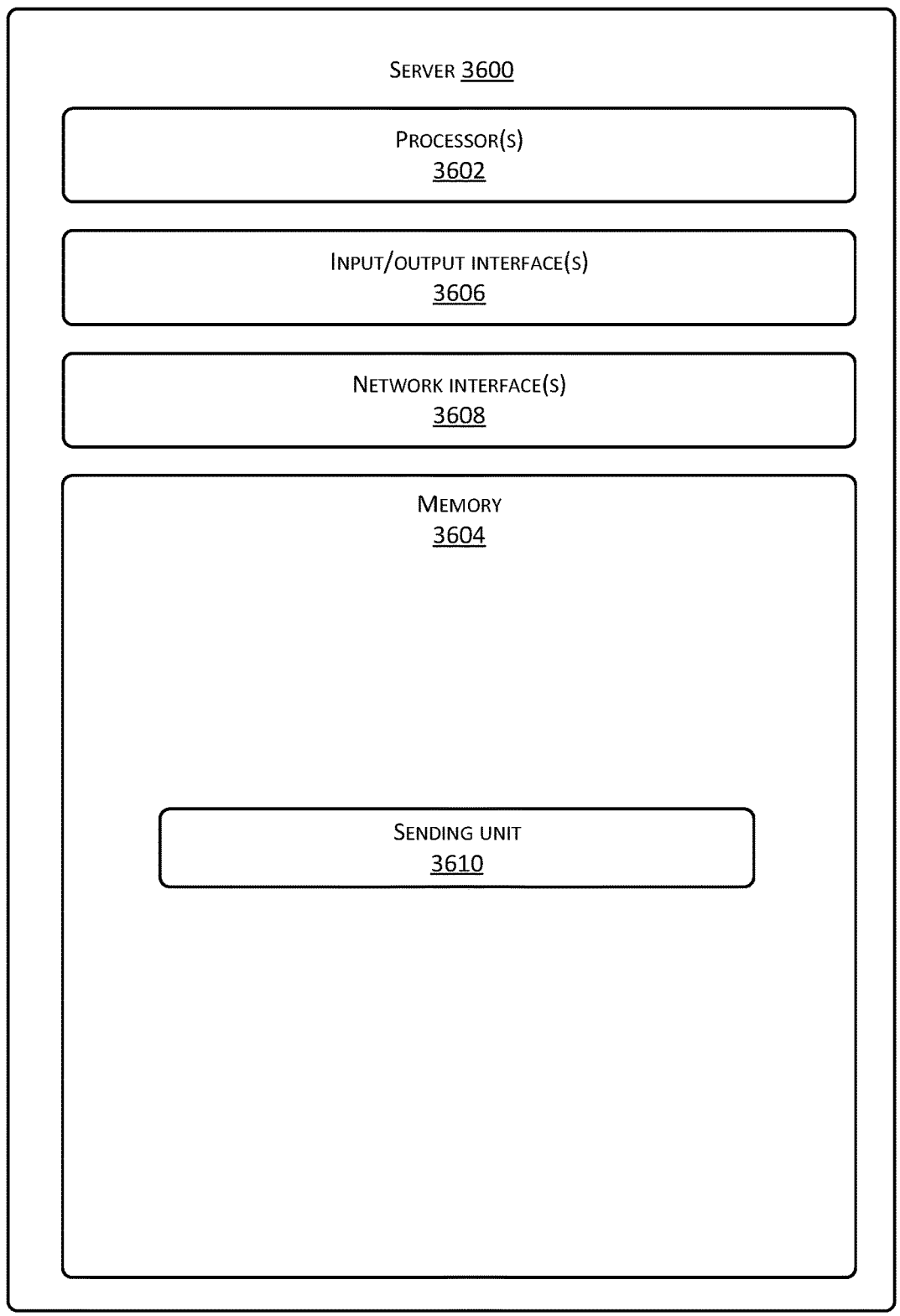
FIG. 36 is a diagram of another example server according to an example embodiment of the present disclosure.
Figure 37:
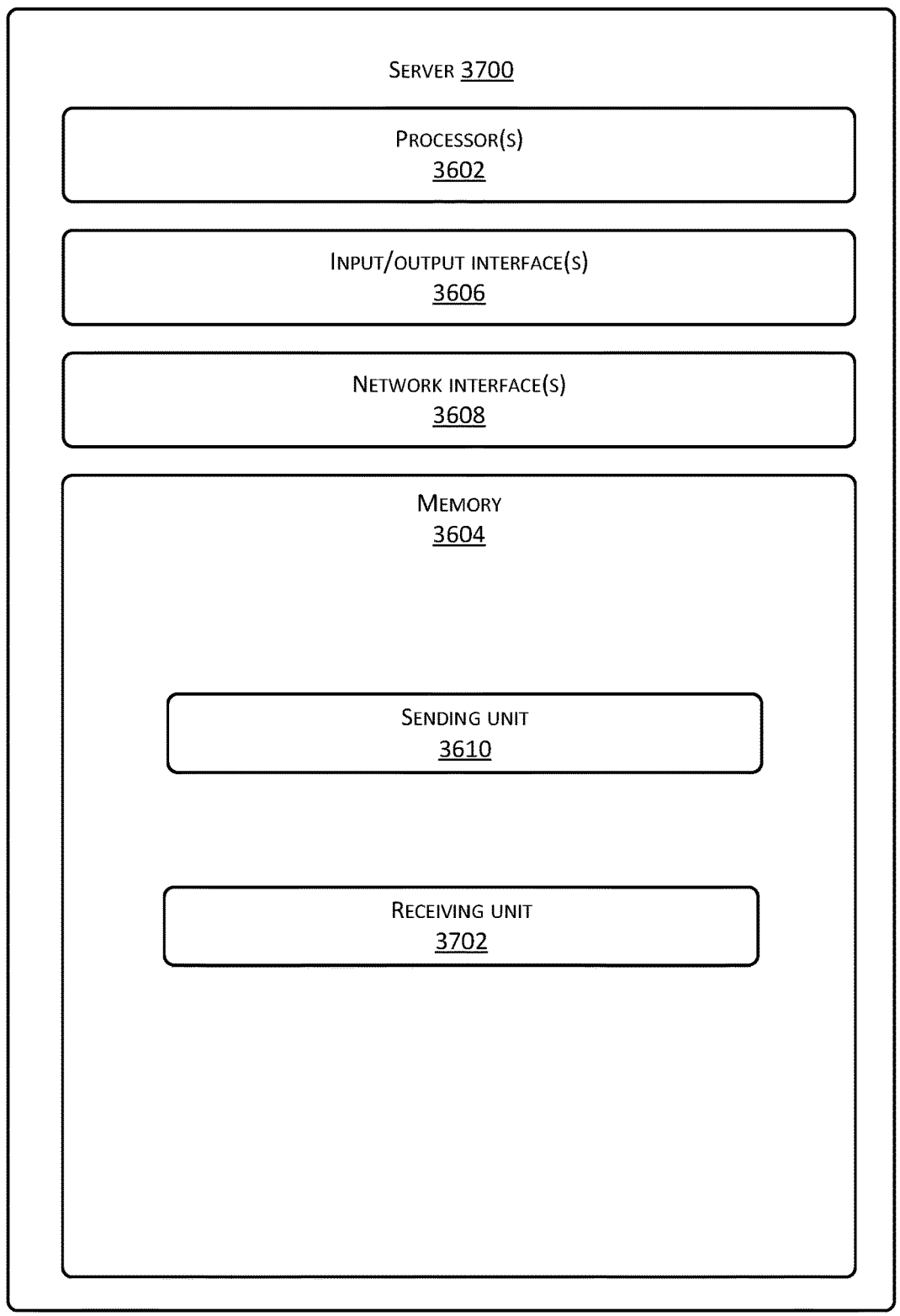
FIG. 37 is a diagram of another example server according to an example embodiment of the present disclosure.
Figure 38:
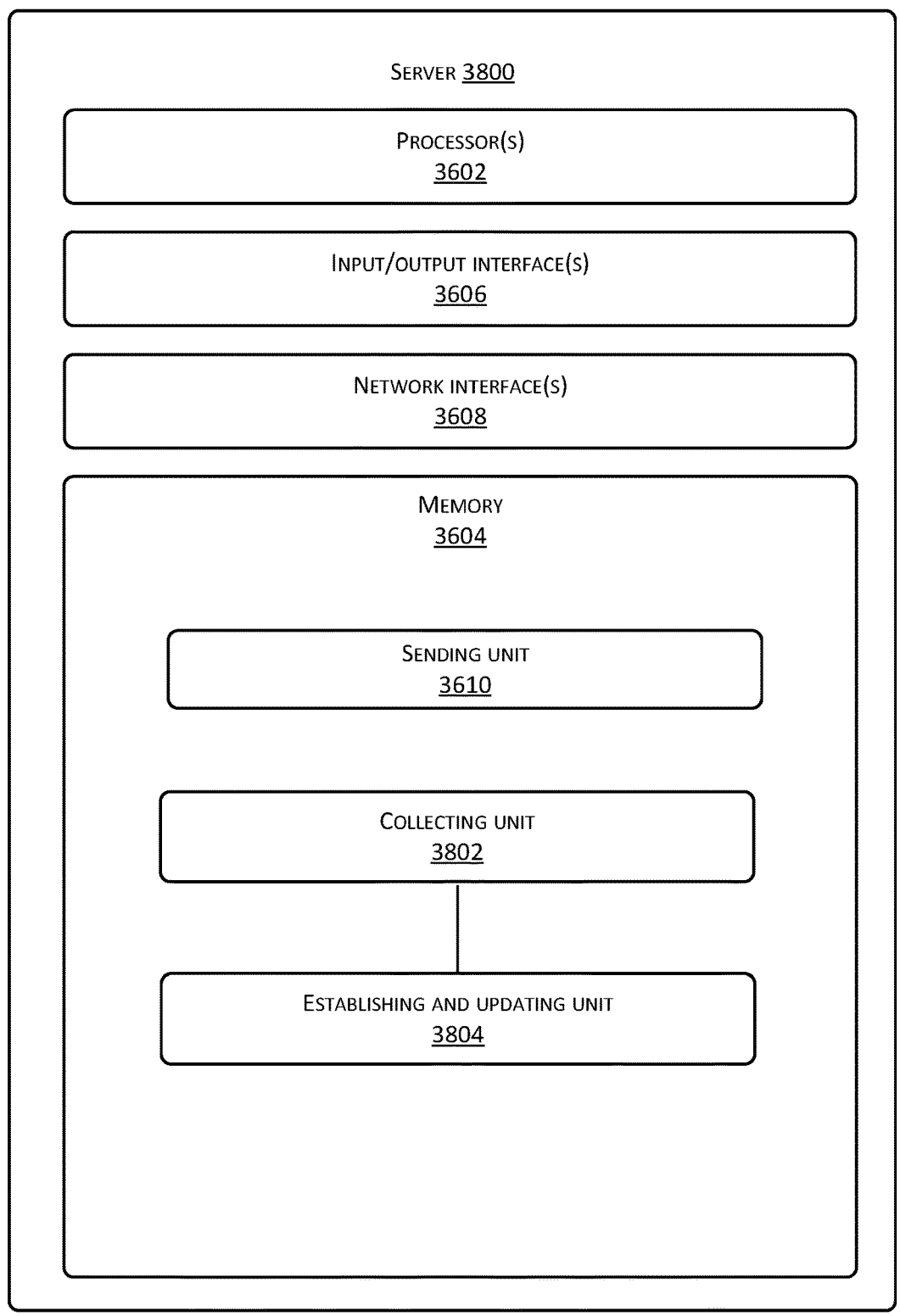
FIG. 38 is a diagram of another example server according to an example embodiment of the present disclosure.

The present disclosure also provides an example server 3600, as shown in FIG. 36, which includes one or more processor(s) 3602 or data processing unit(s) and memory 3604. The server 3600 may further include one or more input/output interface(s) 3606 and one or more network interface(s) 3608. The memory 3604 is an example of computer readable media.

The memory 3604 may store therein a plurality of modules or units including.

a sending unit 3610 that sends at least one piece of triggering condition information and the information to be pushed corresponding to the triggering condition information to the client terminal, so that the client terminal, after determining that the collected terminal information matches one piece of the triggering condition information, sends the information to be pushed corresponding to the matched triggering condition information to the user according to a designated method.

Alternatively, as shown in FGI. 37, a server 3700, in addition to those shown in FIG. 36, may further include the following units stored on memory 3604:

a receiving unit 3702 that receives a preset corresponding relationship between the triggering condition information and the information to be pushed.

Alternatively, as shown in FGI. 38, a server 3800, in addition to those shown in FIG. 36, may further include the following units stored on memory 3604:

a collecting unit 3802 that collects the historical behavior data and preference data of the user; and an establishing and updating unit 3804 that establishes a new corresponding relationship between the triggering condition information and the information to be pushed, or updates the existing corresponding relationship between the triggering condition information and the information to be pushed, according to the historical behavior data and the preference data.

The present disclosure provides an information pushing method, system, client terminal, and server. In one technical solution, the server sends the trigger condition in the form of triggering condition information and the identification information corresponding to the information to be pushed to the client terminal. The client terminal determines whether to push the information to be pushed to the user according to the terminal information and pushes the identification information to the server so that the server pushes the information to be pushed corresponding to the identification information to the client terminal. The client terminal then pushes the information to be pushed to the user. Compared with the conventional techniques that the server pushes message on its own, the technical solution of the present disclosure considers the actual situation of the user, selects the timing that more suits the user to receive the information to be pushed, thereby making the information to be pushed convenient for the user to view and not to disturb the user.

In another technical solution of the present disclosure, the client terminal uploads the terminal information to the server. The server determines whether to push the information to be pushed to the user according to the terminal information, and pushes the information to be pushed to the client terminal, when needed, so that the client terminal pushes the information to be pushed to the user. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

In another technical solution of the present disclosure, the server sends the trigger condition in the form of triggering condition information and the information to be pushed to the client terminal so that the client terminal determines whether to push the information to be pushed to the user according to the terminal information. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

The present disclosure also provides an example implementation of the client terminal.

Figure 39:
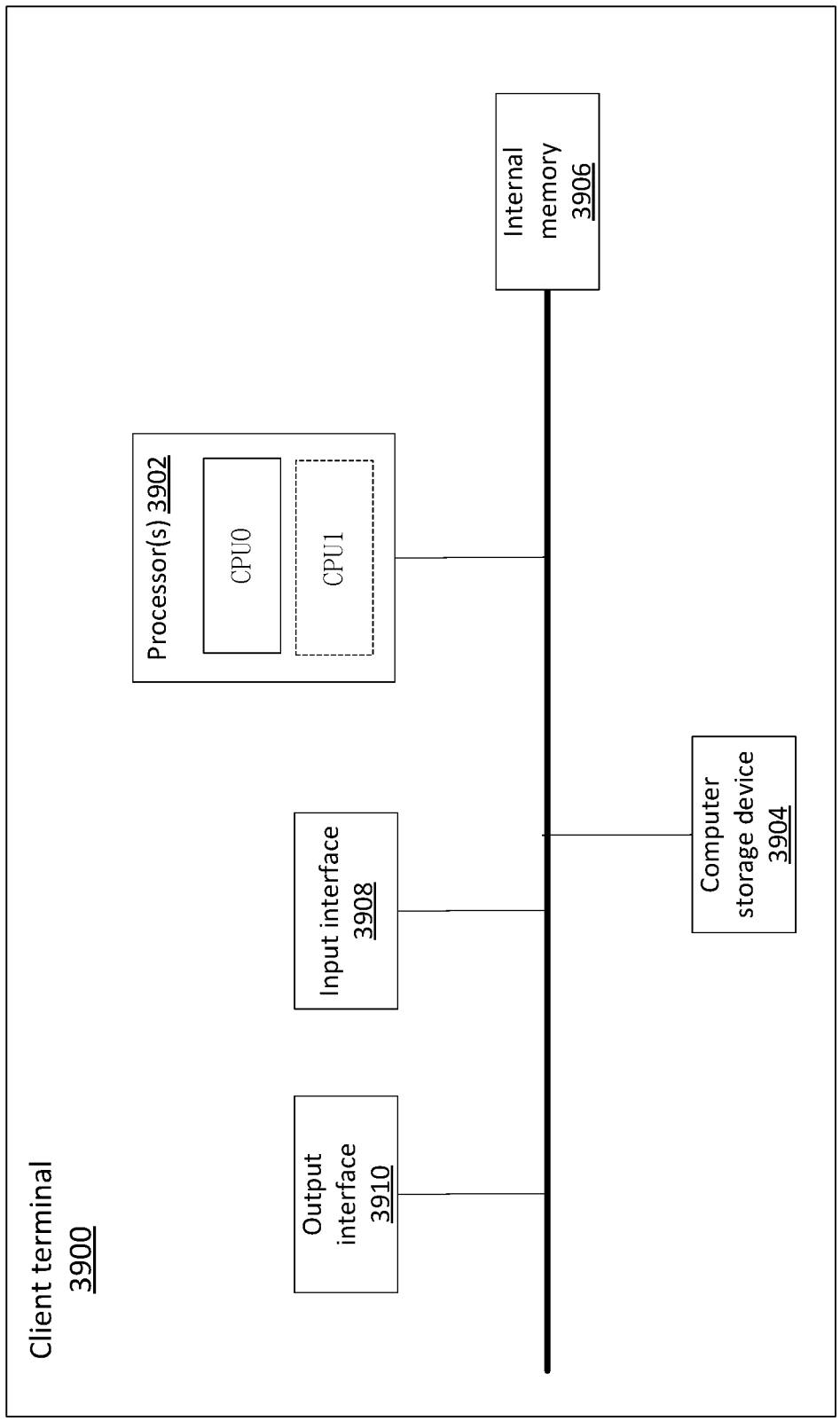
FIG. 39 is a diagram of another example client terminal according to an example embodiment of the present disclosure.

Referring to FIG. 39, an example client terminal 3900 includes one or more processor(s) 3902 that are connected with one or more computer storage apparatuses. The computer storage apparatuses may include computer storage devices 3904 and internal memory 3906. The client terminal 3900 may further include an input interface 3908 and an output interface 3910 to communicate with another apparatus or system. The computer-readable instruction executable by the processor 3902 may be stored on the computer storage devices 3904 or internal memory 3906.

For example, the processor 3902 collects the terminal information via the input interface 3908, matches the collected terminal information with the triggering condition information; when the collected terminal information matches at least one piece of triggering condition information, sends the identification information corresponding to the matched trigger information to the server via the output interface 3910 so that the server sends the information to be pushed corresponding to the identification information to the client terminal, in response to the received identification information. The output interface 3910 presents or pushes the received information to be pushed to the user according to a designated method.

For example, a respective triggering condition information represents a respective triggering condition corresponding to a respective type of terminal information to push respective information to be pushed.

For example, the processor 3902 matches the collected terminal information with the triggering condition corresponding to each triggering condition information; when the collected terminal information matches the triggering condition corresponding to a piece of triggering condition information in the one or more triggering condition information, which may be stored locally, determines that the collected terminal information matches the piece of triggering condition information; and when the collected terminal information does not match the triggering condition corresponding to any piece of triggering condition information in the one or more triggering condition information, which may be stored locally, determines that the collected terminal information does not match the triggering condition information.

For example, the processor 3902 pushes the received information to be pushed to the user via the output interface 3910. When the information to be pushed is information template, the processor 3902 generates the pushing content to be pushed according to the received information to be pushed and the terminal information, and pushes the newly generated pushing content to the user via the output interface 3910.

For example, the processor 3902 sends the terminal information to the server via the output interface 3910 so that the server determines the pushing content corresponding to the received terminal information and the received identification information, and sends the pushing content as the information to be pushed to the user via the output interface 3910.

For example, the processor 3902 receives at least one piece of triggering condition information and the identification information corresponding to the triggering condition information sent by the server via the input interface 3908. The processor 3902 determines whether there is locally stored triggering condition information corresponding to the received identification information; when there is no locally stored triggering condition information corresponding to the received identification information, stores the received triggering condition information and the corresponding identification information; and when there is locally stored triggering condition information corresponding to the received identification information, updating the locally stored triggering information corresponding to the received identification information, according to the triggering condition information corresponding to the received identification information.

In another example implementation of the client terminal 3900, the processor 3902 collects the terminal information via the input interface 3908 and sends the collected terminal information to the server so that the server, when determining that the received terminal information matches one pieces of the triggering condition information, obtains the information to be pushed corresponding to the triggering condition information, and sends the information to be pushed to the client terminal. The client terminal sends the received information to be pushed to the user according to a designated method.

For example, the processor 3902, when the information to be pushed is the pushing content to be pushed, sends the received information to be pushed to the user via the output interface 3901. When the information to be pushed is information template, the processor 3902 generates the pushing content to be pushed according to the received information to be pushed and the terminal information, and pushing the newly generated pushing content to the user via the output interface 3910.

In another example implementation of the client terminal 3900, the processor 3902 collects the terminal information via the input interface 3908, matches the collected terminal information with the triggering condition information; when the collected terminal information matches at least one piece of triggering condition information, obtains the information to be pushed corresponding to the matched triggering condition information; and sends the obtained information to be pushed to the user via the output interface 3910 according to a designated method.

For example, a respective triggering condition information represents a respective triggering condition corresponding to a respective type of terminal information to push respective information to be pushed.

For example, the processor 3902 matches the collected terminal information with the triggering condition of each triggering condition information; when the collected terminal information matches a piece of triggering condition of a piece of triggering condition information, determines that the collected terminal information matches the piece of triggering condition information; when the collected terminal information does not match any piece of triggering condition of any piece of triggering condition information, determines that the collected terminal information does not match the triggering condition information, which may be stored locally.

For example, when the information to be pushed is the pushing content, the processor 3902 pushes the received information to be pushed to the user via the output interface 3910. When the information to be pushed is information template, the processor 3902 generates the pushing content according to the received information to be pushed and the terminal information, and pushes the newly generated pushing content to the user via the output interface 3910.

For example, the processor 3902 receives at least one piece of triggering condition information and the information to be pushed corresponding to the triggering condition information sent by the server via the input interface 3908; determines whether there is locally stored triggering condition information corresponding to the received information to be pushed; when there is no locally stored triggering condition information corresponding to the received information to be pushed, storing the received triggering condition information and the corresponding information to be pushed; when there is locally stored triggering condition information corresponding to the received identification information, updating the locally stored triggering information corresponding to the received information to be pushed, according to the triggering condition information corresponding to the received information to be pushed.

Figure 40:
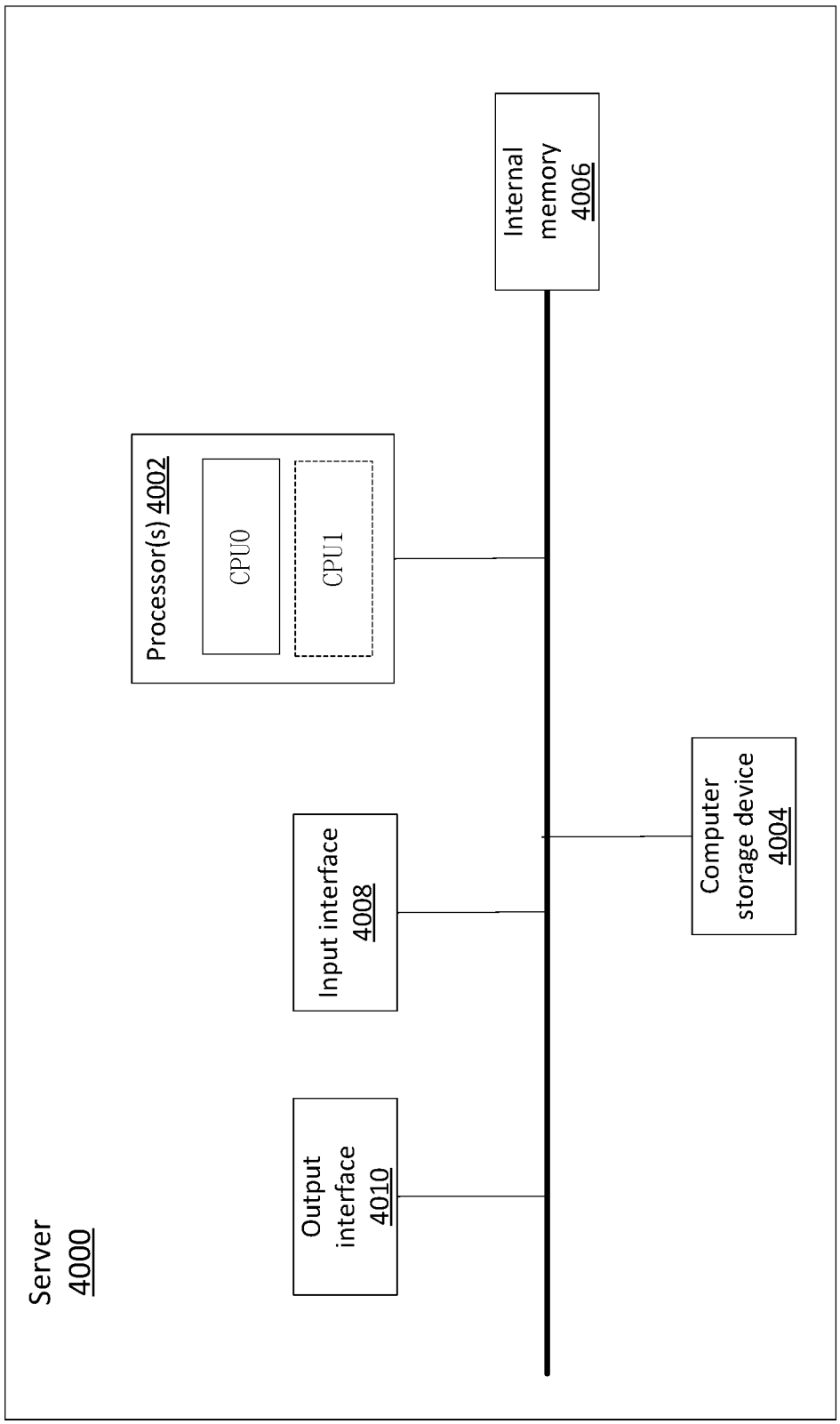
FIG. 40 is a diagram of another example server according to an example embodiment of the present disclosure.

The present disclosure also provides an example implementation of the client terminal. Referring to FIG. 40, an example client terminal 4000 includes one or more processor(s) 4002 that are connected with one or more computer storage apparatuses. The computer storage apparatuses may include computer storage devices 4004 and internal memory 4006. The server 4000 may further include an input interface 4008 and an output interface 4010 to communicate with another apparatus or system. The computer-readable instruction executable by the processor 4002 may be stored on the computer storage devices 4004 or internal memory 4006.

For example, the processor 4002 sends at least one piece of triggering condition information and the identification information corresponding to the triggering condition information to the client terminal via the output interface 4010, so that the client terminal, after determining that the collected terminal information matches one piece of the triggering condition information, sends the identification information corresponding to the matched triggering condition information to the server. The processors 402 also receives the identification information sent by the client terminal via the input interface 4008; obtains the information to be pushed corresponding to the identification information; and sends the information to be pushed corresponding to the identification information to the client terminal via the output interface 4010, so that the client terminal, after receiving the information to be pushed, sends the received information to be pushed to the user according to a designated method.

For example, the processor 4002 searches for the pushing content or information template corresponding to the identification information at a designated storage location; and determines the found pushing content or information template as the information to be pushed according to the identification information.

For example, the processor 4002 searches for the information template corresponding to the identification information at the designated storage location; collects terminal information and generates the pushing content according to the collected terminal information and the information template as the information to be pushed corresponding to the identification information.

For example, the processor 4002 receives a preset corresponding relationship between the triggering condition information and the identification information via the input interface 4008.

For example, the processor 4002 collects the historical behavior data and preference data of the user; and establishes a new corresponding relationship between the triggering condition information and the identification, or updates the existing corresponding relationship between the triggering condition information and the identification information, according to the historical behavior data and the preference data.

In an alternative implementation, the processor 4002 receives the terminal information sent by the client terminal via the input interface 4008; matches the received terminal information with the triggering condition information; when the received terminal information matches one piece of the triggering condition information, obtains the information to be pushed corresponding to the matched triggering condition information; and sends the information to be pushed to the client terminal via the output interface 4010, so that the client terminal pushes the information to be pushed to the user according to a designated method.

For example, a respective triggering condition information represents a respective triggering condition corresponding to a respective type of terminal information to push respective information to be pushed.

For example, the processor 4002 matches the collected terminal information with the triggering condition corresponding to each triggering condition information; when the collected terminal information matches the triggering condition corresponding to a piece of triggering condition information in the one or more triggering condition information, which may be stored locally, determining that the collected terminal information matches the piece of triggering condition information; and when the collected terminal information does not match the triggering condition corresponding to any piece of triggering condition information in the one or more triggering condition information, which may be stored locally, determining that the collected terminal information does not match the triggering condition information.

For example, the processor 4002 searches for the pushing content or information template corresponding to the triggering condition information at a designated storage location; and determines the found pushing content or the information template as the information to be pushed corresponding to the triggering condition information.

For example, the processor 4002 searches for the information template corresponding to the triggering condition information at the designated storage location; generates the pushing content according to the received terminal information and the information template, to be used as the information to be pushed corresponding to the triggering condition information.

For example, the processor 4002 receives a preset corresponding relationship between the triggering condition information and the information to be pushed via the input interface 4008.

For example, the processor 4002 collects the historical behavior data and preference data of the user; and establishes a new corresponding relationship between the triggering condition information and the information to be pushed, or updates the existing corresponding relationship between the triggering condition information and the information to be pushed, according to the historical behavior data and the preference data.

In another alternative implementation of the server 4000, the processor 4002 sends at least one piece of trigging condition information and the information to be pushed corresponding to the triggering condition information to the client terminal via the output interface 4010 so that the client terminal, when determining that the collected terminal information matches one piece of the triggering condition information, pushes the obtained information to be pushed to the user according to a designated method.

For example, the processor 4002 receives a preset corresponding relationship between the triggering condition information and the information to be pushed via the input interface 4008.

For example, the processor 4002 collects the historical behavior data and preference data of the user; and establishes a new corresponding relationship between the triggering condition information and the information to be pushed, or updates the existing corresponding relationship between the triggering condition information and the information to be pushed, according to the historical behavior data and the preference data.

The present disclosure provides an information pushing client terminal and server. In one technical solution, the server sends the trigger condition in the form of triggering condition information and the identification information corresponding to the information to be pushed to the client terminal. The client terminal determines whether to push the information to be pushed to the user according to the terminal information and pushes the identification information to the server so that the server pushes the information to be pushed corresponding to the identification information to the client terminal. The client terminal then pushes the information to be pushed to the user. Compared with the conventional techniques that the server pushes message on its own, the technical solution of the present disclosure considers the actual situation of the user, selects the timing that more suits the user to receive the information to be pushed, thereby making the information to be pushed convenient for the user to view and not to disturb the user.

In another technical solution of the present disclosure, the client terminal uploads the terminal information to the server. The server determines whether to push the information to be pushed to the user according to the terminal information, and pushes the information to be pushed to the client terminal, when needed, so that the client terminal pushes the information to be pushed to the user. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

In another technical solution of the present disclosure, the server sends the trigger condition in the form of triggering condition information and the information to be pushed to the client terminal so that the client terminal determines whether to push the information to be pushed to the user according to the terminal information. Compared with the conventional techniques that the server pushes information to be pushed on its own, the technical solution of the present disclosure considers the actual situation of the user, selects the timing that more suits the user to receive the information to be pushed, thereby making the information to be pushed convenient for the user to view and not to disturb the user.

In the above example embodiment, the computer storage device may be a read-only memory (ROM), or readable and writable, such as a hard disk or a flash memory. The internal memory may be a random access memory (RAM). The internal memory may be physically integrated with the processor, integrated into the computer storage device or separate units.

The processor is a control center of the above-described device (the device is the server or the client terminal) and provides processing for executing instructions, performing an interrupt operation, providing a timing function, and a plurality of other functions. Optionally, the processor includes one or more central processing units (CPUs), such as CPU 0 and CPU 1 shown in FIGS. 39 and 40. The above devices include one or more processors. The processor may be a single-core (single-CPU) processor or a multi-core (multi-CPU) processor. Unless otherwise stated, the described components described for performing a task, such as a processor or memory may be implemented as a generic component that is temporarily used to perform the task at a given time or a particular component for the purpose of specifically performing the task. As used herein, the term processor refers to one or more apparatuses, circuits, and/or processing cores for processing data such as computer-readable instructions.

The computer-readable instructions executable by the CPU of the processor may be stored in the internal memory unit or the computer storage device. Optionally, the computer-readable instructions stored in the computer storage device may be copied into the internal memory for execution by the CPU of the processor. The processor may execute at least one kernel (e.g., LINUX™, UNIX™, WINDOWS™, ANDROID™, IOS™), which is known to control the use of other programs or processes, control the communication with the peripheral devices, and control the use of computer device resources.

The above descriptions describe example embodiments of the present disclosure and are not intended to be construed to limit the present disclosure. Any modifications, equivalents, improvements, etc., within the spirit and principles of the present disclosure, shall be included in the protection of the present disclosure.

What is claimed is:

1. A method comprising:
collecting, by a client terminal, terminal information;
receiving, by the client terminal, at least one triggering condition information and identification information corresponding to the triggering information from a server; determining, by the client terminal, that the terminal information matches the at least one triggering condition information; sending, by the client terminal, the identification information corresponding to the at least one triggering condition information to the server;
receiving, by the client terminal, information corresponding to the identification information from the server;
sending the terminal information to the server so that the server determines pushing content to the user according to the identification information and the terminal information;
receiving the pushing content as the received information from the server; and pushing, by the client terminal, the received information to a user.

2. The method of claim 1, wherein the terminal information includes at least one of: position information of the client terminal; motion status information of the client terminal; operation system information of the client terminal;
location information of the client terminal; and location information of the user.

3. The method of claim 1, wherein the terminal information includes at least one of: a current time; application that is running on the client terminal; a list of installed applications on the client terminal; a remaining battery capacity of the client terminal; and a network quality of the client terminal.

4. The method of claim 1, wherein a respective triggering condition information represents a respective triggering condition corresponding to a respective type of terminal information to push the received information.

5. The method of claim 1, wherein the determining that the terminal information matches at least one triggering condition information of the one or more triggering condition information includes: matching the collected terminal information with a respective triggering condition corresponding to a respective triggering condition information of the one or more triggering condition information; and when the terminal information matches the respective triggering condition, determining that the terminal information matches the respective triggering condition information; or when the terminal information does not match any triggering condition corresponding to any respective triggering condition information in the one or more triggering condition information, determining that the terminal information does not match the triggering condition information.

6. The method of claim 1, wherein the pushing the received information to the user includes presenting the received information at a user interface of the client terminal.

7. The method of claim 1, wherein the pushing the received information to the user includes:
determining that the received information is the pushing content to the user; and pushing the received information to the user.

8. The method of claim 1, wherein the pushing the received information to the user includes: determining that the received information is an information template; generating pushing content according to the information template and the terminal information; and pushing the newly generated pushing content to the user.

9. The method of claim 1, further comprising:
after receiving, by the client terminal, the at least one triggering condition information and identification information corresponding to the triggering information from the server, determining whether there is locally stored triggering condition information corresponding to the received identification information; when there is no locally stored triggering condition information corresponding to the received identification information, storing the received triggering condition information and the corresponding identification information; or when there is locally stored triggering condition information corresponding to the received identification information, updating the locally stored triggering information corresponding to the received identification information, according to the received triggering condition information corresponding to the received identification information.

10. A client terminal comprising: one or more processors; and one or more memories storing thereon computer-readable instructions that, when executed by the one or more processors, cause the one or more processors to perform acts comprising: collecting, by the client terminal, terminal information; receiving, by the client terminal, at least one triggering condition information and identification information corresponding to the triggering information from a server;
sending, by the client terminal, the terminal information to the server to request the server to return information to the client terminal when the terminal information matches at least one triggering condition information; receiving the pushing content as the returned information from the server; and pushing, by the client terminal, the returned information to a user.

11. The client terminal of claim 10, wherein the pushing the returned information to the user includes presenting the returned information at a user interface of the client terminal.

12. The client terminal of claim 10, wherein the pushing the returned information to the user includes:
determining that the returned information is the pushing content to the user; and pushing the returned information to the user.

13. The client terminal of claim 10, wherein the pushing the returned information to the user includes: determining that the returned information is an information template; generating pushing content according to the information template and the terminal information; and pushing the newly generated pushing content to the user.

14. The client terminal of claim 10, wherein the terminal information includes at least one of: position information of the client terminal; motion status information of the client terminal; operation system information of the client terminal; location information of the client terminal; location information of the user a current time; application that is running on the client terminal; a list of installed applications on the client terminal; a remaining battery capacity of the client terminal; and a network quality of the client terminal.

15. One or more memories storing thereon computer-readable instructions, that, when executed by one or more processors, cause the one or more processors to perform acts comprising: sending, by a server, one or more triggering condition information and identification information corresponding to the one or more triggering condition information to a client terminal; sending, by the server, the pushing content as received information to the client terminal; and requesting, by the server, the client terminal to push the received information corresponding to matched triggering condition information to a user when terminal information of the client terminal matches at least one triggering condition information.

16. The one or more memories of claim 15, wherein the acts further comprise: receiving a preset corresponding relationship between the one or more triggering condition information and one or more received information.

17. The one or more memories of claim 15, wherein the acts further comprise: collecting historical behavior data and preference data of the user; and establishing a new corresponding relationship between the triggering condition information and the identification according to the historical behavior data and the preference data.

18. The one or more memories of claim 15, wherein the acts further comprise: collecting historical behavior data and preference data of the user; and establishing a new corresponding relationship between the triggering condition information and the identification according to the historical behavior data and the preference data.

19. The one or more memories of claim 16, wherein the acts further comprise: collecting historical behavior data and preference data of the user; and updating an existing corresponding relationship between the triggering condition information and the identification information.

\* \* \* \* \*